(12) United States Patent
Figueroa et al.

(10) Patent No.: US 11,041,027 B2
(45) Date of Patent: *Jun. 22, 2021

(54) POLYMERIZATION PROCESS FOR PRODUCING ETHYLENE BASED POLYMERS

(71) Applicant: Dow Global Technologies LLC, Midland, MI (US)

(72) Inventors: Ruth Figueroa, Midland, MI (US); Jerzy Klosin, Midland, MI (US); Philip P. Fontaine, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 600 days.

This patent is subject to a terminal disclaimer.

(21) Appl. No.: 15/740,710

(22) PCT Filed: Jun. 30, 2016

(86) PCT No.: PCT/US2016/040577
§ 371 (c)(1),
(2) Date: Dec. 28, 2017

(87) PCT Pub. No.: WO2017/004462
PCT Pub. Date: Jan. 5, 2017

(65) Prior Publication Data
US 2018/0194871 A1    Jul. 12, 2018

Related U.S. Application Data

(60) Provisional application No. 62/187,121, filed on Jun. 30, 2015.

(51) Int. Cl.
*C08F 4/64* (2006.01)
*C08F 210/16* (2006.01)
*C08F 4/659* (2006.01)

(52) U.S. Cl.
CPC ........ *C08F 4/64193* (2013.01); *C08F 210/16* (2013.01); *C08F 4/659* (2013.01); *C08F 4/65908* (2013.01); *C08F 4/65912* (2013.01)

(58) Field of Classification Search
CPC ............................ C08F 4/64193; C08F 4/659
See application file for complete search history.

(56) References Cited

U.S. PATENT DOCUMENTS

| 5,064,802 A | 11/1991 | Stevens et al. |
| 5,153,157 A | 10/1992 | Hlatky et al. |

(Continued)

FOREIGN PATENT DOCUMENTS

| CN | 102712795 A | 10/2012 |
| GB | 1069848 A | 5/1967 |

(Continued)

OTHER PUBLICATIONS

Notice of Allowance and Fee(s) Due dated Jan. 8, 2020 pertaining to U.S. Appl. No. 15/763,937, filed Mar. 28, 2018, 12 pgs.

(Continued)

*Primary Examiner* — Catherine S Branch

(74) *Attorney, Agent, or Firm* — Dinsmore & Shohl LLP

(57) ABSTRACT

The disclosure provides a polymerization process for producing ethylene based polymers comprising polymerizing ethylene and optionally one or more α-olefins in the presence of a catalyst systems in a reactor system having one or more reactors, wherein the catalyst system comprises; (a) one or more procatalysts comprising a metal-ligand complex of formula (I) below:

(Continued)

$$\% \ Crystallinity = ((H_f)/(292\ J/g)) \times 100$$

Equation 1

US 11,041,027 B2
Page 2

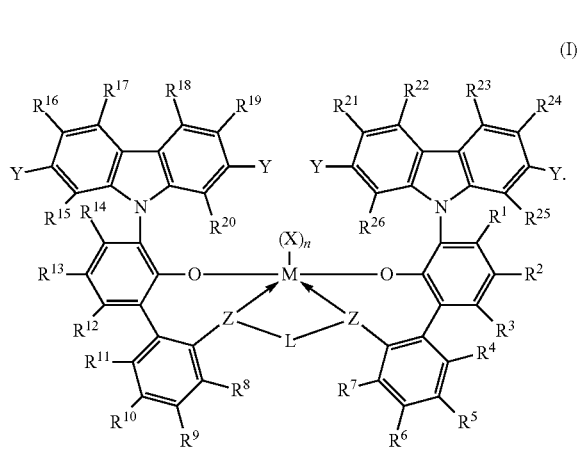

(I)

14 Claims, 5 Drawing Sheets

(56) References Cited

U.S. PATENT DOCUMENTS

| | | |
|---|---|---|
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,464,906 A | 11/1995 | Patton et al. |
| 5,625,087 A | 4/1997 | Devore et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,268,444 B1 | 7/2001 | Klosin et al. |
| 6,515,155 B1 | 2/2003 | Klosin et al. |
| 6,696,379 B1 | 2/2004 | Carnahan et al. |
| 6,869,904 B2 | 3/2005 | Boussie et al. |
| 7,060,848 B2 | 6/2006 | Boussie et al. |
| 7,163,907 B1 | 1/2007 | Canich et al. |
| 7,951,882 B2 | 5/2011 | Arriola et al. |
| 8,609,794 B2 | 12/2013 | Klosin et al. |
| 8,729,201 B2 | 5/2014 | Fontaine et al. |
| 9,029,487 B2 | 5/2015 | Klosin et al. |
| 9,102,819 B2 | 8/2015 | Kapur et al. |
| 9,522,855 B2 | 12/2016 | Klosin |
| 9,527,940 B2 | 12/2016 | Demirors et al. |
| 9,527,941 B2 | 12/2016 | Demirors et al. |
| 9,601,230 B2 | 3/2017 | Nair et al. |
| 9,601,231 B2 | 3/2017 | Klosin et al. |
| 9,605,098 B2 | 3/2017 | Klosin et al. |
| 9,643,900 B2 | 5/2017 | Arriola et al. |
| 2004/0005984 A1 | 1/2004 | Boussie et al. |
| 2011/0039082 A1 | 2/2011 | Yun et al. |
| 2011/0082249 A1 | 4/2011 | Shan et al. |
| 2011/0282018 A1 | 11/2011 | Klosin et al. |
| 2014/0330056 A1 | 11/2014 | Klosin et al. |
| 2014/0357918 A1 | 12/2014 | Klosin et al. |
| 2015/0337062 A1 | 11/2015 | Demirors et al. |
| 2015/0337063 A1 | 11/2015 | Demirors et al. |
| 2015/0344601 A1 | 12/2015 | Demirors et al. |
| 2015/0344602 A1 | 12/2015 | Demirors et al. |
| 2017/0101494 A1 | 4/2017 | Fontaine et al. |
| 2018/0186910 A1 | 7/2018 | Figueroa |

FOREIGN PATENT DOCUMENTS

| | | |
|---|---|---|
| JP | 2000159829 A | 6/2000 |
| JP | 2001525859 A | 12/2001 |
| JP | 2005523921 A | 8/2005 |
| JP | 2011525212 A | 9/2011 |
| JP | 2013521382 A | 6/2013 |
| JP | 2013534934 A | 9/2013 |
| JP | 2013541631 A | 11/2013 |
| JP | 2013544940 A | 12/2013 |
| WO | 9743294 A1 | 11/1997 |
| WO | 2004078795 A2 | 9/2004 |
| WO | 2007136494 A2 | 11/2007 |
| WO | 2007136496 A2 | 11/2007 |
| WO | 2010061630 A1 | 6/2010 |
| WO | 2011025784 A1 | 3/2011 |
| WO | 2011041696 A1 | 4/2011 |
| WO | 2011109563 A2 | 9/2011 |
| WO | 2011146044 A1 | 11/2011 |
| WO | 2011146291 A1 | 11/2011 |
| WO | 2012004683 A2 | 1/2012 |
| WO | 2012027448 A1 | 3/2012 |
| WO | 2012064630 A2 | 5/2012 |
| WO | 2013101375 A1 | 7/2013 |
| WO | 2014105411 A1 | 7/2014 |
| WO | 2014105412 A1 | 7/2014 |
| WO | 2014105413 A1 | 7/2014 |
| WO | WO-2014105414 A1 * | 7/2014 ............ C08F 2/001 |
| WO | 2014209927 A1 | 12/2014 |
| WO | 2015045928 A1 | 4/2015 |
| WO | 2015045930 A1 | 4/2015 |

OTHER PUBLICATIONS

Office Action pertaining to corresponding Chinese Patent Application No. 201680037010.X, dated Dec. 24, 2019.
Office Action dated Jun. 10, 2019 pertaining to U.S. Appl. No. 15/740,996, filed Dec. 29, 2017, 33 pgs.
Office Action pertaining to corresponding Brazilian Patent Application No. BR112017028174-0, dated Mar. 3, 2020.
Jian et al, "Rare-Earth-Metal-Hydrocarbyl Complexes Bearing Linked Cyclopentadienyl or Fluorenyl Ligands: Synthesis, Catalyzed Styrene Polymerization, and Structure-Reactivity Relationship", Chemistry—A European Journal, 2012, 2674-2684.
Hou et al., "Lanthanide(II) Complexes Bearing Linked Cyclopentadienyl-Anilido Ligands: Synthesis, Structures, and One-Electron-Transfer and Ethylene Polymerization Reactions", Organometallics, 2001, 3323-3328.
Hultzsch et al., "Single-Component Polymerization Catalysts for Ethylene and Styrene: Synthesis, Characterization, and Reactivity of Alkyl and Hydrido Yttrium Complexes Containing a Linked Amido-Cyclopentadienyl Ligand", Organometallics, 2002, 228-243.
Lou et al., "Half-sandwich rare-earth-metal derivatives bearing pyrrolidinyl-functionalized cyclopentadienyl ligand: synthesis, characterization and catalysis in syndiospecific polymerization of styrene", New Journal of Chemistry, 2013, 2675.
Jende et al., Rare-Earth-Metal Allyl Complexes Supported by the [2-(W,W-Dimethylamino)ethyl] tetramethylcyclopentadienyl Ligand: Structural Characterization, Reactivity, and Isoprene Polymerization, Organometallics, 2015, 32-41.
Office Action pertaining to corresponding Brazilian Patent Application No. BR112017025509-0, dated Mar. 3, 2020.
Office Action dated Jul. 12, 2019 pertaining to U.S. Appl. No. 15/763,937, filed Mar. 28, 2018, 28 pgs.
Balke et al.., Chromatography of Polymers, Chapter 13, pp. 199-219 (1992).
Bonvonsombat et al., "Regioselective Iodination of Phenol and Analogues Using N-Iodosuccinimide and p-toluenesulfonic Acid", Tetrahedrom Letters, 2009, 50: 22, 2664-2667.
Chinese Office Action dated Aug. 22, 2016 pertaining to Chinese Application No. 201380067366.4.
Chinese Office Action dated Jan. 25, 2018 pertaining to Chinese Application No. 201380065868.3.
Chinese Office Action dated May 3, 2017 pertaining to Chinese Application No. 201380065868.3.
Chinese Office Action dated Sep. 1, 2016 pertaining to Chinese Application No. 201380065868.3.

(56) References Cited

OTHER PUBLICATIONS

Chinese Office Action dated Nov. 1, 2017 pertaining to Chinese Application No. 201480033642.X.
Chinese Office Action pertaining to Chinese Patent Application No. 201380065667.3 dated Oct. 27, 2016.
Chinese Office Action pertaining to Chinese Patent Application No. 201380065848.6 dated Sep. 1, 2016.
Chinese Office Action pertaining to Chinese Patent Application No. 201380067367.9 dated May 11, 2017.
Chinese Office Action dated Aug. 19, 2016 pertaining to Chinese Patent Application No. 201380067367.9.
EP Communication Pursuant to Rules 161(1) and 162 EPC dated Aug. 4, 2015 for EPO Application No. 13811737.9.
EPO Communication pursuant to Rules 161(1) and 162 EPC dated Aug. 4, 2015 pertaining to European Patent Application No. 13811736.1.
EPO Communication pursuant to Rules 161(1) and 162 EPC dated Aug. 4, 2015 pertaining to European Patent Application No. 13812379.9.
European Search Report pertaining to European Patent Application Serial No. 14741484.1 dated Aug. 24, 2017.
Giorgio Soave, Chemical Engineering Science, 1972, vol. 27, pp. 1197-1203.
Han et al., "Synthesis of diindeno-Fused 4H-Cyclopenta[def]phenanthren-4-ones and Related Compounds via Benzannulated Enediynyl Propargylic Alcohols", J. Org. Chem., 2005, 70: 6, 2406-2408.
International Preliminary Report on Patentability pertaining to PCT/US2013/0073982 dated Jun. 30, 2015.
International Preliminary Report on Patentability pertaining to PCT/US2013/073976 dated Jun. 30, 2015.
International Preliminary Report on Patentability pertaining to PCT/US2013/073977 dated Mar. 18, 2014.
International Preliminary Report on Patentability pertaining to PCT/US2013/073979 dated Jul. 9, 2015.
International Preliminary Report on Patentability pertaining to PCT/US2013/073980 dated Jun. 30, 2015.
International Preliminary Report on Patentability pertaining to PCT/US2014/044374 dated Jan. 7, 2016.
International Preliminary Report on Patentability pertaining to PCT/US2014/044374 dated Dec. 29, 2015.
International Preliminary Report on Patentability pertaining to PCT/US2016/040568 dated Jan. 2, 2018.
International Preliminary Report on Patentability pertaining to PCT/US2016/040577 dated Jan. 2, 2018.
International Search Report and Written Opinion pertaining to PCT/US2013/073976 dated Mar. 18, 2014.
International Search Report and Written Opinion pertaining to PCT/US2013/073977 dated Jul. 9, 2015.
International Search Report and Written Opinion pertaining to PCT/US2013/073979 dated Mar. 18, 2014.
International Search Report and Written Opinion pertaining to PCT/US2013/073980 dated Mar. 18, 2014.
International Search Report and Written Opinion pertaining to PCT/US2013/073982 dated Mar. 18, 2014.
International Search Report and Written Opinion pertaining to PCT/US2014/044374 dated Aug. 28, 2014.
International Search Report and Written Opinion pertaining to PCT/US2016/040568 dated Sep. 26, 2016.
International Search Report and Written Opinion pertaining to PCT/US2016/040577 dated Sep. 30, 2016.
Monrabal et al., Macromol. Symp. 2007, 257, 71-79.
Supplementary Examination Report pertaining to Singapore Patent Application No. 11201503581P dated Sep. 18, 2017.
Thomas H. Mourey and Stephen T. Balke, Chromatography of Polymers, Chapter 12, pp. 180-198, (1992).
Yau, Wallace W., "Examples of Using 3D-GPC-TREF for Polyolefin Characterization", Macromol. Symp., 2007, 257, 29-45.
Zimm, Bruno H., Journal of Chemical Physics, vol. 16, 12, 1099-1116 (1948).
Japanese Office Action pertaining to Japan Patent Application No. 2015-550433 dated Jan. 9, 2018.
Japanese Office Action pertaining to Japan Patent Application No. 2015-550434 dated Jan. 9, 2018.
Office Action dated Apr. 16, 2018 pertaining to U.S. Appl. No. 15/357,931, 8 pages.
International Preliminary Report on Patentability pertaining to PCT/US2016/054088 dated Apr. 3, 2018.
International Preliminary Report on Patentability pertaining to PCT/US2016/054285 dated Apr. 3, 2018.
International Search Report and Written Opinion pertaining to PCT/US2016/054088 dated Dec. 19, 2016.
International Search Report and Written Opinion pertaining to PCT/US2016/054285 dated Dec. 21, 2016.
Office Action Pertaining to U.S. Appl. No. 15/433,198, dated May 22, 2018, 7 pages.
Notice of Allowance pertaining to U.S. Appl. No. 15/357,901, dated May 16, 2018, 29 pages.
Office Action dated Oct. 25, 2019 pertaining to U.S. Appl. No. 15/763,937, filed Mar. 28, 2018, 5 pgs.
Notice of Allowance and Fee(s) Due dated Nov. 14, 2019 pertaining to U.S. Appl. No. 15/740,996, filed Dec. 29, 2017, 8 pgs.
Office Action dated Apr. 27, 2020 pertaining to U.S. Appl. No. 15/763,945, filed Mar. 28, 2018, 49 pgs.
U.S. Notice of Allowance and Fee(s) Due dated Aug. 12, 2020 pertaining to U.S. Appl. No. 15/763,945, filed Mar. 28, 2018, 11 pgs.

* cited by examiner $$\% \text{ Crystallinity} = ((H_f)/(292 \text{ J/g})) \times 100$$

Equation 1
FIG. 1

$$gi' = (IV_{Sample,i} / IV_{linear\ reference,i})$$

Equation 2
FIG. 2

$$\frac{IV_{Sample,i}}{IV_{linear\ reference,i}} = \left[ \left( 1 + \frac{B_{n,i}}{7} \right)^{1/2} + \frac{4}{9} \frac{B_{n,i}}{\pi} \right]^{-1/2}_{M_{i=j}}$$

Equation 3
FIG. 3

$$LCBf = \frac{\sum\limits_{i} \left( \frac{B_{n,i}}{M_i = /14000} \right) c_i}{\sum c_i}$$

$M = 3500$

Equation 4
FIG. 4

$$M_{PE} = \left(\frac{K_{PS}}{K_{PE}}\right)^{1/a_{PE}+1} \cdot M_{PS}^{a_{PS}+1/a_{PE}+1}$$

*Equation 5*

FIG. 5

$$[\eta]_{PE} = K_{PS} \cdot M_{PS}^{a+1} / M_{PE}$$

*Equation 6*

FIG. 6

$$M_w = \sum_i w_i M_i = \sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS\ Area}{Conc.\ Area}$$

*Equation 7*

FIG. 7

$$IV = [\eta] = \sum_i w_i IV_i = \sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP\ Area}{Conc.\ Area}$$

*Equation 8*

FIG. 8

$$Mw_{cc} = \sum_i \left(\frac{C_i}{\sum_i C_i}\right) M_i = \sum_i w_i M_i$$

*Equation 9*
FIG. 9

$$[\eta]_{cc} = \sum_i \left(\frac{C_i}{\sum_i C_i}\right) IV_i = \sum_i w_i IV_i$$

*Equation 10*
FIG. 10

$$gpcBR = \left[\left(\frac{[\eta]_{cc}}{[\eta]}\right)\left(\frac{M_W}{M_{W,CC}}\right)^{a_{PE}} - 1\right]$$

*Equation 11*
FIG. 11

$$Resolution = \frac{\text{Peak temperature of NIST 1475a} - \text{Peak Temperature of Hexacontane}}{\text{Half-height Width of NIST 1475a} + \text{Half-height Width of Hexacontane}}$$

*Equation 12*
FIG. 12

$$CDC = \frac{\text{Comonomer Distribution Index}}{\text{Comonomer Distribution Shape Factor}} = \frac{\text{Comonomer Distribution Index}}{\text{Half Width/Stdev}} *100$$

*Equation 13*

FIG. 13

$$\int_{35}^{119.0} w_T(T)dT = 1$$

*Equation 14*

FIG. 14

$$\int_{35}^{T_{median}} w_T(T)dT = 0.5$$

*Equation 15*

FIG. 15

$$\ln(1-\text{comonomercontent}) = -\frac{207.26}{273.12+T} + 0.5533$$

$$R^2 = 0.997$$

*Equation 16*

FIG. 16

$$Stdev = \sqrt{\sum_{35.0}^{119.0} (T - Tp)2 * w_T(T)}$$

*Equation 17*

FIG. 17

$$ZSVR = \frac{\eta_{OB}}{\eta_{OL}}$$

*Equation 18*

FIG. 18

$$\eta_{OL} = 2.29 \times 10^{-15} M_{w\text{-}gpc}^{3.65}$$

*Equation 19*

FIG. 19

$$M_{polyethylene} = A(M_{polystyrene})^B$$

*Equation 20*

FIG. 20

POLYMERIZATION PROCESS FOR PRODUCING ETHYLENE BASED POLYMERS

FIELD OF INVENTION

The present disclosure relates to a polymerization process for producing ethylene-based polymers.

BACKGROUND OF THE INVENTION

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene is known for use in the manufacture of a wide a variety of articles. The polyethylene polymerization process can be varied in a number of respects to produce a wide variety of resultant polyethylene resins having different physical properties that render the various resins suitable for use in different applications. It is generally known that polyethylene can be produced in one or more conventional reactors e.g. loop reactors, spherical reactors, isothermal reactors, fluidized bed gas phase reactors, stirred tank reactors, batch reactors, in parallel, series, and/or any combinations thereof. In solution phase reactors, the ethylene monomers and optional one or more comonomers are present in a liquid diluent, such as an alkane or isoalkane, for example isobutane.

Despite the research efforts in developing catalyst systems suitable for polyolefin production, such as polyethylene and/or polypropylene polymerization, there is still a need for a pro-catalyst and a catalyst system exhibiting very high selectivity toward ethylene during ethylene/α-olefin copolymerization reactions and being able to produce higher molecular weight polymers at relatively higher reaction temperatures. Additionally, despite the research efforts in developing polyolefins, such as polyethylene-based copolymers, with improved properties, there is still a need for a polyethylene having improved properties.

High temperature, olefin polymerization catalysts that polymerize ethylene with very high selectivity in the presence of alpha-olefins (and particularly, 1-octene) are desirable. Catalyst of this type can be used to produce ethylene-based polymers with high molecular weight and zero long chain branching at high reactor temperatures with very high efficiency. The development of new and improved resins is expected to require catalysts with even higher selectivity towards ethylene in the presence alpha olefins (i.e. 1-octene) while sustaining high molecular weight capability and efficiency at least 190° C. reactor temperatures than currently available catalysts.

SUMMARY OF THE INVENTION

In one embodiment, the present disclosure provides a polymerization process for producing ethylene based polymers comprising polymerizing ethylene and optionally one or more α-olefins in the presence of a catalyst system in a reactor system having one or more reactors, wherein the catalyst system comprises;

(a) one or more procatalysts comprising a metal-ligand complex of formula (I) below:

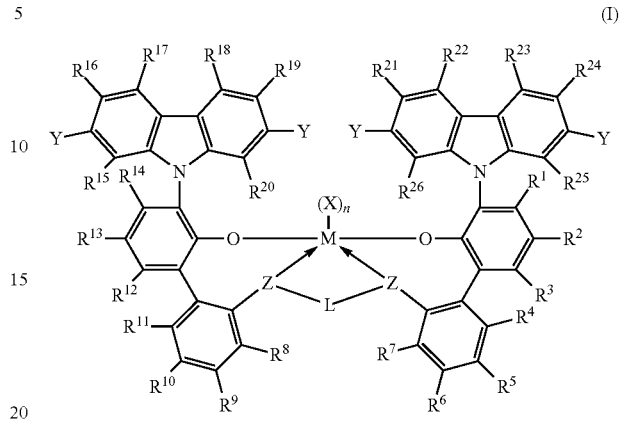

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, N($C_1$-$C_{40}$)hydrocarbyl, or P($C_1$-$C_{40}$)hydrocarbyl; and L is ($C_2$-$C_{40}$)hydrocarbylene or ($C_2$-$C_{40}$)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the ($C_2$-$C_{40}$)heterohydrocarbylene has a portion that comprises a 2-atom to 10-atom linker backbone linking the Z atoms in formula (I), wherein each of the 2 to 10 atoms of the 2-atom to 10-atom linker backbone of the ($C_2$-$C_{40}$)heterohydrocarbylene independently is a carbon atom or heteroatom, wherein each heteroatom independently is O, S, S(O), S(O)$_2$, Si($R^C$)$_2$, P($R^P$), or N($R^N$), wherein independently each $R^C$ is ($C_1$-$C_{40}$)hydrocarbyl, each $R^P$ is ($C_1$-$C_{40}$)hydrocarbyl; and each $R^N$ is ($C_1$-$C_{40}$)hydrocarbyl or absent; and $R^{1-26}$ are each independently selected from the group consisting of a ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom, and any combination thereof, each of the hydrocarbyl, heterohydrocarbyl, Si($R^C$)$_3$, Ge($R^C$)$_3$, P($R^P$)$_2$, N($R^N$)$_2$, O$R^C$, S$R^C$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted ($C_1$-$C_{18}$)alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted $(C_1-C_{18})$hydrocarbylene, wherein each R independently is an unsubstituted $(C_1-C_{18})$hydrocarbyl;

when $R^7$ is H, then $R^8$ is a $(C_1-C_{40})$hydrocarbyl; $(C_1-C_{40})$ heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$— or halogen atom; or when $R^8$ is H, then $R^7$ is a $(C_1-C_{40})$ hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$— or halogen atom;

optionally two or more R groups of the $R^{1-26}$ groups (for example, from $R^{1-7}$, $R^{8-14}$, $R^{8-11}$, $R^{1-3}$, $R^{4-7}$, $R^{15-20}$, $R^{21-26}$) can combine together into ring structures with such ring structures having from 3 to 50 atoms in the ring excluding any hydrogen atoms; and Y has the formula $-T(R^d)_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen atoms, and any combination thereof.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIGS. 1-20 illustrate Formulae 1-20, respectively.

DETAILED DESCRIPTION OF THE INVENTION

In a first embodiment, the disclosure provides a polymerization process for producing ethylene based polymers comprising polymerizing ethylene and optionally one or more α-olefins in the presence of a catalyst system in a reactor system having one or more reactors, wherein the catalyst system comprises;

(a) one or more procatalysts comprising a metal-ligand complex of formula (I) below:

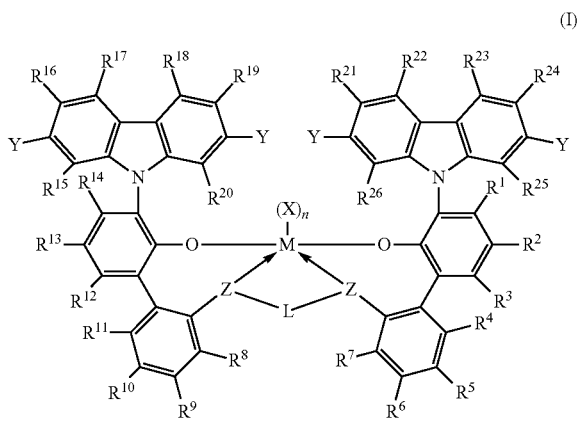

(I)

wherein:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and each Z independently is O, S, $N(C_1-C_{40})$hydrocarbyl, or $P(C_1-C_{40})$hydrocarbyl; and L is $(C_2-C_{40})$hydrocarbylene or $(C_2-C_{40})$heterohydrocarbylene, wherein the $(C_2-C_{40})$hydrocarbylene has a portion that comprises a 2-carbon atom to 10-carbon atom linker backbone linking the Z atoms in formula (I) (to which L is bonded) and the $(C_2-C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_2-C_{40})$heterohydrocarbylene independently is a carbon atom or heteroatom, wherein each heteroatom independently is O, S, S(O), $S(O)_2$, $Si(R^C)_2$, $P(R^P)$, or $N(R^N)$, wherein independently each $R^C$ is $(C_1-C_{40})$hydrocarbyl, each $R^P$ is $(C_1-C_{40})$hydrocarbyl; and each $R^N$ is $(C_1-C_{30})$hydrocarbyl or absent; and $R^{1-26}$ are each independently selected from the group consisting of a $(C_1-C_{40})$hydrocarbyl, $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, halogen atom, hydrogen atom, and any combination thereof, each of the hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents, each $R^S$ independently is a halogen atom, polyfluoro substitution, perfluoro substitution, unsubstituted $(C_1-C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C=N$—, NC—, $RC(O)O$—, ROC(O)—, RC(O)N(R)—, or $R_2NC(O)$—, or two of the $R^S$ are taken together to form an unsubstituted $(C_1-C_{18})$hydrocarbylene, wherein each R independently is an unsubstituted $(C_1-C_{18})$hydrocarbyl;

when $R^7$ is H, then $R^8$ is a $(C_1-C_{40})$hydrocarbyl; $(C_1-C_{40})$ heterohydrocarbyl; $Si(R^C)_3$, $Ge(R^C)_3$, $P(R^P)_2$, $N(R^N)^2$, $OR^C$, $SR^C$, $NO_2$, CN, $CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$— or halogen atom; or when $R^8$ is H, then $R^7$ is a $(C_1-C_{40})$ hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)2$-, $(R^C)_2C=N$—, $R^CC(O)O$—, $R^COC(O)$—, $R^CC(O)N(R)$—, $(R^C)_2NC(O)$— or halogen atom;

optionally two or more R groups of the $R^{1-26}$ groups (for example, from $R^{1-7}$, $R^{8-14}$, $R^{8-11}$, $R^{1-3}$, $R^{4-7}$, $R^{15-20}$, $R^{21-26}$) can combine together into ring structures with such ring structures having from 3 to 50 atoms in the ring excluding any hydrogen atoms; and Y has the formula $-T(R^d)_b$ and contains more than four non-hydrogen atoms, wherein T is, independently for each Y occurrence, selected from the group consisting of C, Si, Ge, N, O, S, P or a combination thereof and wherein T is substituted with $R^d$ substituents, b being an integer from 1 to 3, depending on the valency of T and $R^d$, each $R^d$ is a substituent and is selected from the group consisting of hydrogen, $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen atoms, and any combination thereof.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and poly-cyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 20 carbon atoms (i.e., $(C_1-C_{20})$hydrocarbyl), and still more preferably a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^S$, which is a $(C_{18}-C_5)$alkyl, respectively. Preferably, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl; unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_6-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on a same carbon atom (e.g., $-CH_2-$) or on adjacent carbon atoms (i.e., 1,2-diradicals), or are spaced apart by one, two, or more intervening carbon atoms (e.g., respective 1,3-diradicals, 1,4-diradicals, etc.). Preferred is a 1,2-, 1,3-, 1,4-, or an alpha,omega-diradical, and more preferably a 1,2-diradical. The alpha, omega-diradical is a diradical that has maximum carbon backbone spacing between the radical carbons. More preferred is a 1,2-diradical, 1,3-diradical, or 1,4-diradical version of $(C_6-C_{18})$arylene, $(C_3-C_{20})$cycloalkylene, or $(C_2-C_{20})$alkylene.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{40})$alkylene are unsubstituted $(C_1-C_{20})$alkylene, including unsubstituted 1,2-$(C_2-C_{10})$alkylene; 1,3-$(C_3-C_{10})$alkylene; 1,4-$(C_4-C_{10})$alkylene; $-CH_2-$, $-CH_2CH_2-$, $-(CH_2)_3-$, $-CH_2CHCH_3$, $-(CH_2)_4-$, $-(CH_2)_5-$, $-(CH_2)_6-$, $-(CH_2)_7-$, $-(CH_2)_8-$, and $-(CH_2)_4C(H)(CH_3)-$. Examples of substituted $(C_1-C_{40})$alkylene are substituted $(C_1-C_{20})$alkylene, $-CF_2-$, $-C(O)-$, and $-(CH_2)_{14}C(CH_3)_2(CH_2)_5-$ (i.e., a 6,6-dimethyl substituted normal-1,20-eicosylene). Since as mentioned previously two $R^S$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3-C_{40})$cycloalkylene are 1,3-cyclopropylene, 1,1-cyclopropylene, and 1,2-cyclohexylene. Examples of substituted $(C_3-C_{40})$cycloalkylene are 2-oxo-1,3-cyclopropylene and 1,2-dimethyl-1,2-cyclohexylene.

The term "$(C_1-C_{40})$heterohydrocarbyl" means a heterohydrocarbon radical of from 1 to 40 carbon atoms and the term "$(C_1-C_{40})$heterohydrocarbylene means a heterohydrocarbon diradical of from 1 to 40 carbon atoms, and each heterohydrocarbon independently has one or more heteroatoms O; S; S(O); $S(O)_2$; $Si(R^C)_2$; $P(R^P)$; and $N(R^N)$, wherein independently each $R^C$ is unsubstituted $(C_1-C_{18})$hydrocarbyl, each $R^P$ is unsubstituted $(C_1-C_{18})$hydrocarbyl; and each $R^N$ is unsubstituted $(C_1-C_{18})$hydrocarbyl or absent (e.g., absent when N comprises $-N=$ or tri-carbon substituted N). The heterohydrocarbon radical and each of the heterohydrocarbon diradicals independently is on a carbon atom or heteroatom thereof, although preferably is on a carbon atom when bonded to a heteroatom in formula (I) or to a heteroatom of another heterohydrocarbyl or heterohydrocarbylene. Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

Preferably, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^C$)$_2$—, $(C_1-C_{40})$hydrocarbyl-N(R$^N$)—, $(C_1-C_{40})$hydrocarbyl-P(R$^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. The term "$(C_4-C_{40})$heteroaryl" means an unsubstituted or substituted (by one or more $R^S$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_4-C_{12})$heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical preferably is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-J]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The aforementioned heteroalkyl and heteroalkylene groups are saturated straight or branched chain radicals or diradicals, respectively, containing $(C_1-C_{40})$ carbon atoms, or fewer carbon atoms as the case may be, and one or more of the heteroatoms Si(R$^C$)$_2$, P(R$^P$), N(R$^N$), N, O, S, S(O), and S(O)$_2$ as defined above, wherein each of the heteroalkyl and heteroalkylene groups independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F$^-$), chloride (Cl$^-$), bromide (Br$^-$), or iodide (I$^-$) anion.

Unless otherwise indicated herein the term "heteroatom" means O, S, S(O), S(O)$_2$, Si(R$^C$)$_2$, P(R$^P$), or N(R$^N$), wherein independently each R$^C$ is unsubstituted $(C_1-C_{18})$hydrocarbyl, each R$^P$ is unsubstituted $(C_1-C_{18})$hydrocarbyl; and each R$^N$ is unsubstituted $(C_1-C_{18})$hydrocarbyl or absent (absent when N comprises —N═). Preferably, there are no O—O, S—S, or O—S bonds, other than O—S bonds in an S(O) or S(O)$_2$ diradical functional group, in the metal-ligand complex of formula (I). More preferably, there are no O—O, N—N, P—P, N—P, S—S, or O—S bonds, other than O—S bonds in an S(O) or S(O)$_2$ diradical functional group, in the metal-ligand complex of formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds or triple bonds, not including any such double bonds that may be present in substituents $R^S$, if any, or in (hetero)aromatic rings, if any.

M is titanium, zirconium, or hafnium. In one embodiment, M is zirconium or hafnium, and in another embodiment M is hafnium. In some embodiments, M is in a formal oxidation state of +2, +3, or +4. In some embodiments, n is 0, 1, 2, or 3. Each X independently is a monodentate ligand that is neutral, monoanionic, or dianionic; or two Xs are taken together to form a bidentate ligand that is neutral, monoanionic, or dianionic. X and n are chosen in such a way that the metal-ligand complex of formula (I) is, overall, neutral. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, HC(O)O$^-$, $(C_1-C_{40})$hydrocarbylC(O)O$^-$, HC(O)N(H)$^-$, $(C_1-C_{40})$hydrocarbylC(O)N(H)$^-$, $(C_1-C_{40})$hydrocarbylC(O)N(($C_1-C_{20}$)hydrocarbyl)$^-$, R$^K$R$^L$B$^-$, R$^K$R$^L$N$^-$, R$^K$O$^-$, R$^K$S$^-$, R$^K$R$^L$P$^-$, or R$^M$R$^K$R$^L$Si$^-$, wherein each R$^K$, R$^L$, and R$^M$ independently is hydrogen, $(C_1-C_{40})$hydrocarbyl, or $(C_1-C_{40})$heterohydrocarbyl, or R$^K$ and R$^L$ are taken together to form a $(C_2-C_{40})$hydrocarbylene or $(C_1-C_{40})$heterohydrocarbylene and R$^M$ is as defined above.

In some embodiments at least one monodentate ligand of X independently is the neutral ligand. In one embodiment, the neutral ligand is a neutral Lewis base group that is R$^X$NR$^K$R$^L$, R$^K$OR$^L$, R$^K$SR$^L$, or R$^X$PR$^K$R$^L$, wherein each R$^X$ independently is hydrogen, $(C_1-C_{40})$hydrocarbyl, [$(C_1-C_{10})$hydrocarbyl]$_3$Si, [$(C_1-C_{10})$hydrocarbyl]$_3$Si($C_1-C_{10}$)hydrocarbyl, or $(C_1-C_{40})$heterohydrocarbyl and each R$^K$ and R$^L$ independently is as defined above.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or R$^K$R$^L$N— wherein each of R$^K$ and R$^L$ independently is an unsubstituted $(C_1-C_{20})$hydrocarbyl. In some embodiments each monodentate ligand X is a chlorine atom, $(C_1-C_{10})$ hydrocarbyl (e.g., ($C_1$-$C_6$)alkyl or benzyl), unsubstituted ($C_1$-$C_{10}$)hydrocarbylC(O)O—, or $R^K R^L$N— wherein each of $R^K$ and $R^L$ independently is an unsubstituted ($C_1$-$C_{10}$) hydrocarbyl.

In some embodiments there are at least two X and the two X are taken together to form the bidentate ligand. In some embodiments the bidentate ligand is a neutral bidentate ligand. In one embodiment, the neutral bidentate ligand is a diene of formula ($R^D$)$_2$C=C($R^D$)—C($R^D$)=C($R^D$)$_2$, wherein each $R^D$ independently is H, unsubstituted ($C_1$-$C_6$) alkyl, phenyl, or naphthyl. In some embodiments the bidentate ligand is a monoanionic-mono(Lewis base) ligand. The monoanionic-mono(Lewis base) ligand may be a 1,3-dionate of formula (D): $R^E$—C(O$^-$)=CH—C(=O)—$R^E$ (D), wherein each $R^D$ independently is H, unsubstituted ($C_1$-$C_6$) alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., $^-$O$_2$CC(O)O$^-$), ($C_2$-$C_{40}$)hydrocarbylene dicarbanion, ($C_1$-$C_{40}$)heterohydrocarbylene dicarbanion, phosphate, or sulfate.

As previously mentioned, number and charge (neutral, monoanionic, dianionic) of X are selected depending on the formal oxidation state of M such that the metal-ligand complex of formula (I) is, overall, neutral.

In some embodiments each X is the same, wherein each X is methyl; ethyl; 1-propyl; 2-propyl; 1-butyl; 2,2,-dimethylpropyl; trimethylsilylmethyl; phenyl; benzyl; or chloro. In some embodiments n is 2 and each X is the same.

In some embodiments at least two X are different. In some embodiments n is 2 and each X is a different one of methyl; ethyl; 1-propyl; 2-propyl; 1-butyl; 2,2,-dimethylpropyl; trimethylsilylmethyl; phenyl; benzyl; and chloro.

The integer n indicates number of X. In one embodiment, n is 2 or 3 and at least two X independently are monoanionic monodentate ligands and a third X, if present, is a neutral monodentate ligand. In some embodiments n is 2 at two X are taken together to form a bidentate ligand. In some embodiments, the bidentate ligand is 2,2-dimethyl-2-silapropane-1,3-diyl or 1,3-butadiene.

Each Z independently is O, S, N($C_1$-$C_{40}$)hydrocarbyl, or P($C_1$-$C_{40}$)hydrocarbyl. In some embodiments each Z is different. In some embodiments one Z is O and one Z is NCH$_3$. In some embodiments one Z is O and one Z is S. In some embodiments one Z is S and one Z is N($C_1$-$C_{40}$) hydrocarbyl (e.g., NCH$_3$). In some embodiments each Z is the same. In some embodiments each Z is O. In some embodiments each Z is S. In some embodiments each Z is N($C_1$-$C_{40}$)hydrocarbyl (e.g., NCH$_3$). In some embodiments at least one, and in some embodiments each Z is P($C_1$-$C_{40}$) hydrocarbyl (e.g., PCH$_3$).

L is ($C_2$-$C_{40}$)hydrocarbylene or (2 to 40 atom, wherein such atom is not H)heterohydrocarbylene, wherein the ($C_2$-$C_{40}$)hydrocarbylene has a portion that comprises a 2-carbon atom to 10-carbon atom linker backbone linking the Z atoms in formula (I) (to which L is bonded) and the (2 to 40 atom, wherein such atom is not H)heterohydrocarbylene has a portion that comprises a 2-atom to 10-atom linker backbone linking the Z atoms in formula (I), wherein each of the from 2 to 10 atoms of the 2-atom to 10-atom linker backbone of the (2 to 40 atom, wherein such atom is not H) heterohydrocarbylene independently is a carbon atom or heteroatom, wherein each heteroatom independently is C($R^C$)$_2$, O, S, S(O), S(O)$_2$, Si($R^C$)$_2$, P($R^P$), or N($R^N$), wherein independently each $R^C$ is ($C_1$-$C_{40}$)hydrocarbyl, each $R^P$ is ($C_1$-$C_{40}$) hydrocarbyl; and each $R^N$ is ($C_1$-$C_{40}$)hydrocarbyl or absent.

In some embodiments L is the ($C_2$-$C_{40}$)hydrocarbylene. Preferably the aforementioned portion that comprises a 2-carbon atom to 10-carbon atom linker backbone of the ($C_2$-$C_{40}$)hydrocarbylene of L comprises a 2-carbon atom to 10-carbon atom, and more preferably a 2-carbon atom or 4-carbon atom linker backbone linking the Z atoms in formula (I) to which L is bonded. In some embodiments L comprises the 3-carbon atom linker backbone (e.g., L is —CH$_2$CH$_2$CH$_2$—; —CH(CH$_3$)CH$_2$CH(CH$_3$)—; —CH(CH$_3$)CH(CH$_3$)CH(CH$_3$)—; —CH$_2$C(CH$_3$)$_2$CH$_2$—); 1,3-cyclopentane-diyl; or 1,3-cyclohexane-diyl. In some embodiments L comprises the 4-carbon atom linker backbone (e.g., L is —CH$_2$CH$_2$CH$_2$CH$_2$—; —CH$_2$C(CH$_3$)$_2$C(CH$_3$)$_2$CH$_2$—; 1,2-bis(methylene)cyclohexane; or 2,3-bis(methylene)-bicyclco[2.2.2]octane). In some embodiments L comprises the 5-carbon atom linker backbone (e.g., L is —CH$_2$CH$_2$CH$_2$CH$_2$CH$_2$— or 1,3-bis(methylene)cyclohexane). In some embodiments L comprises the 6-carbon atom linker backbone (e.g., L is —CH$_2$CH$_2$CH$_2$CH$_2$CH$_2$CH$_2$— or 1,2-bis(ethylene)cyclohexane).

In some embodiments, L is the ($C_2$-$C_{40}$)hydrocarbylene and the ($C_2$-$C_{40}$)hydrocarbylene of L is a ($C_2$-$C_{12}$)hydrocarbylene, and more preferably ($C_2$-$C_8$)hydrocarbylene. In some embodiments the ($C_2$-$C_{40}$)hydrocarbylene is an unsubstituted ($C_2$-$C_{40}$)alkylene. In some embodiments the ($C_2$-$C_{40}$)hydrocarbylene is a substituted ($C_2$-$C_{40}$)alkylene. In some embodiments the ($C_2$-$C_{40}$)hydrocarbylene is an unsubstituted ($C_2$-$C_{40}$)cycloalkylene or substituted ($C_2$-$C_{40}$)cycloalkylene, wherein each substituent independently is $R^S$, wherein preferably the $R^S$ independently is ($C_1$-$C_4$)alkyl.

In some embodiments L is the unsubstituted ($C_2$-$C_{40}$) alkylene, and in some other embodiments, L is an acyclic unsubstituted ($C_2$-$C_{40}$)alkylene, and still more preferably the acyclic unsubstituted ($C_2$-$C_{40}$)alkylene is, —CH$_2$CH$_2$CH$_2$—, cis —CH(CH$_3$)CH$_2$CH(CH$_3$)—, trans —CH(CH$_3$)CH$_2$CH(CH$_3$)—, —CH(CH$_3$)CH$_2$CH(CH$_3$)$_2$—, —CH(CH$_3$)CH(CH$_3$)CH(CH$_3$)—, —CH$_2$C(CH$_3$)$_2$CH$_2$—, —CH$_2$CH$_2$CH$_2$CH$_2$—, or —CH$_2$C(CH$_3$)$_2$C(CH$_3$)$_2$CH$_2$—. In some embodiments L is trans-1,2-bis(methylene)cyclopentane, cis-1,2-bis(methylene)cyclopentane, trans-1,2-bis(methylene)cyclohexane, or cis-1,2-bis(methylene)cyclohexane. In some embodiments the ($C_1$-$C_{40}$)alkylene-substituted ($C_1$-$C_{40}$)alkylene is exo-2,3-bis(methylene) bicyclo[2.2.2]octane or exo-2,3-bis(methylene)-7,7-dimethyl-bicyclo[2.2.1]heptane. In some embodiments L is the unsubstituted ($C_3$-$C_{40}$)cycloalkylene, and in some other embodiments, L is cis-1,3-cyclopentane-diyl or cis-1,3-cyclohexane-diyl. In some embodiments L is the substituted ($C_3$-$C_{40}$)cycloalkylene, and more preferably L is a ($C_1$-$C_{40}$) alkylene-substituted ($C_3$-$C_{40}$)cycloalkylene, and in some other embodiments, L is the ($C_1$-$C_{40}$)alkylene-substituted ($C_3$-$C_{40}$)cycloalkylene that is exo-bicyclo[2.2.2]octan-2,3-diyl.

In some embodiments L is the (2 to 40 atoms)heterohydrocarbylene. In some embodiments, the aforementioned portion that comprises a 2-atom to 6-atom linker backbone of the (2 to 40 atoms)heterohydrocarbylene of L comprises a from 3-atom to 5-atom, and in some other embodiments a 3-atom or 4-atom linker backbone linking the Z atoms in formula (I) to which L is bonded. In some embodiments L comprises the 3-atom linker backbone (e.g., L is —CH$_2$CH$_2$CH(OCH$_3$)—, —CH$_2$Si(CH$_3$)$_2$CH$_2$—, or). The "—CH$_2$Si(CH$_3$)$_2$CH$_2$—" may be referred to herein as a 1,3-diradical of 2,2-dimethyl-2-silapropane. In some embodiments L comprises the 4-atom linker backbone (e.g., L is —CH$_2$CH$_2$OCH$_2$— or —CH$_2$P(CH$_3$)CH$_2$CH$_2$—). In some embodiments L comprises the 5-atom linker backbone (e.g., L is —CH$_2$CH$_2$OCH$_2$CH$_2$— or —CH$_2$CH$_2$N(CH$_3$)CH$_2$CH$_2$—). In some embodiments L comprises the 6-atom linker backbone (e.g., L is —CH$_2$CH$_2$C(OCH$_3$)$_2$CH$_2$CH$_2$CH$_2$—, —CH$_2$CH$_2$CH$_2$S(O)$_2$CH$_2$CH$_2$—, or —CH$_2$CH$_2$S(O)CH$_2$CH$_2$CH$_2$—). In some embodiments each of the from 2 to 6 atoms of the linker backbone is a carbon atom. In some embodiments at least one heteroatom is the C(R$^C$)$_2$. In some embodiments at least one heteroatom is the Si(R$^C$)$_2$. In some embodiments at least one heteroatom is the O. In some embodiments at least one heteroatom is the N(R$^N$). In some embodiments, there are no O—O, S—S, or O—S bonds, other than O—S bonds in the S(O) or S(O)$_2$ diradical functional group, in —Z-L-Z—. In some other embodiments, there are no O—O, N—N, P—P, N—P, S—S, or O—S bonds, other than O—S bonds in an S(O) or S(O)$_2$ diradical functional group, in —Z-L-Z—. In some embodiments, the (2 to 40 atoms)heterohydrocarbylene is (2 to 11 atoms, excluding H)heterohydrocarbylene, and in some other embodiments (2 to 7 atoms)heterohydrocarbylene. In some embodiments the (3 to 7 atoms)heterohydrocarbylene of L is —CH$_2$Si(CH$_3$)$_2$CH$_2$—; —CH$_2$CH$_2$Si(CH$_3$)$_2$CH$_2$—; or CH$_2$Si(CH$_3$)$_2$CH$_2$CH$_2$—. In some embodiments, the (C$_1$-C$_7$)heterohydrocarbylene of L is —CH$_2$Si(CH$_3$)$_2$CH$_2$—, —CH$_2$Si(CH$_2$CH$_3$)$_2$CH$_2$—, —CH$_2$Si(isopropyl)$_2$CH$_2$—, —CH$_2$Si(tetramethylene)CH$_2$—, or —CH$_2$Si(pentamethylene)CH$_2$—. The —CH$_2$Si(tetramethylene)CH$_2$— is named 1-silacyclopentan-1,1-dimethylene. The —CH$_2$Si(pentamethylene)CH$_2$— is named 1-silacyclohexan-1,1-dimethylene.

The disclosure further provides a polymerization process for producing ethylene based polymers in accordance with any embodiment disclosed herein except that L is (C$_3$-C$_{40}$)hydrocarbylene or (C$_3$-C$_{40}$)heterohydrocarbylene, wherein the (C$_3$-C$_{40}$)hydrocarbylene has a portion that comprises a 3-carbon atom to 10-carbon atom linker backbone linking the Z atoms in formula (I) (to which L is bonded) and the (C$_3$-C$_{40}$)heterohydrocarbylene has a portion that comprises a 3-atom to 10-atom linker backbone linking the Z atoms in formula (I), wherein each of the 3 to 10 atoms of the 3-atom to 10-atom linker backbone of the (C$_3$-C$_{40}$)heterohydrocarbylene independently is a carbon atom or heteroatom, wherein each heteroatom independently is O, S, S(O), S(O)$_2$, Si(R$^C$)$_2$, P(R$^P$), or N(R$^N$), wherein independently each R$^C$ is (C$_1$-C$_{30}$)hydrocarbyl, each R$^P$ is (C$_1$-C$_{30}$)hydrocarbyl; and each R$^N$ is (C$_1$-C$_{30}$)hydrocarbyl or absent.

In some embodiments the metal-ligand complex of formula (I) is a metal-ligand complex of any one of the following formulas:

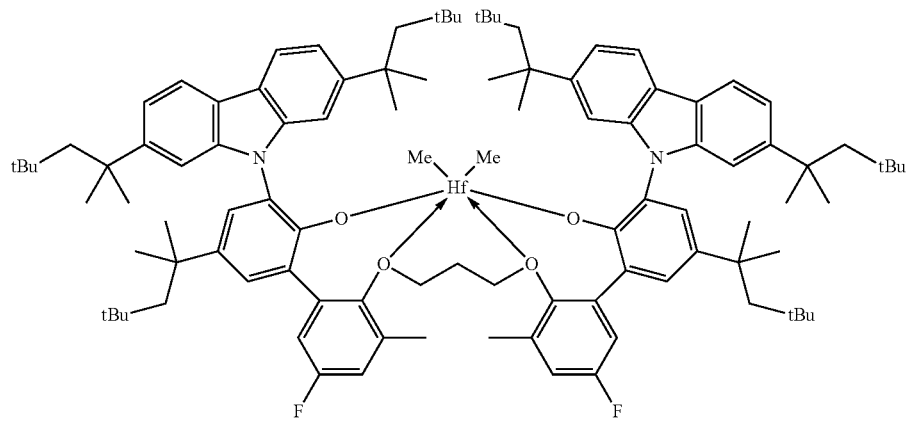

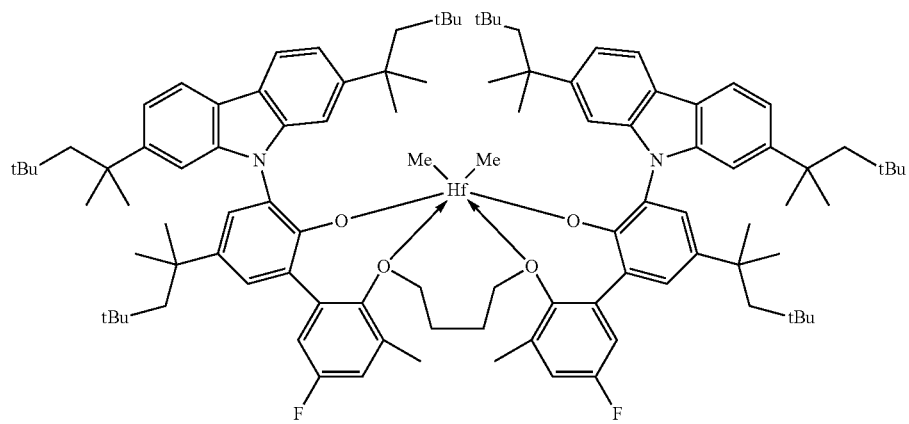

-continued
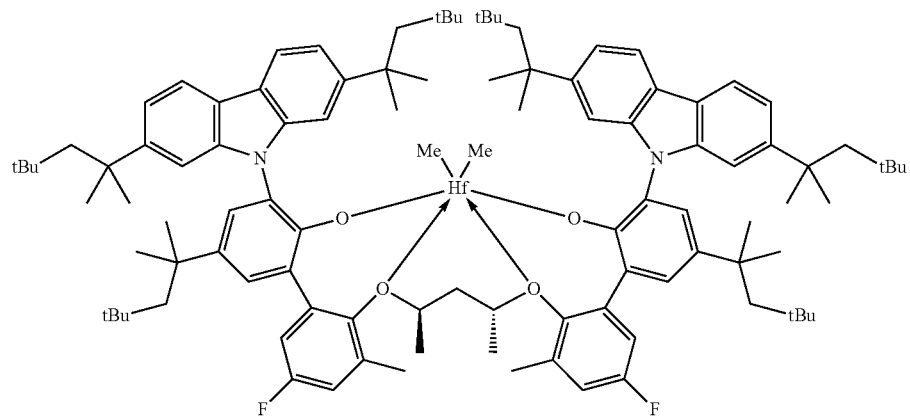
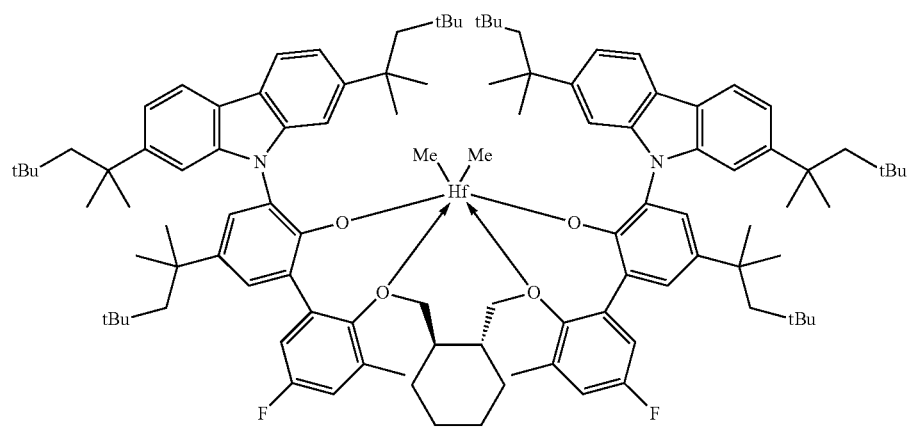
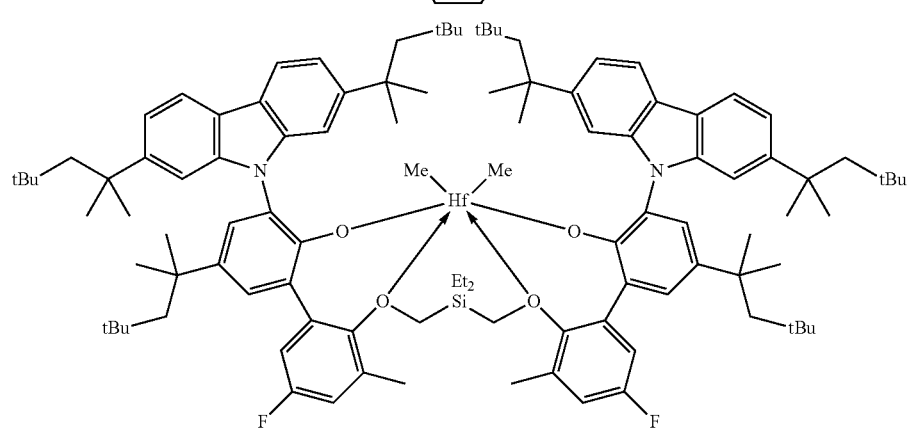
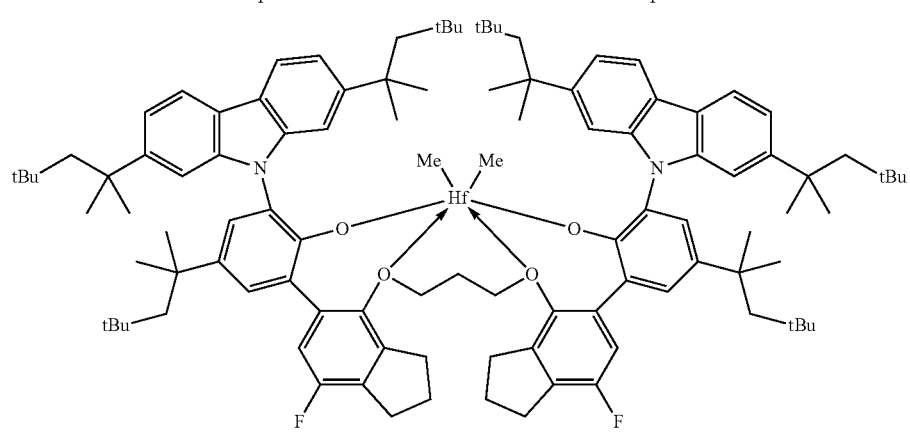

-continued
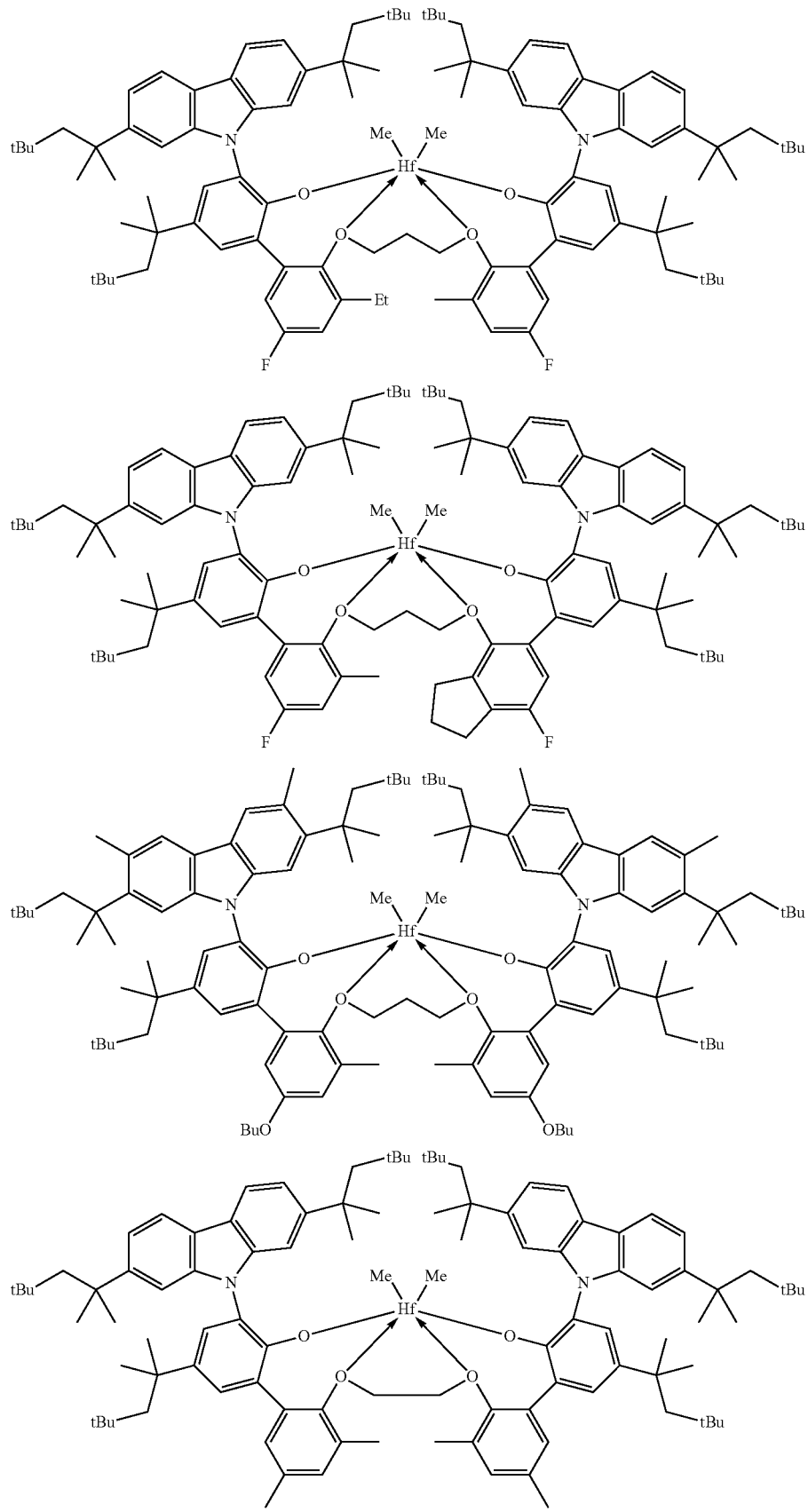

-continued
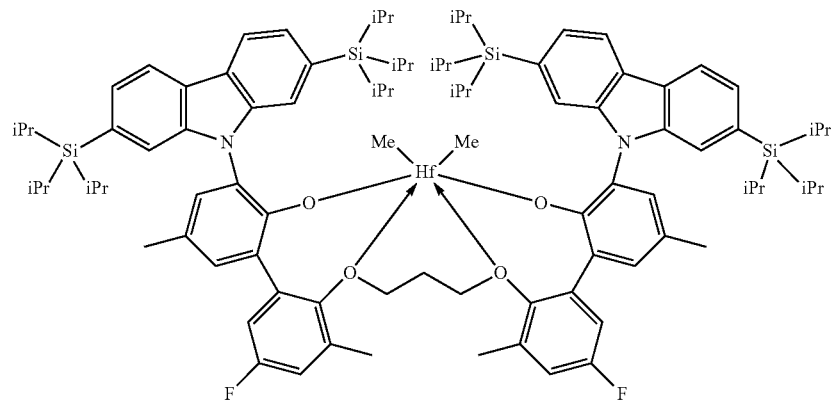
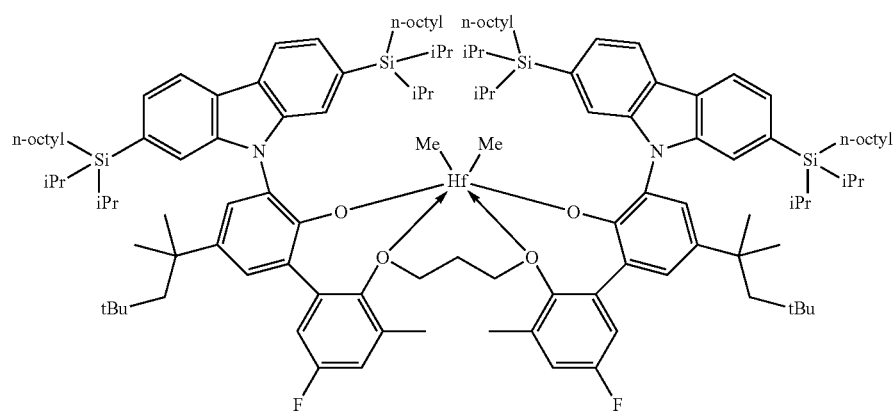
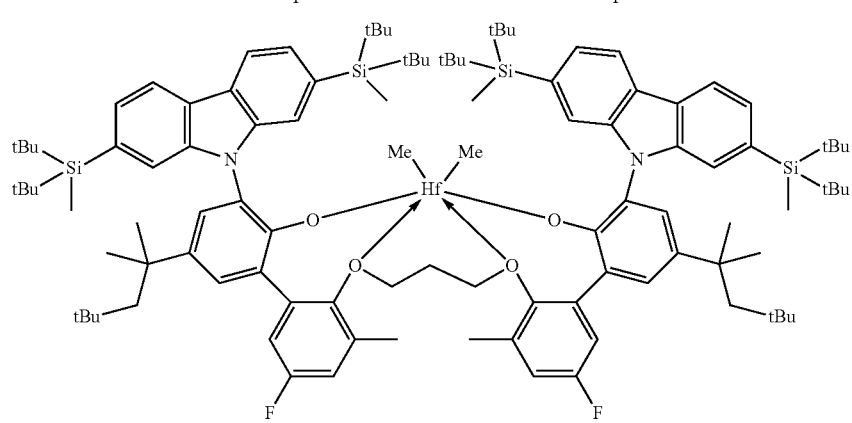
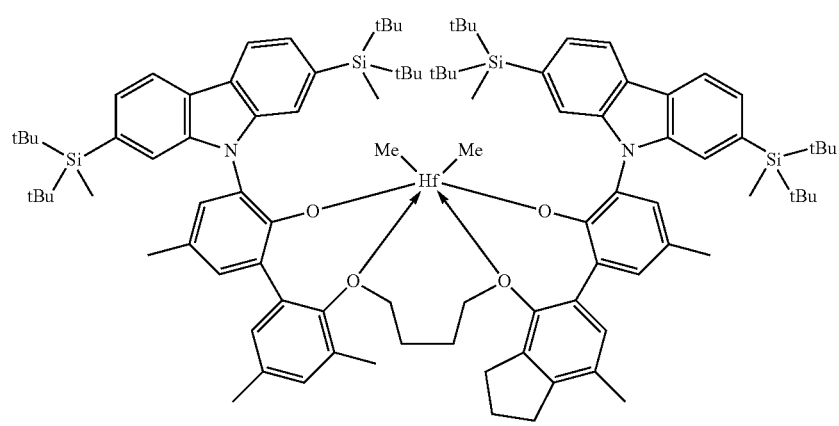

-continued
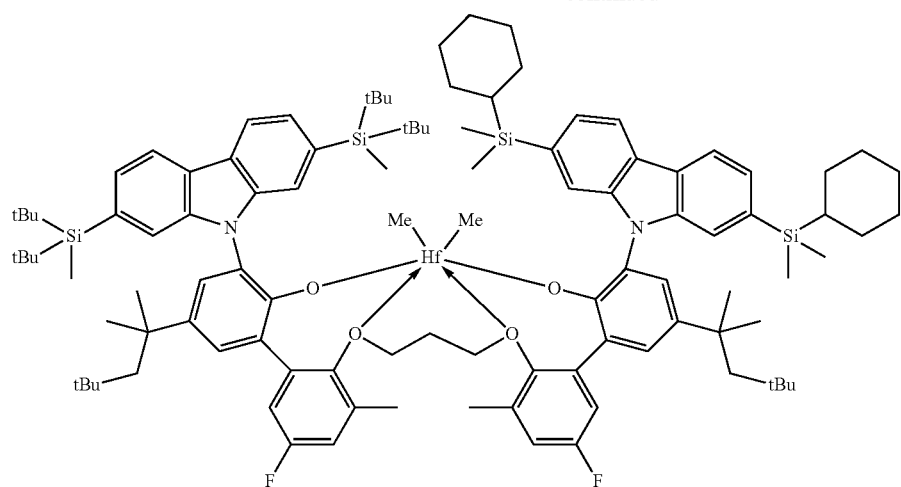
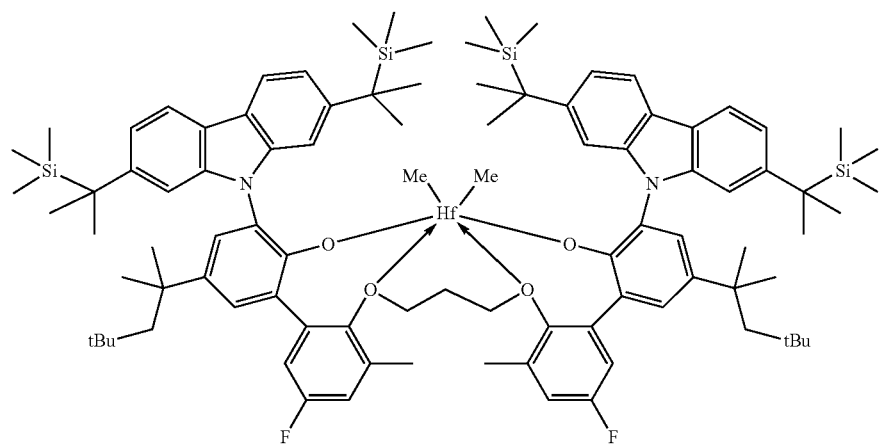
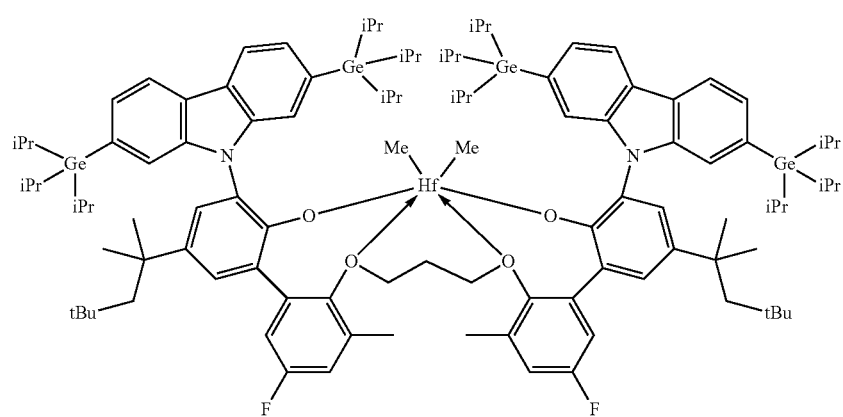

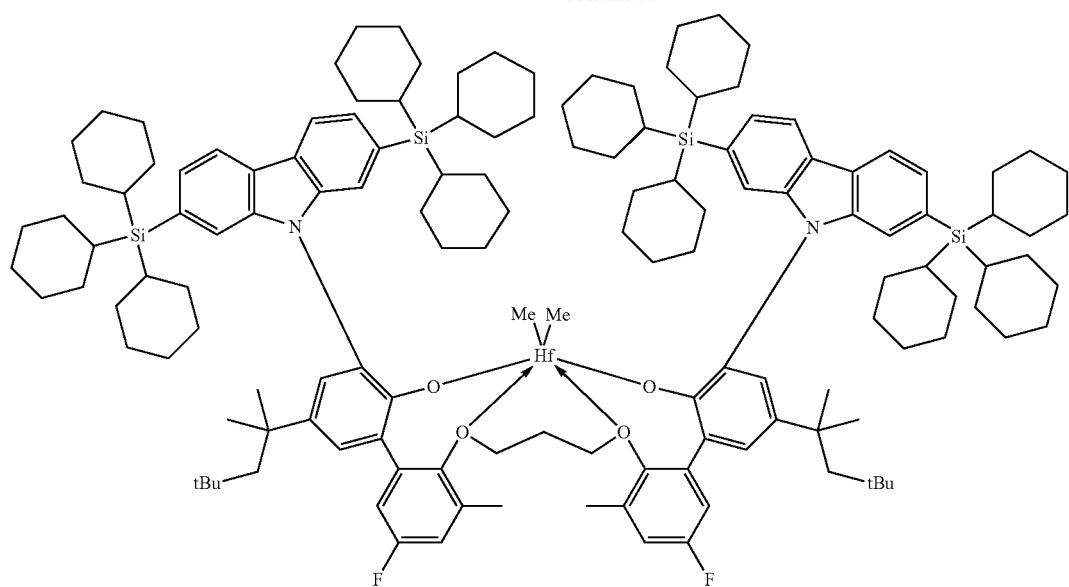
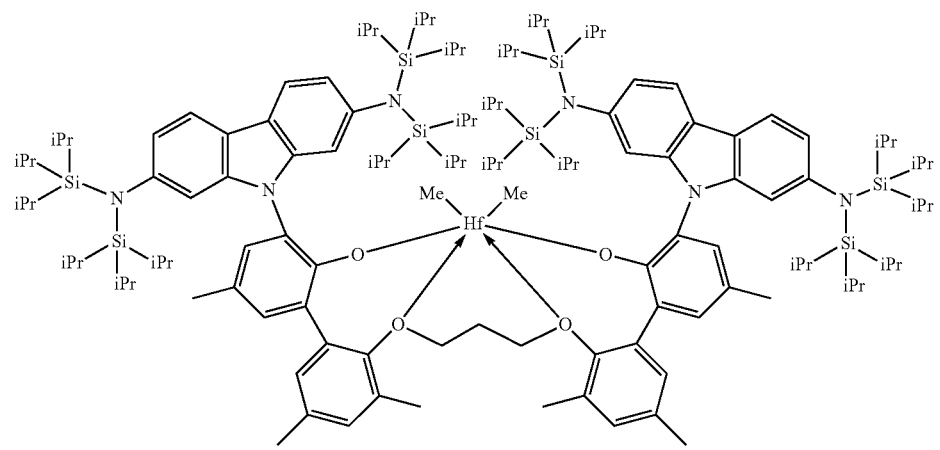
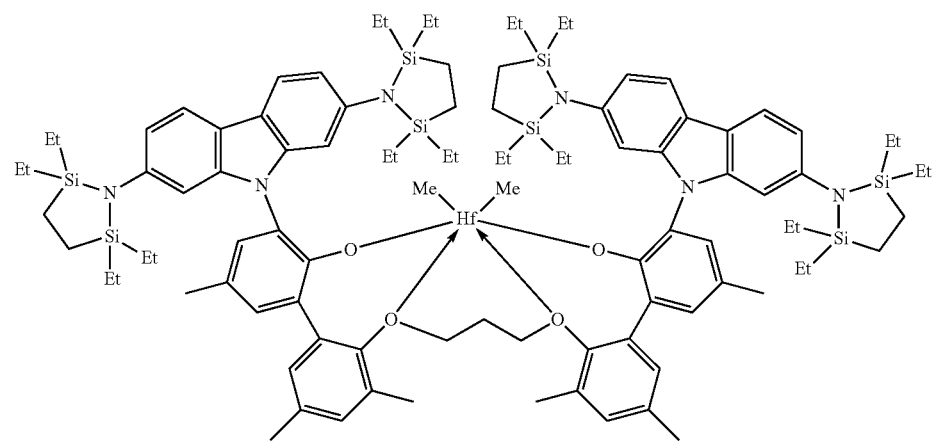

-continued
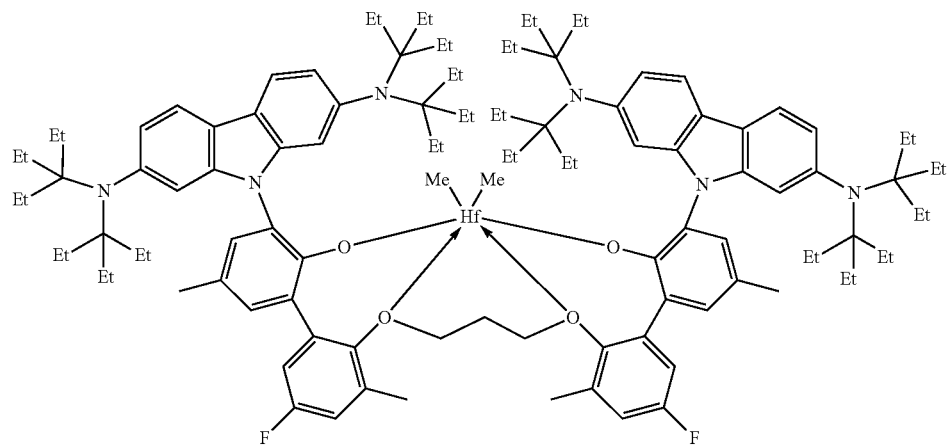
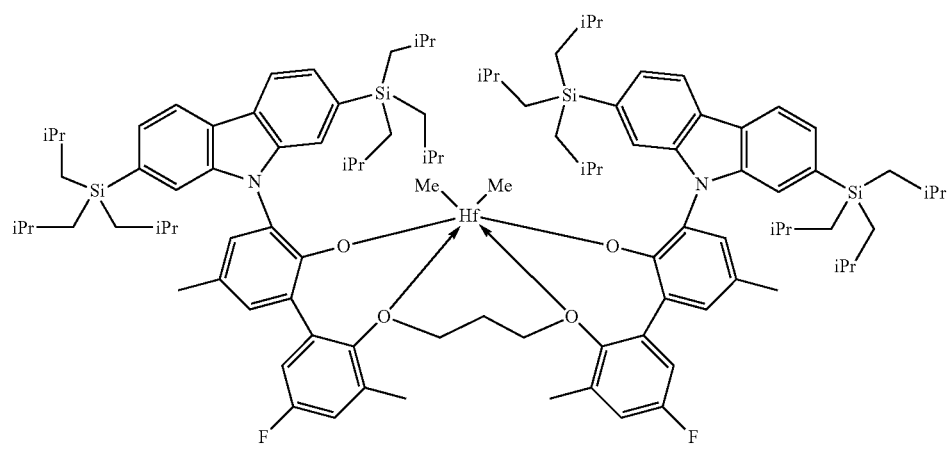
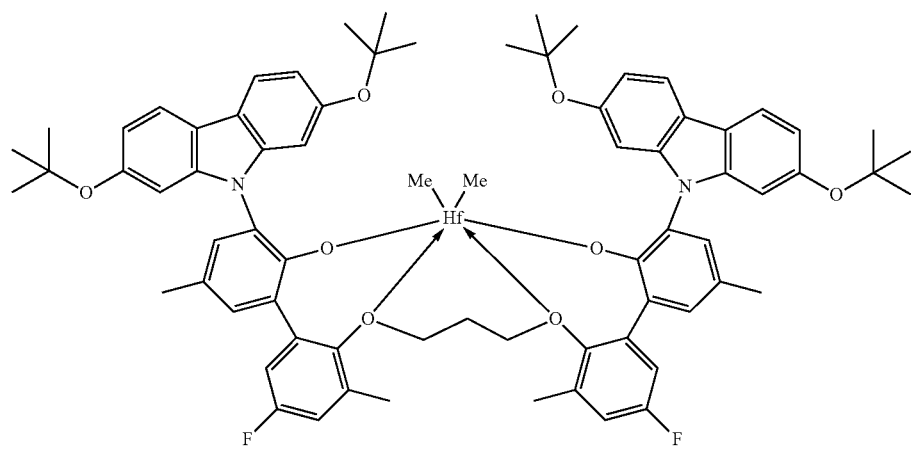

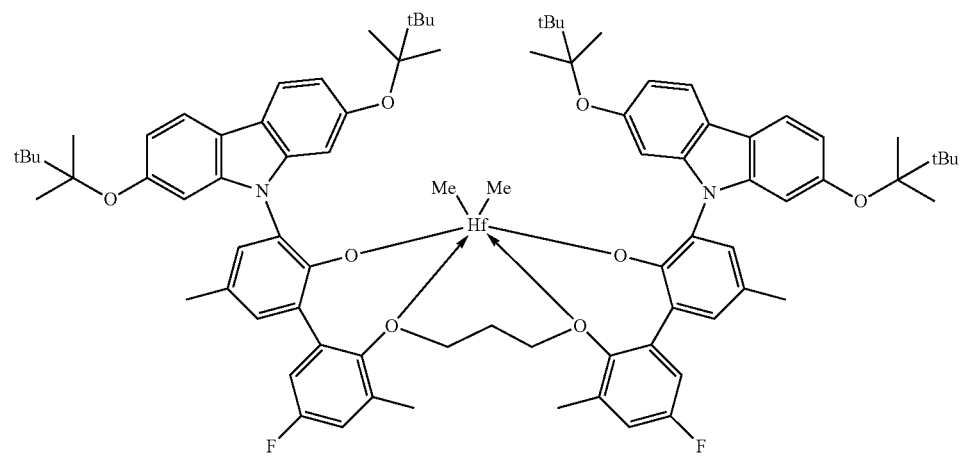
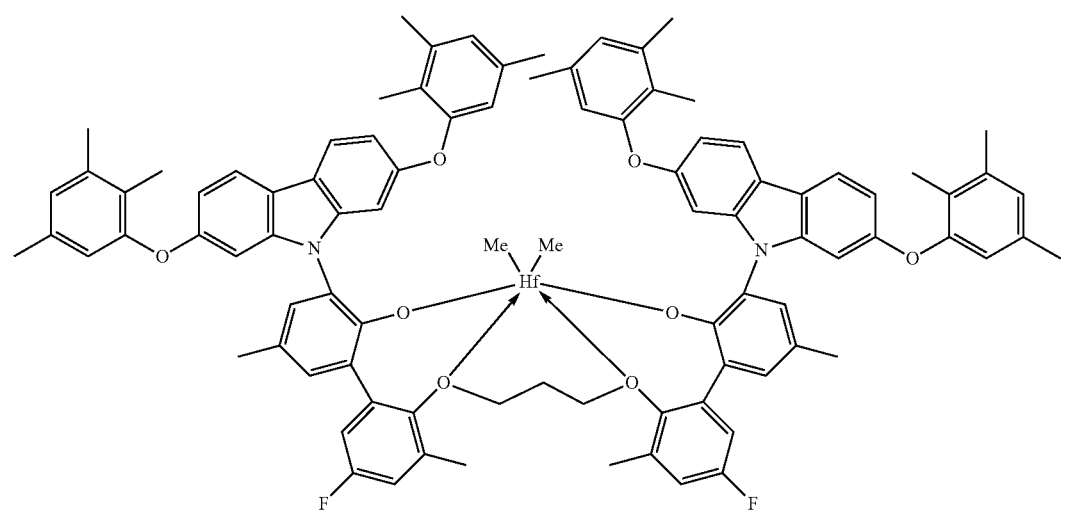
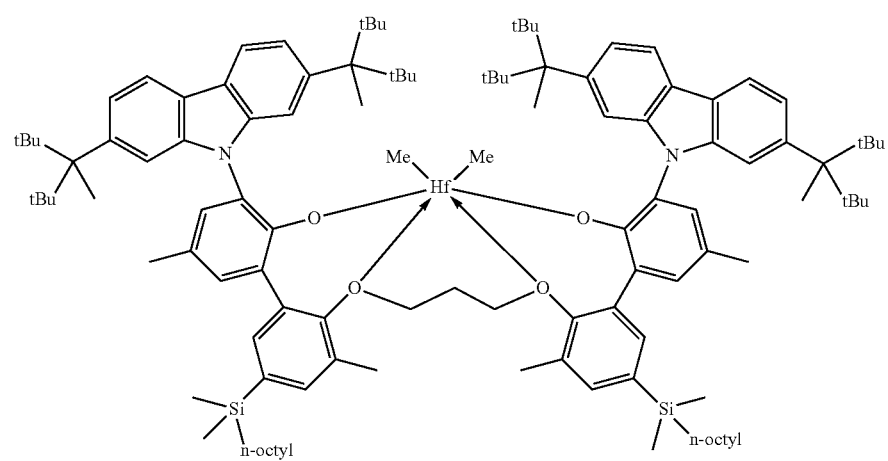

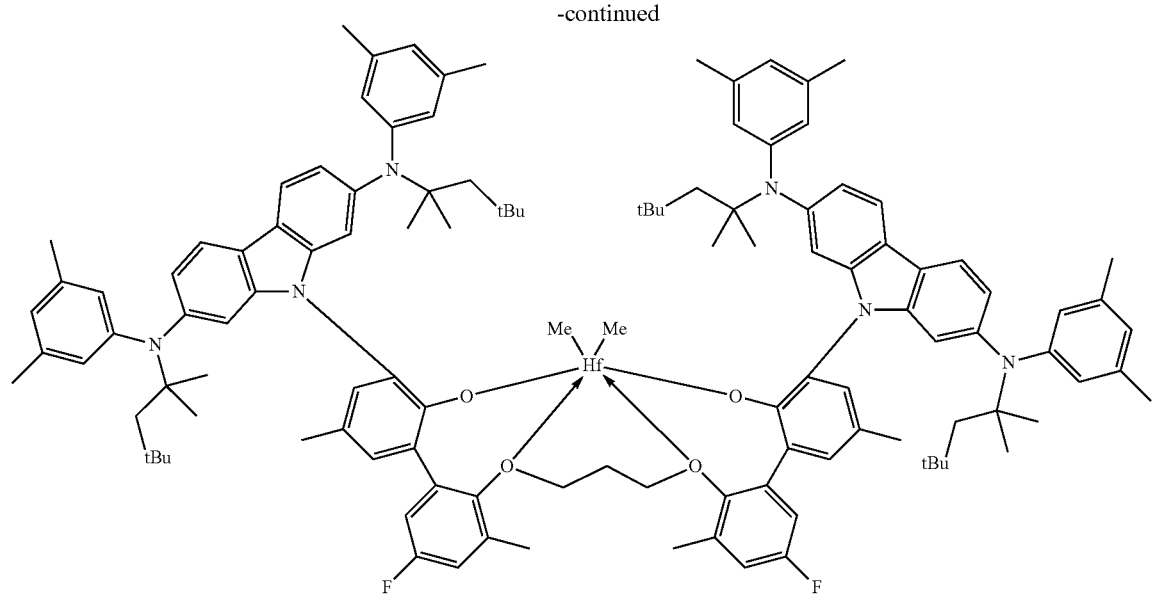
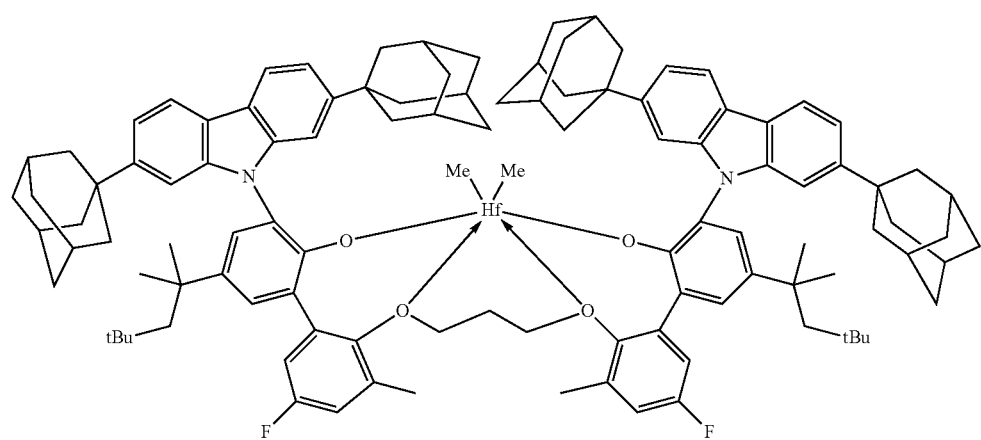
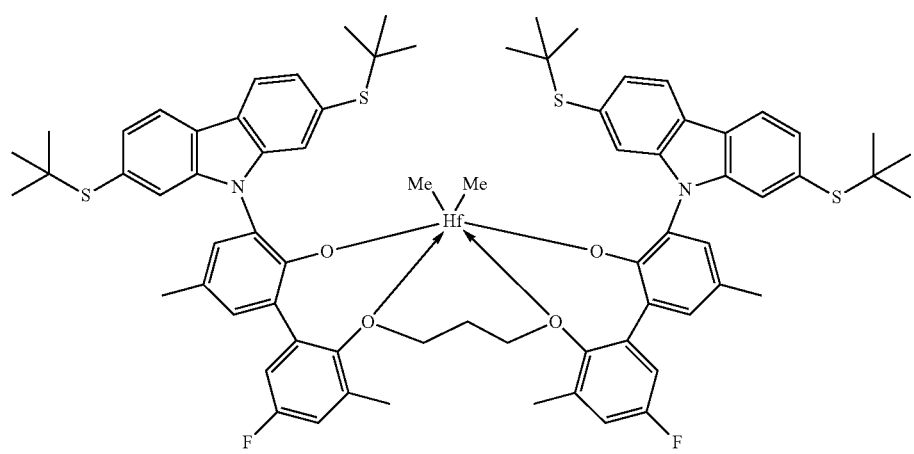

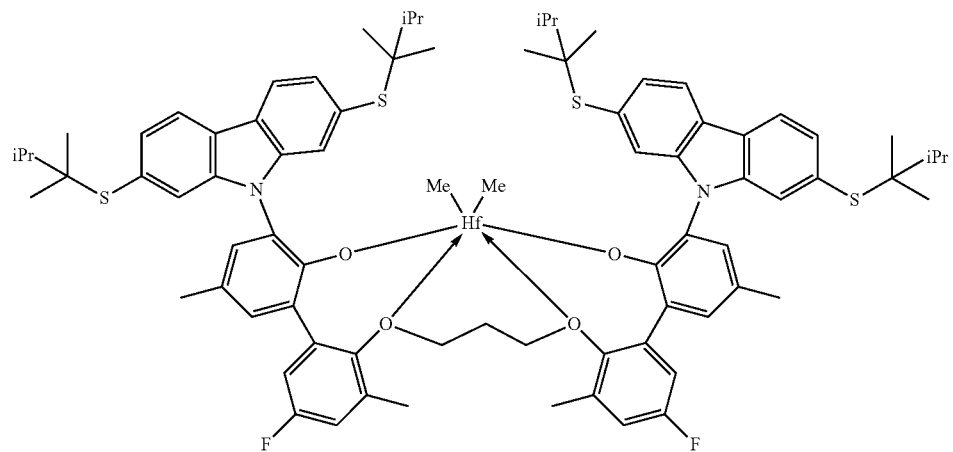
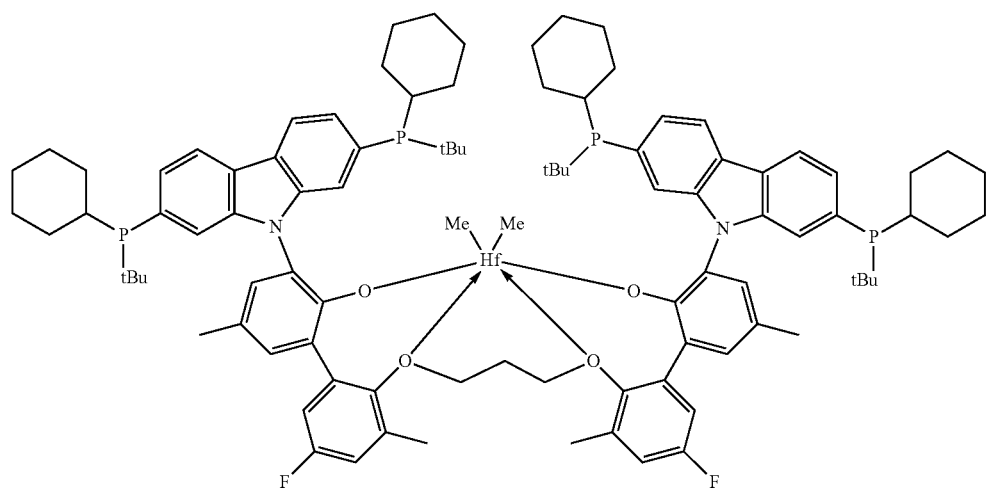
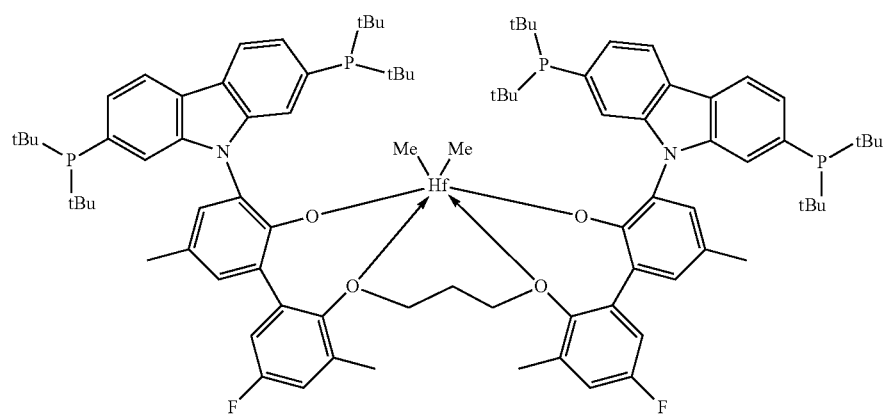

-continued

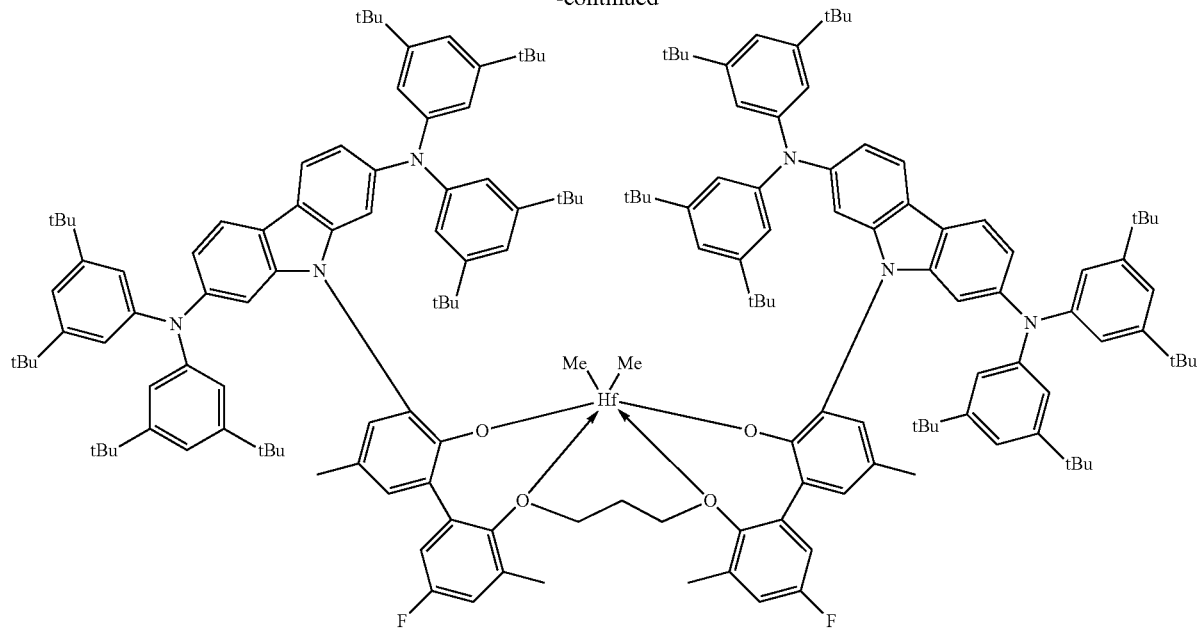

Co-Catalyst Component

The procatalyst comprising the metal-ligand complex of formula (I) may be rendered catalytically active, in some embodiments, by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, United States Patent Number (USPN) U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri(($C_1$-$C_{20}$)hydrocarbyl)ammonium tetra(($C_1$-$C_{20}$)hydrocarbyl)borane (e.g., bis(octadecyl)methylammonium tetrakis (pentafluorophenyl)borane). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 Bi beginning at column 50, at line 39, and going through column 56, at line 55, only the portion of which is incorporated by reference herein.

In some embodiments, the procatalyst comprising the metal-ligand complex of formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound.

The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

Polymerization Process Conditions

Any conventional polymerization processes may be employed to conduct the inventive process. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

The inventive process may occur in a solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 10 to 20 minutes. Ethylene, one or more solvents, one or more catalyst systems, e.g. a inventive catalyst system, optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In one embodiment, the inventive process occurs in a solution polymerization reactor in a dual reactor system, for example a dual loop or spherical reactor system, wherein ethylene and optionally one or more α-olefins are polymerized in the presence of the inventive catalyst system, as described herein, and optionally one or more cocatalysts. In one embodiment, the ethylene based polymer may be produced via solution polymerization in a dual reactor system, for example a dual loop reactor or spherical system, wherein ethylene and optionally one or more α-olefins are polymerized in the presence of the inventive catalyst system, as described herein, and optionally one or more other catalysts. The inventive catalyst system, as described herein, can be used in the first reactor, or second reactor, optionally in combination with one or more other catalysts. In one embodiment, the ethylene based polymer may be produced via solution polymerization in a dual reactor system, for example a dual loop or spherical reactor system, wherein ethylene and optionally one or more α-olefins are polymerized in the presence of the inventive catalyst system, as described herein, in both reactors.

In another embodiment, the inventive process occurs in a solution polymerization reactor in a single reactor system, for example a single loop or spherical reactor system, wherein ethylene and optionally one or more α-olefins are polymerized in the presence of the inventive catalyst system, as described herein, and optionally one or more cocatalysts.

In another embodiment, the inventive process occurs in a solution polymerization in a single reactor system, for example a single loop or spherical reactor system, wherein ethylene and optionally one or more α-olefins are polymerized in the presence of the inventive catalyst system, as described herein, optionally one or more other catalysts, and optionally one or more cocatalysts.

The procatalyst comprising the metal-ligand complex of formula (I) may be activated to form an active catalyst composition by combination with one or more cocatalysts, as described above, for example, a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-) amine, triethyl aluminum (TEA), and combinations thereof.

In another embodiment, the inventive process may occur in a solution polymerization reactor in a dual reactor system, for example a dual loop reactor system, wherein ethylene and optionally one or more α-olefins are polymerized in the presence of one or more catalyst systems.

In another embodiment, the inventive process may occur in a solution polymerization reactor in a single reactor system, for example a single loop reactor system, wherein ethylene and optionally one or more α-olefins are polymerized in the presence of one or more catalyst systems.

The inventive process may further occur in the presence of one or more additives. Such additives include, but are not limited to, antistatic agents, color enhancers, dyes, lubricants, pigments, primary antioxidants, secondary antioxidants, processing aids, UV stabilizers, and combinations thereof.

EXAMPLES

The following examples illustrate the present invention but are not intended to limit the scope of the invention.

Preparation of Comparative Catalyst A (Comp. Cat. A)

Comparative Catalyst A was prepared as described in WO 2014/105411 A1, the disclosure of which is incorporated herein by reference.

Preparation of Inventive Catalyst 1 (Inv. Cat. 1)

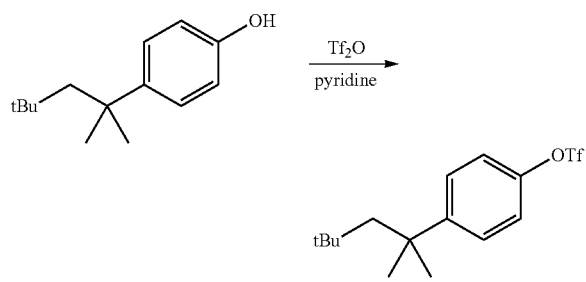

Preparation of 4-(2,4,4-trimethylpentan-2-yl)phenyl trifluoromethanesulfonate (as generally described in [1]Han, Xiaoqing; Zhang, Yanzhong; Wang, Kung K. *J. Org. Chem.* 2005, 70, 2406-2408): A three-necked round bottom flask was equipped with a magnetic stir bar, septa, and a nitrogen gas inlet. The flask was placed under nitrogen atmosphere and was charged with 4-(2,4,4-trimethylpentan-2-yl)phenol (15.0 g, 68.1 mmol) and pyridine dried over molecular sieves (40 mL). The solution was cooled to 0° C. (ice water bath). Trifluoromethanesulfonic anhydride (20 mL, 119 mmol) was added dropwise to the solution. Formation of gas occurred with some solid precipitating out of solution during the addition. The reaction was allowed to warm up to room temperature and was stirred at room temperature overnight. After 19 hours, the reaction was monitored by $^1$H NMR for completion. The reaction was poured into a flask containing a 1:1 mixture of water (150 mL) and diethyl ether (150 mL). The mixture was transferred to a separatory funnel and the phases were separated. The organic phase was washed with water (150 mL) and then 5% hydrochloric acid (150 mL). The organic phase was then dried over magnesium sulfate, filtered by vacuum filtration, and concentrated by rotary evaporation to afford 22.83 g (97.7%) of the product as crude yellow oil.

$^1$H NMR (500 MHz, CDCl$_3$) δ 7.43 (d, J=9.1 Hz, 2H), 7.17 (d, J=8.9 Hz, 2H), 1.74 (s, 2H), 1.37 (s, 6H), 0.70 (s, 9H). $^{13}$C NMR (101 MHz, CDCl$_3$) δ 150.82, 147.34, 127.91, 120.40, 56.99, 38.62, 32.35, 31.72, 31.42.

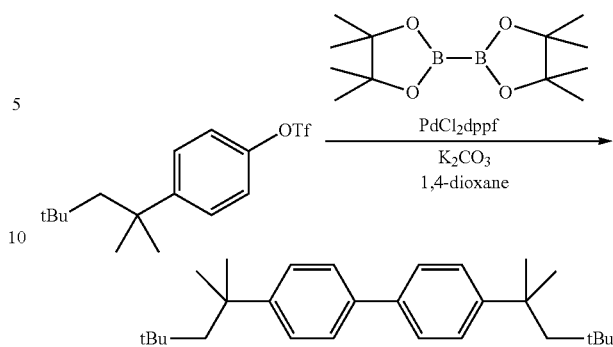

Preparation 4,4'-di-tert-octyl-1,1'-biphenyl

In a glove box, a three necked round bottom flask equipped with a magnetic stir bar and septa was charged with trifluoromethanesulfonate (23.4408 g, 69.2716 mmol), bis(pinacolato)diboron (8.7958 g, 34.637 mmol), anhydrous potassium carbonate (28.7 g, 207.8 mmol), [1,1'-bis(diphenylphosphino)ferrocene]dichloropalladium(II), dichloromethane adduct (2.2670 g, 2.7760 mmol), and anhydrous 1,4-dioxane (360 mL). The flask was taken to the hood and was equipped with a condenser and a nitrogen gas inlet. The reaction was placed under nitrogen atmosphere, heated at 80° C. The reaction was monitored by GC/MS. Additional [1,1'-bis(diphenylphosphino)ferrocene]dichloropalladium (II), dichloromethane adduct was added after 24 hours (2.2670 g, 2.7760 mmol), and 42 hours (2.2 g, 2.8 mmol). After 66 hours total, completion was not achieved. The reaction was allowed to cool to room temperature and was filtered via vacuum filtration. The solids were washed with three 50-mL portions of dichloromethane. The filtrate was concentrated by rotary evaporation and was then dissolved in ethyl acetate (250 mL). The solution was transferred to a separatory funnel and was washed with water (360 mL). An emulsion formed. Small amounts of aqueous sodium chloride solution were added until the emulsion finally broke. The phases were separated and the organic phase was washed with a 25% aqueous sodium hydroxide solution (360 ml). The phases were separated. The organic phase was dried over magnesium sulfate, filtered by vacuum filtration and concentrated by rotary evaporation to afford a crude black solid. The crude solid was stirred in acetone for about 30 minutes and then placed in the freezer overnight. The solids were filtered by vacuum filtration and washed with three 15-mL portions of cold acetone. The black solids were dissolved in chloroform and filtered through a pad of silica gel. The silica gel was washed with hexanes to remove any product that remained. The filtrate was concentrated by rotary evaporation to afford an off white solid. To remove traces of acetone, the solid was dissolved in dichloromethane and concentrated by rotary evaporation to afford an off white solid (repeated twice). The solid was dried under high vacuum to afford 5.88 g (44.9%).

$^1$H NMR (500 MHz, CDCl$_3$) δ 7.53 (d, J=8.1 Hz, 4H), 7.42 (d, J=8.2 Hz, 4H), 1.77 (s, 4H), 1.42-1.37 (m, 12H), 0.74 (s, 18H). $^{13}$C NMR (101 MHz, CDCl$_3$) δ 149.09, 137.83, 126.62, 126.28, 57.11, 38.57, 32.57, 32.00, 31.72.

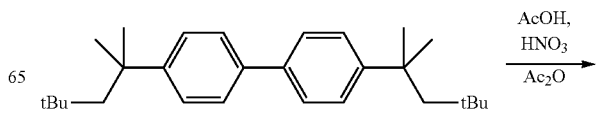

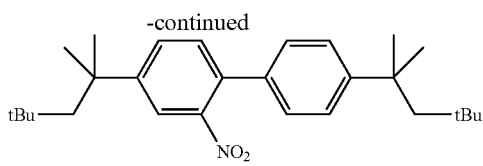

Preparation of 4,4'-di-tert-octyl-2-nitro-1,1'-biphenyl

A three-necked round bottom flask was equipped with a magnetic stir bar, a thermowell, an addition funnel, septa, and a nitrogen gas inlet. The flask was placed under nitrogen atmosphere and was charged with 4,4'-di-tert-octyl-1,1'-biphenyl (5.0 g, 13.2 mmol) and acetic anhydride (71 mL). To the stirred mixture was added chloroform (30 mL). The reaction was cooled using an ice water bath (internal temperature 5.3° C.). A mixture of nitric acid, 90% (1.4 mL, 30 mmol) and acetic acid (2.2 mL, 38 mmol) was added drop-wise to the cooled reaction (internal temperature monitored not to exceed 10° C.). The mixture was allowed to warm up to room temperature and was stirred at room temperature for 3.5 hours. The reaction was monitored by GC/MS. After 3.5 hours the reaction was determined to be complete. The reaction was added to a beaker of ice water (350 mL), mostly ice, and was stirred for 1.5 hours. The mixture was transferred to a separatory funnel for a phase separation and chloroform (30 mL) was added. The phases were separated. The organic phase was washed with two 55-mL portions of water, dried over magnesium sulfate, filtered by vacuum filtration, and concentrated by rotary evaporation to afford the crude product as a yellow oil. The oil was dissolved into a small amount of hexanes and was purified by column chromatography on the Isco CombiFlash system using a 330 g Grace column and a gradient of 5-10% dichloromethane in hexanes until the product eluded. The pure fractions were combined and concentrated by rotary evaporation to afford the product as a yellow oil. To remove traces of hexanes, the oil was dissolved in dichloromethane and concentrated by rotary evaporation to afford yellow oil (repeated twice). The oil was dried under high vacuum to afford 4.80 g (85.7%).

$^1$H NMR (400 MHz, CDCl$_3$) δ 7.80 (d, J=2.0 Hz, 1H), 7.59 (dd, J=8.1, 2.0 Hz, 1H), 7.41 (d, J=8.4 Hz, 2H), 7.35 (d, J=8.1 Hz, 1H), 7.23 (d, J=8.3 Hz, 2H), 1.80 (s, 2H), 1.76 (s, 2H), 1.42 (s, 6H), 1.39 (s, 6H), 0.77 (s, 9H), 0.74 (s, 9H). $^{13}$C NMR (101 MHz, CDCl$_3$) δ 151.03, 149.99, 149.12, 134.16, 133.14, 131.19, 129.93, 127.31, 126.40, 121.62, 57.05, 56.63, 38.73, 38.48, 32.39, 32.38, 31.86, 31.75, 31.39, 31.26.

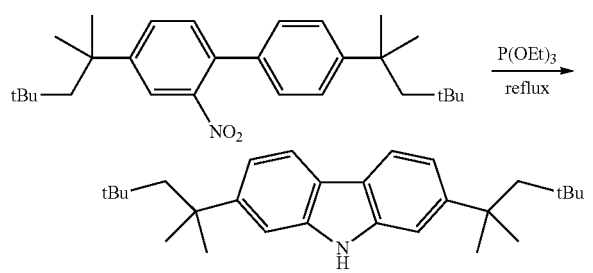

Preparation of 2,7-di-tert-octyl-9H-carbazole

In a glove box, a three-necked round bottom flask equipped with a magnetic stir bar was charged with 4,4'-di-tert-octyl-2-nitro-1,1'-biphenyl (7.4 g, 17.5 mmol) and triethylphosphite (21 mL, 0.12 mol). The flask was equipped with septa and transfer to a hood on where it was equipped with a condenser and a nitrogen gas inlet. The yellow solution was placed under nitrogen atmosphere and was heated at reflux (175° C.) for 4 hours. The reaction was monitored by GC/MS analysis. After 4 hours, the reaction was allowed to cool to room temperature. The yellow solution was transferred to a one-necked round bottom flask equipped with a magnetic stir bar and a short path distillation head. Excess triethylphosphite was removed by distillation under high vacuum. The mixture was heated from 75 to 125° C. until no further distillation occurred. The mixture was allowed to cool to warm temperature and a thick yellow oil remained. A 1:1 solution of methanol (32 mL) and ice water (32 mL) was added to the oil followed by dichloromethane (59 mL). Once the oil dissolved the mixture was transferred to a separatory funnel for a phase separation. A small emulsion formed between the two phases therefore dichloromethane was slowly added until the emulsion separated. The phases were separated. The organic phase was dried over magnesium sulfate, filtered by vacuum filtration, and concentrated by rotary evaporation to afford the crude product as a thick yellow oil. The oil was dissolved in a small amount of hexanes and ethyl acetate. The yellow solution was loaded onto the ISCO CombiFlash system using a 330 g Grace column and a gradient of 2-10% dichloromethane in hexanes until the product eluded. The pure fractions were combined and concentrated by rotary evaporation to afford an off white solid. To remove traces of hexanes, the solid was dissolved in dichloromethane and concentrated by rotary evaporation to afford the product as an off white solid (repeated twice). The solid was dried under high vacuum to afford 4.43 g (64.7%).

$^1$H NMR (400 MHz, CDCl$_3$) δ 8.00 (d, J=8.3 Hz, 2H), 7.85 (s, 1H), 7.46 (d, J=1.2 Hz, 1H), 7.35 (dd, J=8.3, 1.6 Hz, 2H), 1.92 (s, 4H), 1.54 (s, 12H), 0.81 (s, 18H). $^{13}$C NMR (101 MHz, CDCl$_3$) δ 147.87, 139.93, 120.82, 119.14, 118.32, 107.93, 57.25, 38.94, 32.42, 32.04, 31.80.

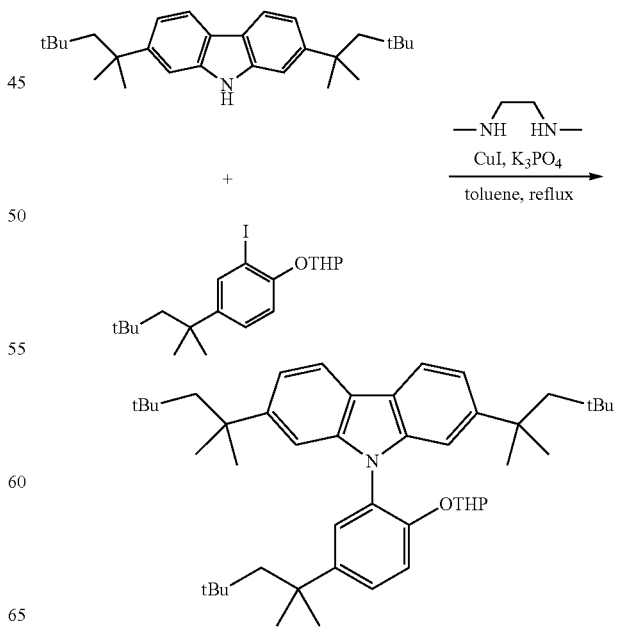

Preparation of 9-(2-((tetrahydro-2H-pyran-2-yl)oxy)-5-(2,4,4-trimethylpentan-2-yl)phenyl)-2,7-bis(2,4,4-trimethylpentan-2-yl)-9H-carbazole In a glove box, a three-necked round bottom flask equipped with a magnetic stir bar and septa was charged with 2,7-di-tert-octyl-9H-carbazole (6.8 g, 17.3 mmol), 2-(2-iodo-4-(2,4,4-trimethylpentan-2-yl)phenoxy)tetrahydro-2H-pyran (10.5480 g, 31.6871 mmol) potassium phosphate tribasic (14.4365 g, 34.6748 mmol), and dried toluene (44 mL). A mixture of anhydrous CuI (0.1122 g, 0.5891 mmol), N,N'-dimethylethylenediamine (0.24 mL, 2.25 mmol), and dried toluene (1 mL) was added to the flask. The flask was taken out of the glove box to the hood and was equipped with a condenser and a nitrogen gas inlet. The reaction was placed under nitrogen atmosphere and was heated at 125° C. for 163 hours. The reaction was monitored by UPLC analysis throughout that time: Additional reagents were added after 24 hours [CuI (0.1130 g, 0.5933 mmol) slurried in dried toluene (1 mL) and N,N-dimethylethylenediamine (0.2426 mL, 2.2537 mmol)]; after 48 hours, [CuI (0.1114 g, 0.5849 mmol) slurried in dried toluene (1 mL) and N,N-dimethylethylenediamine (0.24 mL, 2.25 mmol)], and after 72 hours [CuI (0.1098 g, 0.5765 mmol) slurried in dried toluene (1 mL) and N,N-dimethylethylenediamine (0.24 mL, 2.25 mmol)] due to starting carbazole remaining. After 163 hours, the reaction was allowed to cool to room temperature. The reaction mixture was filtered by vacuum filtration through a small silica plug. The plug was washed with three 20-mL portions of THF. The filtrate was concentrated by rotary evaporation to afford a crude reddish-brown oil. The oil was stirred and placed under vacuum for 5-10 minutes to remove excess toluene. The resulting brown solids (13.6690 g) were triturated in hot acetonitrile and were stirred for 5-10 minutes. The slurry was allowed to cool to room temperature and was placed in the freezer. The solids were scraped off the sides of the flask, filtered by vacuum filtration, and wash with three 10-mL portions of cold acetonitrile. To remove traces of acetonitrile, the solids was dissolved in dichloromethane and concentrated by rotary evaporation to afford a light brown crystalline solid (repeated twice). The solid was dried under high vacuum to afford 11.53 g (97.8%) of the product.

$^1$H NMR (400 MHz, CDCl$_3$) δ 7.99 (d, J=8.2 Hz, 2H), 7.50 (dd, J=8.6, 2.5 Hz, 1H), 7.46 (d, J=2.4 Hz, 1H), 7.37 (d, J=8.6 Hz, 1H), 7.30 (dt, J=8.3, 1.4 Hz, 2H), 7.14 (d, J=1.5 Hz, 1H), 7.07 (d, J=1.5 Hz, 1H), 5.26 (t, J=2.6 Hz, 1H), 3.62 (td, J=11.0, 2.8 Hz, 1H), 3.41 (dt, J=11.2, 3.9 Hz, 1H), 1.86-1.73 (m, 6H), 1.43 (s, 6H), 1.41-1.38 (m, 12H), 1.26-1.17 (m, 2H), 1.13 (dp, J=8.7, 4.4, 3.9 Hz, 2H), 0.82 (s, 9H), 0.71 (s, 9H), 0.70 (s, 9H). $^{13}$C NMR (101 MHz, CDCl$_3$) δ 151.33, 147.56, 147.39, 144.39, 142.09, 142.06, 128.13, 126.85, 126.84, 120.57, 120.52, 118.78, 118.76, 118.15, 118.10, 117.05, 107.51, 107.48, 97.04, 61.49, 57.23, 57.16, 57.08, 38.95, 38.92, 38.20, 32.54, 32.44, 32.37, 32.34, 31.84, 31.75, 31.74, 31.69, 31.66, 31.58, 31.52, 29.90, 24.93, 17.78.

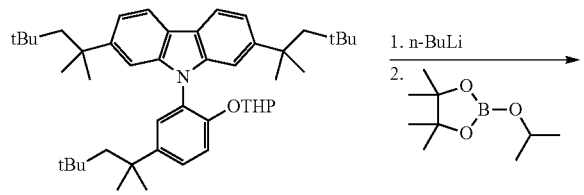

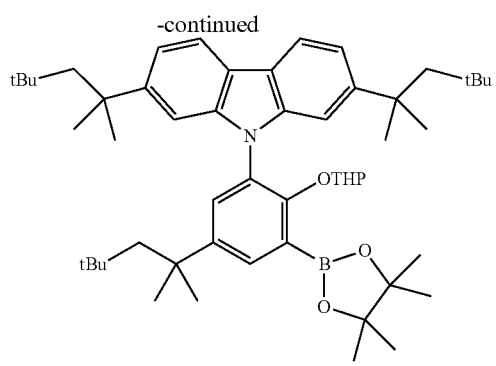

Preparation of 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(2,4,4-trimethylpentan-2-yl)-9H-carbazole In a glove box, a three-necked round bottom flask equipped with a magnetic stir bar and septa was charged with 9-(2-((tetrahydro-2H-pyran-2-yl)oxy)-5-(2,4,4-trimethylpentan-2-yl)phenyl)-2,7-bis(2,4,4-trimethylpentan-2-yl)-9H-carbazole (11.1 g, 16.3 mmol) and dried tetrahydrofuran (105 mL). The flask was transferred to the hood and was equipped with a nitrogen gas inlet. The reaction was placed under nitrogen atmosphere and was cooled to 0-10° C. (ice water bath) for 15 minutes. A solution of 2.5M n-BuLi in hexanes (16.8 mL, 42.0 mmol) was slowly added via syringe. The brown solution turned to a murky solution and then to an orange slurry. After stirring for 4 hours at 0-10° C., 2-isopropoxy-4,4,5,5-tetramethyl-1,3,2-dioxaborolane (8.5 mL, 42 mmol) was slowly added via syringe. The orange slurry turned to an orange murky solution. The reaction stirred for 1 hour at 0-10° C. before allowing the reaction to warm up to room temperature and continued to stir overnight. A cold solution of saturated sodium bicarbonate (92 mL) was added to the resulting orange solution. The mixture was transferred to a separatory funnel. The phases were separated and the aqueous phase was extracted with three 64 mL portions of dichloromethane. The organic phases were combined and washed with cold aqueous sodium bicarbonate (242 mL), and then brine (242 mL). The organic phase was dried over magnesium sulfate, filtered by vacuum filtration, and concentrated by rotary evaporation to afford the product as a crude orange sticky solid. The crude solid was dried under vacuum for 30 minutes to 1 hour. Acetonitrile (42 mL) was added to the sticky solid and was placed in the freezer overnight. The solids were scraped off the sides of the flask and the resulting slurry was stirred for 30 minutes before isolating the light orange solids by vacuum filtration. The powdery solids were washed with five 10-mL portions of cold acetonitrile. To remove traces of acetonitrile, the white solids were dissolved in dichloromethane and concentrated by rotary evaporation to afford a light orange crystalline solid (repeated twice). The solid was dried under high vacuum to afford 11.52 g (87.8%).

$^1$H NMR (400 MHz, CDCl$_3$) δ 7.97 (dd, J=8.2, 1.2 Hz, 2H), 7.85 (d, J=2.6 Hz, 1H), 7.50 (d, J=2.6 Hz, 1H), 7.30 (ddd, J=8.3, 3.2, 1.6 Hz, 2H), 7.23 (d, J=1.5 Hz, 1H), 7.18 (d, J=1.5 Hz, 1H), 5.01 (t, J=2.7 Hz, 1H), 2.87 (td, J=10.8, 2.9 Hz, 1H), 2.72 (dt, J=11.0, 3.7 Hz, 1H), 1.81 (s, 3H), 1.78 (d, J=15.0 Hz, 2H), 1.75 (d, J=15.0 Hz, 2H), 1.42 (d, J=8.6 Hz, 30H), 0.81 (s, 9H), 0.74-0.70 (m, 21H). $^{13}$C NMR (101 MHz, CDCl$_3$) δ 156.40, 147.56, 147.49, 145.59, 141.63, 133.44, 130.39, 129.39, 120.67, 120.39, 118.65, 118.62, 118.06, 118.01, 108.34, 107.97, 101.23, 83.52, 61.26, 57.09, 57.07, 57.06, 38.95, 38.34, 32.48, 32.36, 32.05, 32.01, 31.89, 31.80, 31.78, 31.74, 31.69, 31.11, 29.84, 25.01, 24.99, 24.89, 18.17.

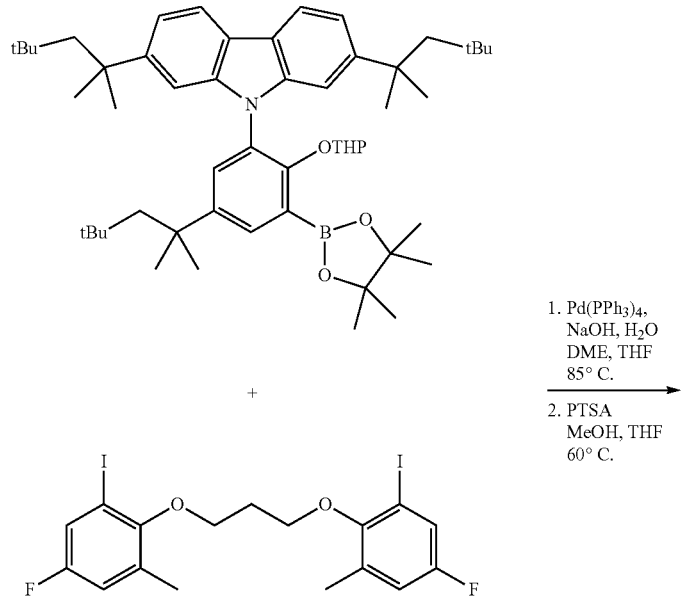

tetrahydrofuran (60 mL), and 1,3-bis(4-fluoro-2-iodo-6-methylphenoxy)propane (3.7003 g, 6.8006 mmol, see WO 2014/105411 A1 for preparation). The reaction was placed under nitrogen atmosphere, purged with nitrogen for 45 minutes, and then tetrakis(triphenylphosphine)palladium(0)

Preparation of 2',2'''-(propane-1,3-diylbis(oxy))bis(3-(2,7-di-tert-octyl-9H-carbazol-9-yl)-5'-fluoro-3'-methyl-5-(2,4,4-trimethylpentan-2-yl)-[1,1'-biphenyl]-2-ol

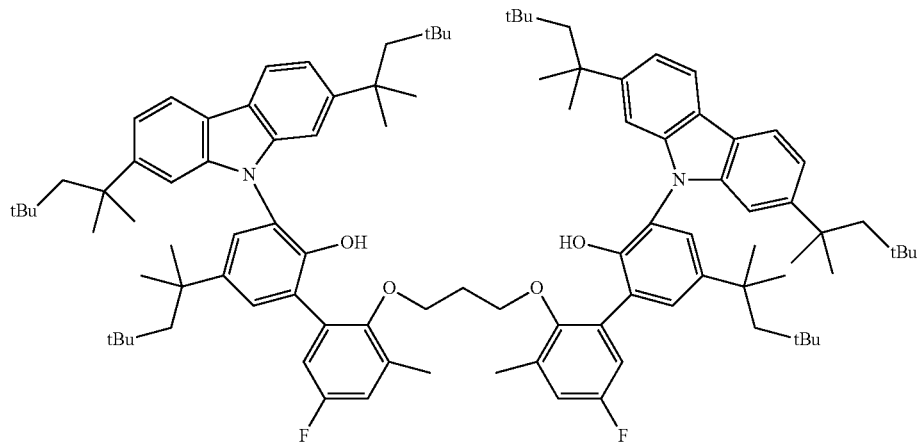

A three-necked round bottom flask was equipped with a magnetic stir bar, septa, a condenser, and a nitrogen gas inlet. The flask was charged with 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(2,4,4-trimethylpentan-2-yl)-9H-carbazole (11.6 g, 14.3 mmol), 1,2-dimethoxyethane (181 mL), a solution of sodium hydroxide (1.9051 g, 47.628 mmol) in water (53 mL), (0.5658 g, 0.5896 mmol) was added. The reaction was refluxed at 85° C. for 22 hours. Reaction was monitored by HPLC. The reaction mixture was allowed to cool to room temperature and transferred to a separatory funnel. The phases were separated and the organic phase was dried over magnesium sulfate, filtered by vacuum filtration, and concentrated by rotary evaporation to afford the protected product as a crude brown crystalline solid. The solid was dissolved in a 1:1 mixture of THF (73 mL) and methanol (73 mL). The mixture was heated to 60° C. and p-toluenesulfonic acid monohydrate (PTSA) (0.2595 g, 1.364 mmol) was added. The reaction was stirred at 60° C. overnight and monitored by $^{19}F$ NMR which showed protected product remaining. Therefore, additional PTSA (0.2655 g, 1.396 mmol) was added to the reaction. The mixture was stirred for another 4 hours at 60° C. Then, it was allowed to cool to room temperature and the solution was concentrated by rotary evaporation to afford the deprotected product as a crude sticky orange solid. The solid was swirled in hot acetonitrile and placed in the freezer overnight. The solution was filtered off while the solids remained on the sides of the flask. The solid was washed with three 15-mL portions of cold acetonitrile. The solid was dissolved in dichloromethane and concentrated to a reddish orange solid. The solid was dissolved in chloroform and silica gel was added. The slurry was concentrated by rotary evaporation to afford a dry powdery mixture. The powdery mixture was loaded onto the ISCO CombiFlash system and was run using a 330 g RediSep High Performance Column and a gradient of 40-60% chloroform in hexanes until the product eluded. The pure fractions were combined and concentrated by rotary evaporation to afford a light yellow crystalline solid. To remove traces of hexanes, the sold was dissolved in dichloromethane and concentrated by rotary evaporation to afford a yellow crystalline solid (repeated twice). The solid was dried under high vacuum to afford 6.29 g (62.4%).

$^1$H NMR (400 MHz, CDCl$_3$) δ 8.03 (d, J=8.2 Hz, 4H), 7.46 (d, J=2.4 Hz, 2H), 7.44 (d, J=2.4 Hz, 2H), 7.35 (dd, J=8.3, 1.6 Hz, 4H), 7.13 (d, J=1.5 Hz, 4H), 7.03 (dd, J=8.8, 3.1 Hz, 2H), 6.90-6.84 (m, 2H), 6.08 (s, 2H), 3.71 (t, J=6.4 Hz, 4H), 2.05 (s, 6H), 1.84-1.72 (m, 14H), 1.42 (s, 12H), 1.37 (s, 12H), 1.35 (s, 12H), 0.84 (s, 18H), 0.70 (s, 36H). $^{13}$C NMR (101 MHz, CDCl$_3$) δ 159.93, 157.51, 150.31, 150.28, 148.04, 147.68, 142.75, 141.53, 133.44, 133.35, 132.83, 132.75, 128.99, 127.24, 126.21, 126.19, 124.89, 121.03, 119.19, 118.77, 117.26, 117.04, 116.23, 116.01, 107.32, 70.84, 57.27, 57.10, 38.96, 38.20, 32.51, 32.37, 32.09, 32.01, 31.95, 31.82, 31.78, 31.74, 31.69, 30.74, 16.61, 16.59 [Multiplicity due to carbon-fluorine coupling is not identified]. $^{19}$F NMR (376 MHz, CDCl$_3$) δ −118.95 (t, J=8.6 Hz).

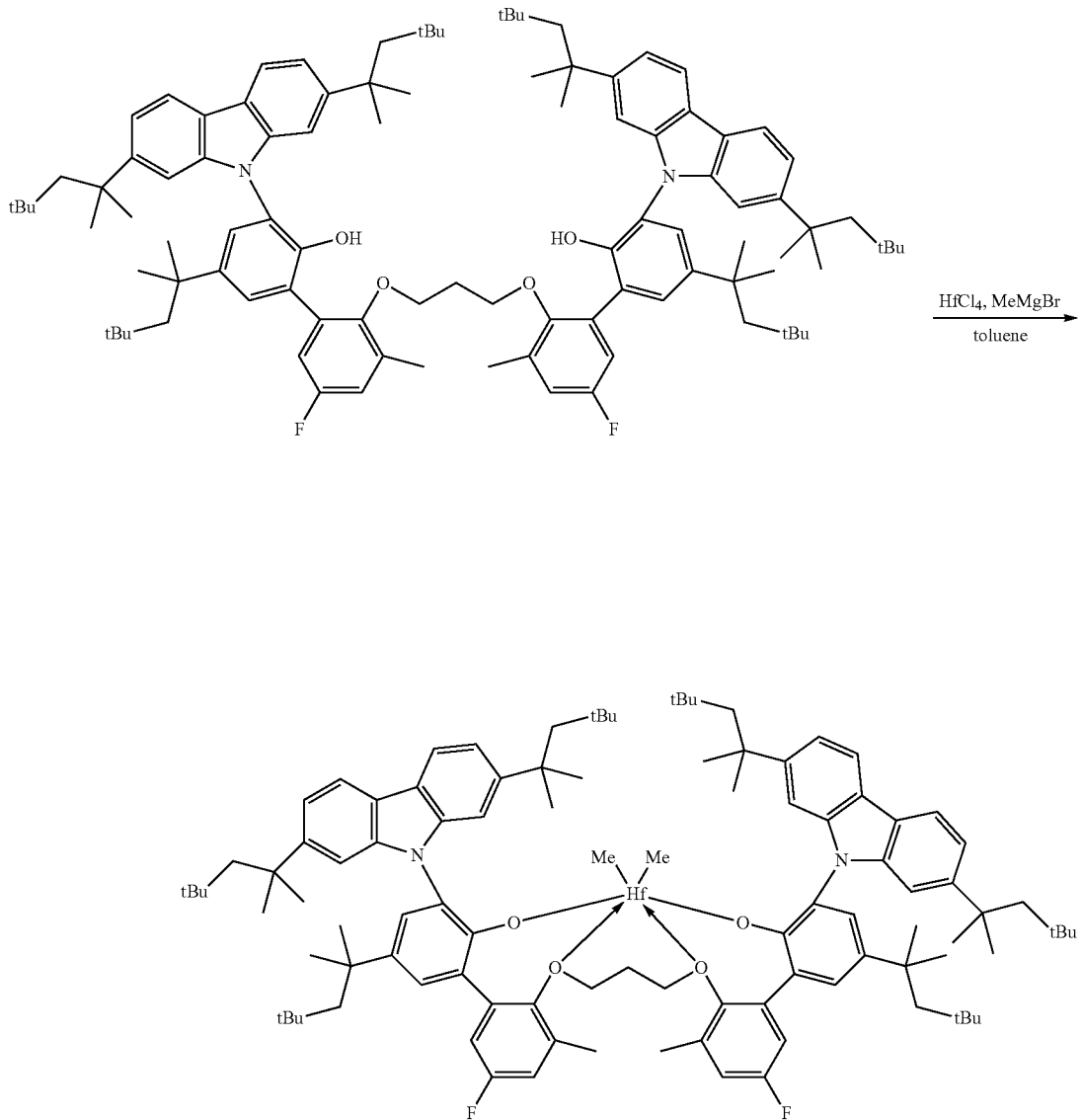

Preparation of Inv. Cat. 1

Reaction was set up in a glove box under nitrogen atmosphere. A jar was charged with HfCl$_4$ (0.2182 g, 0.6812 mmol) and toluene (30 mL). The slurry was cooled to −25° C. in the glove box freezer for 25 minutes. To the stirring cold slurry was added 3.0 M methylmagnesium bromide in diethyl ether (0.97 mL, 2.9 mmol). The mixture was stirred strongly for 5 minutes. The solid went in solution but the reaction solution was cloudy and yellowish. To the mixture was added the ligand (1.0 g, 0.7 mmol) as a solid. The flask containing the solid was rinsed with toluene (3.0 mL). The rinse solvent was added to the reaction mixture. The resulting cloudy yellow reaction mixture was stirred at room temperature for 3.5 hours. To the yellow mixture was added hexanes (6 mL) and filtered. The transparent solution was left to concentrate under vacuum overnight to afford 1.1202 (97.51%) g of the Hf-complex.

$^1$H NMR (400 MHz, C$_6$D$_6$) δ 8.17 (d, J=8.2 Hz, 2H), 8.06 (d, J=8.2 Hz, 2H), 7.87 (d, J=1.5 Hz, 2H), 7.83 (d, J=2.5 Hz, 2H), 7.76 (d, J=1.5 Hz, 2H), 7.47 (dd, J=8.3, 1.5 Hz, 2H), 7.39 (dd, J=8.3, 1.5 Hz, 2H), 7.33 (d, J=2.5 Hz, 2H), 6.90 (dd, J=8.8, 3.2 Hz, 2H), 6.13 (dd, J=8.1, 3.1 Hz, 2H), 3.53 (dt, J=9.9, 4.8 Hz, 2H), 3.27 (dt, J=10.6, 5.4 Hz, 2H), 2.02 (s, 4H), 1.90 (d, J=14.7 Hz, 2H), 1.71 (d, J=14.4 Hz, 2H), 1.63-1.65 (m, 16H), 1.43 (s, 6H), 1.41 (s, 6H), 1.39-1.29 (m, 2H), 1.28 (s, 6H), 1.24 (s, 6H), 1.22 (s, 6H), 0.99 (s, 18H), 0.87 (s, 18H), 0.65 (s, 18H), −0.69 (s, 6H).

Preparation of Inventive Catalyst 2 (Inv. Cat. 2)

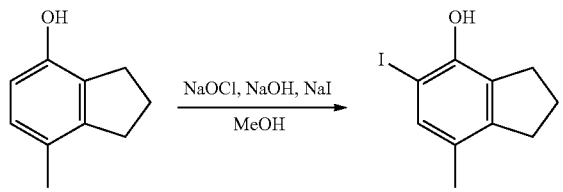

Preparation of 5-iodo-7-methyl-2,3-dihydro-1H-inden-4-ol

A flask with a magnetic stir bar, an addition funnel, and a nitrogen gas inlet and a septas was charged with 7-methyl-2,3-dihydro-1H-inden-4-ol (20.0 g 135.0 mmol), sodium iodide (25.3 g 168.7 mmol), sodium hydroxide (6.8 g, 169 mmol) and methanol (150 ml). The mixture was cool to −10° C. (methanol/ice bath). Commercial bleach (225 ml of a 6% by mass of NaOCl) was added slowly dropwise to the mixture. The mixture was stirred at 0-10° C. for 1 hour and sample by GC/MS analysis for completion. After stirring at −10° C. for 3 more hours, the reaction was ~90% complete and quenched with 10% sodium thiosulfate and allowed to stir overnight. The reaction was acidified with 2 M aqueous HCl. The reaction mixture was then transferred to a separatory funnel and extracted with two 100-mL portions of dichloromethane. The organic phases were combined, washed with water (100 mL) and brine (100 mL). The organic phase was then dried over anhydrous magnesium sulfate, filtered and concentrated under reduced pressure. The crude material was purified by column chromatography using an ISCO purification system to afford 27.3 g (73.8%) of the product as a white solid.

$^1$H NMR (500 MHz, CDCl$_3$) δ 7.25 (s, 1H), 5.07 (s, 1H), 2.93 (t, J=7.5 Hz, 2H), 2.81 (t, J=7.5 Hz, 2H), 2.16 (s, 3H), 2.10 (p, J=7.5 Hz, 2H). $^{13}$C NMR (126 MHz, CDCl$_3$) δ 149.01, 146.25, 136.17, 129.45, 128.03, 82.13, 31.85, 30.38, 24.69, 18.03.

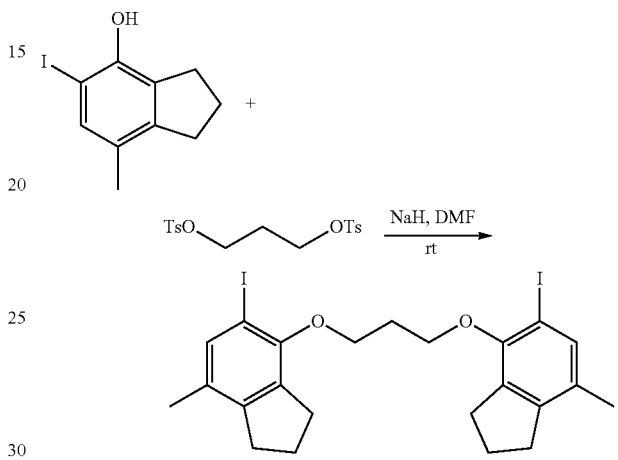

Preparation of 1,3-bis((5-iodo-7-methyl-2,3-dihydro-1H-inden-4-yl)oxy)propane In a glove box, a jar was charged with sodium hydride (0.81 g, 33.56 mmol) and anhydrous N,N-dimethylformamide (50 ml)[DMF]. A solution of 5-iodo-7-methyl-2,3-dihydro-1H-inden-4-ol (8.0 g, 29.2 mmol) in anhydrous DMF (15 mL) was added slowly using a syringe. The evolution of H$_2$ was observed and the reaction mixture was allowed to stir for 30 minutes. Then a solution of propane-1,3-diylbis(4-methylbenzenesulfonate) (5.6 g, 14.6 mmol) in anhydrous DMF (5 ml) was added via syringe. The reaction was then heated to 60° C. overnight. After heating overnight, the mixture was transfer to a separatory funnel containing a mixture of ethyl acetate (100 mL) and water (100 mL). The organic layer was separated. The aqueous layer was wash with three 50-mL portions of ethyl acetate. The organic layers were combined, washed with 1 M aqueous sodium hydroxide (20 mL) and then brine (~75 mL). The organic solution was dried over anhydrous magnesium sulfate, and then filtrated. The crude material was purified by column chromatography using a 330 gram silica column and a 20-40% chloroform in hexanes gradient to afford 7.1 g (83%) of the product as a solid.

$^1$H NMR (400 MHz, CDCl$_3$) δ 7.38 (q, J=0.8 Hz, 2H), 4.18 (t, J=6.3 Hz, 4H), 3.01 (t, J=7.5 Hz, 4H), 2.79 (t, J=7.5 Hz, 4H), 2.34 (p, J=6.3 Hz, 2H), 2.18 (d, J=0.7 Hz, 6H), 2.07 (p, J=7.5 Hz, 4H). $^{13}$C NMR (101 MHz, CDCl$_3$) δ 152.98, 146.13, 137.58, 135.96, 131.27, 88.18, 69.80, 31.64, 31.27, 31.14, 24.90, 18.26.

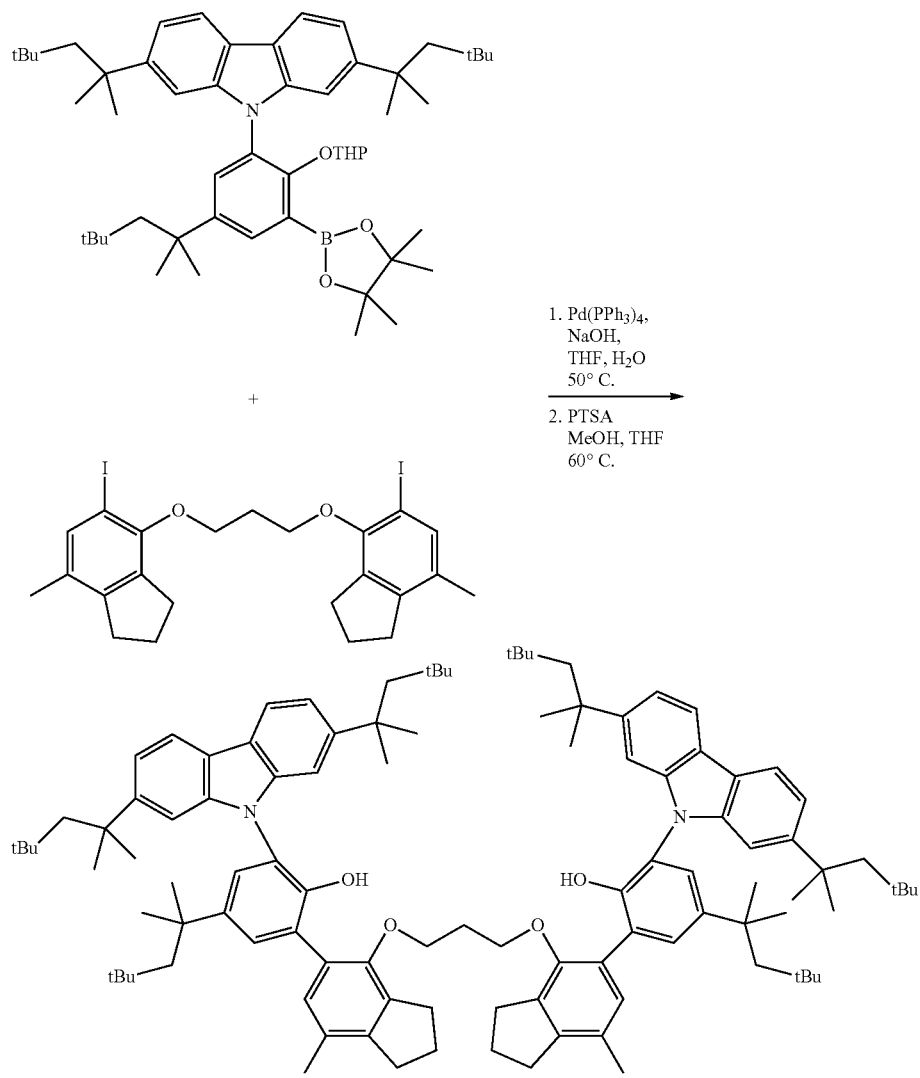

Preparation of Inv. Cat. 2 Ligand

A three-necked round bottom flask was equipped with a magnetic stir bar, two septas, a condenser and a nitrogen gas inlet. The flask was charged with 9-(2-((tetrahydro-2H-pyran-2-yl)oxy)-3-(4,4,5,5-tetramethyl)-5-(2,4,4-trimethylpentan-2-yl)phenyl)-2,7-bis(2,4,4-trimethylpentan-2-yl)-9H-carbazole (2.3 g, 2.85 mmol), 1,3-bis((5-iodo-7-methyl-2,3-dihydro-1H-inden-4-yl)oxy)propane (0.8 g, 1.4 mmol), a 1 M aqueous sodium hydroxide (16 mL, 16 mmol) and tetrahydrofuran (~50 mL). The solution was stirred and purged with nitrogen for approximately 45 minutes, then Pd(PPh$_3$)$_4$ (0.1 g, 0.1 mmol) was added. The mixture was heated to 50° C. over 2 days. The reaction was allowed to cool and then added to a separatory funnel. To the mixture was added brine (150 mL) and ethyl acetate (~100 mL). The organic phase was separated. The aqueous phase was extracted with two 100-mL portions of ethyl acetate. The organic phases were combined, dried over anhydrous magnesium sulfate and concentrated by rotary evaporation to afford a brown viscous liquid (3.14 g). The liquid was dissolved in THF (30 mL) and methanol (30 mL), and heated to 60° C. To the mixture was added p-toluenesulfonic acid monohydrate (0.0517 g, 0.27 mmol) and allowed to stir overnight. The reaction mixture was concentrated via reduced pressure. The crude material was taken up in methylene chloride and silica gel was added thereto followed by concentration via reduced pressure. The mixture was solid loaded onto a 120 gram silica gel column and purified using a gradient of ethyl acetate in hexanes to afford 1.75 g (84.5%) of the product as a solid.

$^1$H NMR (400 MHz, CDCl$_3$) δ 8.05 (d, J=8.2 Hz, 4H), 7.49 (d, J=2.4 Hz, 2H), 7.40 (d, J=2.3 Hz, 2H), 7.35 (dd, J=8.3, 1.5 Hz, 4H), 7.18 (d, J=1.5 Hz, 4H), 7.12 (s, 2H), 6.29 (s, 2H), 3.83 (t, J=6.2 Hz, 4H), 2.81 (t, J=7.4 Hz, 4H), 2.66 (t, J=7.4 Hz, 4H), 2.34 (s, 6H), 1.90 (p, J=7.6 Hz, 4H), 1.86-1.72 (m, 14H), 1.44 (s, 12H), 1.40 (s, 12H), 1.37 (s, 12H), 0.86 (s, 18H), 0.72 (s, 36H). $^{13}$C NMR (101 MHz, CDCl$_3$) δ 150.37, 148.08, 147.87, 145.61, 142.34, 141.87, 136.41, 131.22, 130.07, 129.34, 128.93, 127.62, 126.76, 124.84, 121.01, 119.14, 118.56, 107.64, 70.36, 57.42, 57.24, 39.07, 38.27, 32.62, 32.50, 32.15, 32.07, 32.02, 31.86, 31.82, 31.02, 30.38, 24.87, 18.92.

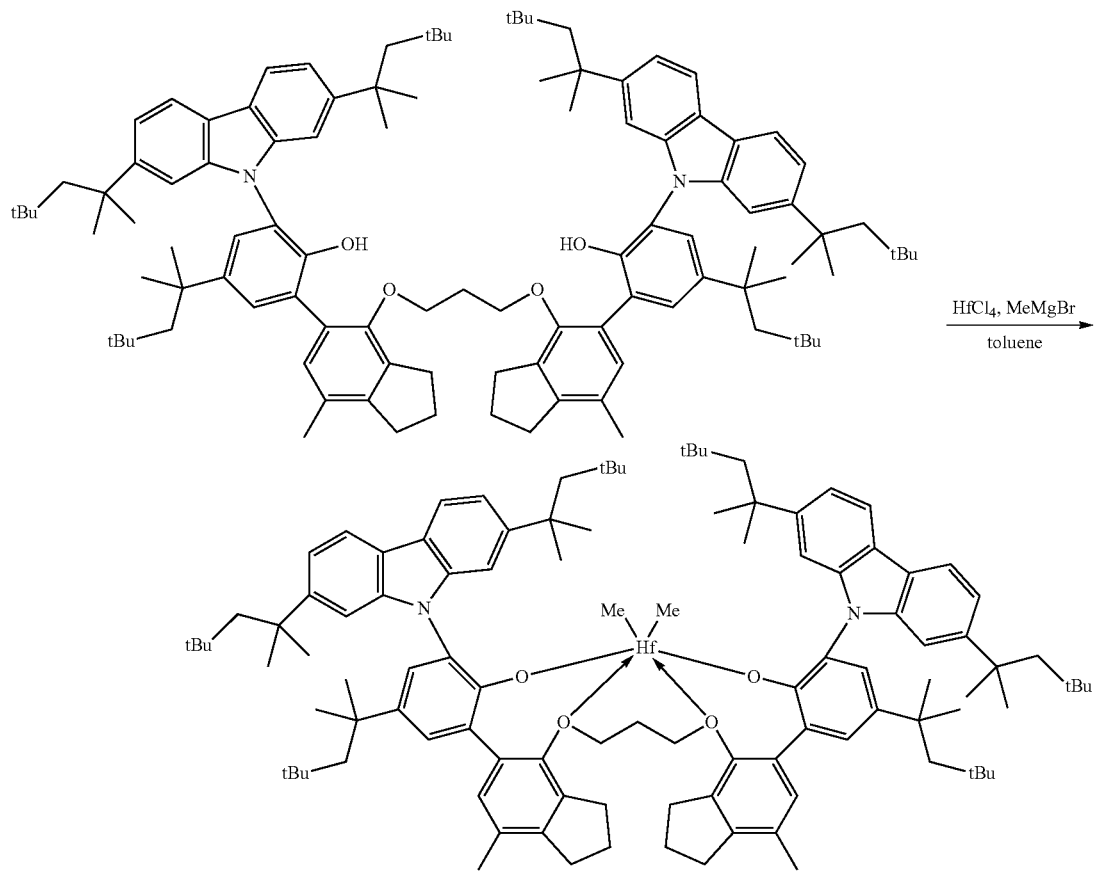

Preparation of Inv. Cat. 2

Preparation of Inventive Catalyst 3 (Inv. Cat. 3)

Reaction was set up in a glove box under nitrogen atmosphere. A jar was charged with $HfCl_4$ (0.0776 g, 0.2423 mmol) and toluene (15 mL). To the stirring slurry was added 3.0 M methylmagnesium bromide in diethyl ether (0.34 mL, 1.02 mmol). The mixture was stirred strongly for 3 minutes. The reaction mixture was cloudy and brown. To the mixture was added the ligand (0.3506 g, 0.2300 mmol) as a solid. The flask containing the solid was rinsed with toluene (3 mL). The rinse solvent was added to the reaction mixture. The resulting mixture was stirred at room temperature for 3 hours. To the brown mixture was added hexanes (15 mL) and filtered. The mixture was concentrated under vacuum to afford 0.4312 g of the crude product as an off-white solid contaminated with toluene. The solid was suspended in hexanes (25 mL) and stirred overnight. The solution was brown. The white solid was collected by filtration and dried under high vacuum.

$^1$H NMR (400 MHz, $C_6D_6$) δ 8.08 (d, J=8.2 Hz, 2H), 8.01 (d, J=8.2 Hz, 2H), 7.96 (d, J=1.6 Hz, 2H), 7.90 (d, J=1.5 Hz, 2H), 7.78 (d, J=2.6 Hz, 2H), 7.50 (d, J=2.6 Hz, 2H), 7.40 (dd, J=8.3, 1.5 Hz, 2H), 7.33 (dd, J=8.3, 1.6 Hz, 2H), 6.99 (s, 2H), 3.90 (dt, J=10.3, 5.1 Hz, 2H), 3.38 (dt, J=10.7, 5.5 Hz, 2H), 2.34-1.99 (m, 10H), 1.92 (d, J=14.4 Hz, 2H), 1.81 (d, J=14.7 Hz, 2H), 1.812 (s, 6H), 1.72 (d, J=14.4 Hz, 2H), 1.67-1.53 (m, 16H), 1.37 (d, J=1.9 Hz, 14H), 1.28 (d, J=4.3 Hz, 12H), 0.96 (s, 18H), 0.86 (s, 18H), 0.60 (s, 18H), −0.61 (s, 6H).

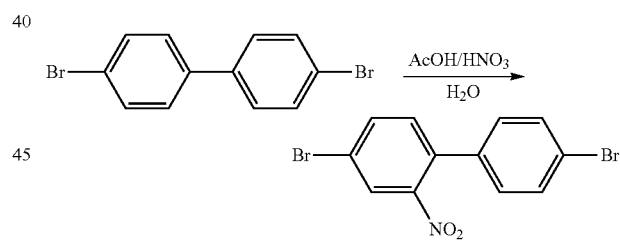

Preparation of 4,4'-dibromo-2-nitro-1,1'-biphenyl

A three-necked round bottom flask was equipped with a magnetic stir bar, a condenser, an addition funnel capped and a septum. The condenser was equipped with a gas inlet on the top with a Y split connected to the nitrogen and the scrubber with 1M aqueous sodium hydroxide. The flask was placed under nitrogen atmosphere and was charged with 4,4'-dibromobiphenyl (30.0 g, 96.2 mmol) and acetic acid (452 mL, 7.9 mol). The addition funnel was charged with nitric acid (113 mL, 2.4 mol). The suspension was heated to 100° C. The nitric acid was slowly added while monitoring the internal temperature (not exceeding 120° C.). The reaction was stirred at 100° C. for 6 hours while sampling the reaction for GC/MS analysis for completion. After 6 hours, the reaction was determined to be complete. The reaction was allowed to cool to room temperature overnight. A yellow solid remained after sitting at room temperature overnight. The solid was dissolved in dichloromethane (296 mL) and transferred to a separatory funnel for a phase separation. The phases were separated. The organic phase was washed with two 296-mL portions of water and then two 296-mL portions 1M aqueous sodium hydroxide. The organic phase was dried over magnesium sulfate, filtered by vacuum filtration, and concentrated by rotary evaporation to afford a crude yellow solid (33.0394 g). The solid was dissolved in chloroform and silica gel was added. The slurry was concentrated by rotary evaporation to afford a dry powder mixture. The mixture was split into three parts. Each part was loaded onto the ISCO CombiFlash system and was run using a 330 g Grace Column and a gradient between 15-100% dichloromethane in hexanes until the product eluted. All fractions containing the product were combined and concentrated by rotary evaporation to afford a yellow solid. To remove traces of hexanes, the solid was dissolved in dichloromethane and concentrated by rotary evaporation to afford a yellow solid (repeated twice). The solid was analyzed by $^1$H NMR which showed impurities present that were carried over into the next reaction. The solid was dried under high vacuum to afford 30.4 g (88.5%).

$^1$H NMR (400 MHz, CDCl$_3$) δ 8.02 (d, J=2.0 Hz, 1H), 7.75 (dd, J=8.2, 2.0 Hz, 1H), 7.58-7.53 (m, 2H), 7.28 (d, J=8.2 Hz, 1H), 7.19-7.11 (m, 2H).

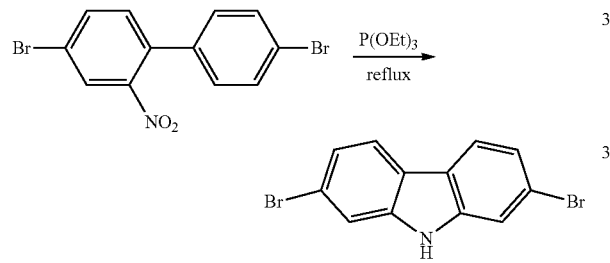

Preparation of 2,7-dibromo-9H-carbazole

In a nitrogen glove box, a three-necked round bottom flask equipped with a magnetic stir bar and septa was charged with 4,4'-dibromo-2-nitro-1,1'-biphenyl (15.9 g, 44.5 mmol) and triethyl phosphate (54 mL, 0.31 mol). The flask was taken out of the glove box to in the hood and was placed under nitrogen atmosphere. The yellow slurry was heated at reflux (175° C. heating mantle temperature). The slurry eventually changed to a brown solution while heating to reflux. The reaction was stirred at reflux for 4 hours while sampling the reaction for GC/MS analysis for completion. After 4 hours, the reaction was determined to be complete. The reaction was allowed to cool to room temperature overnight. The reaction was transferred to a one-necked round bottom flask equipped with a magnetic stir bar and a short path distillation head. The reaction was distilled under high vacuum to remove the excess triethyl phosphate. The flask was slowly heated (75-125° C.) while under vacuum until no further distillation occurred. A thick brown sticky oil remained. The oil was allowed to cool to room temperature. A 1:1 solution of methanol (82 mL) and ice water (82 mL) was added to the oil and then dichloromethane (150 mL) was added. Once the oil dissolved, the mixture was transferred to a separatory funnel. The phases were separated. The organic phase was dried over magnesium sulfate, filtered by vacuum filtration, and concentrated by rotary evaporation to afford a crude brown oil (18.3162 g). The oil was dissolved in chloroform and silica gel was added. The slurry was concentrated by rotary evaporation to afford a dry powdery mixture. The powdery mixture was split into two parts. Each part was loaded onto the ISCO CombiFlash system and was run using a 330 g Grace Column and a gradient of 2-5% ethyl acetate in hexanes for the first part and 2-10% ethyl acetate in hexanes for the second part until the product eluted. The pure fractions were combined and concentrated by rotary evaporation to afford a light yellow solid. To remove traces of hexanes, the solid was dissolved in dichloromethane and concentrated by rotary evaporation to afford a light yellow solid (repeated twice). The solid was dried under high vacuum to afford 7.75 g (53.6%).

$^1$H NMR (500 MHz, acetone-d$_6$) δ 10.58 (s, 1H), 8.02 (d, J=8.3 Hz, 2H), 7.72 (d, J=1.7 Hz, 2H), 7.33 (dd, J=8.3, 1.7 Hz, 2H). $^{13}$C NMR (126 MHz, acetone-d$_6$) δ 142.06, 123.35, 122.62, 122.55, 120.00, 114.95.

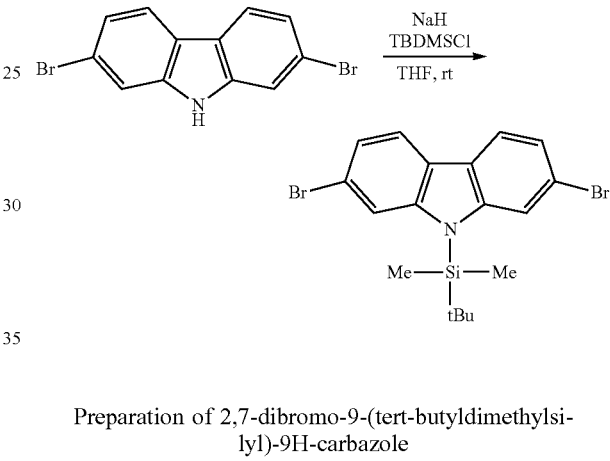

Preparation of 2,7-dibromo-9-(tert-butyldimethylsilyl)-9H-carbazole

A glass jar with a stir bar was charged in a glove box with 2,7-dibromo-9H-carbazole (2.0 g, 6.2 mmol) followed by dry THF (50 mL). Sodium hydride powder (0.2 g, 7.5 mmol) was added slowly in portions to the solution over a period of 20 min. After allowing to stir at room temperature for 60 min, t-butyldimethylsilylchloride (1.4 g, 8.96 mmol) was added to the reaction mixture. The solution was stirred 17 hr at room temperature, followed by filtration and concentration in-vacuo. The resulting crude product was purified by column chromatography over silica gel, eluting with 100% hexanes. Fractions containing the product were concentrated to afford 2.25 g (83.2%) of it as a white solid.

$^1$H NMR (500 MHz, CDCl$_3$) δ 7.86 (d, J=8.3 Hz, 2H), 7.73 (d, J=1.5 Hz, 2H), 7.35 (dd, J=8.3, 1.5 Hz, 2H), 1.05 (s, 10H), 0.76 (s, 6H). $^{13}$C NMR (126 MHz, CDCl$_3$) δ 145.98, 124.59, 123.22, 120.80, 119.18, 117.13, 26.49, 20.46, −1.28.

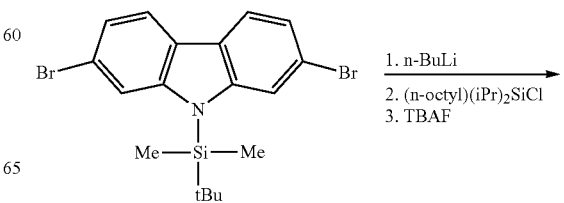

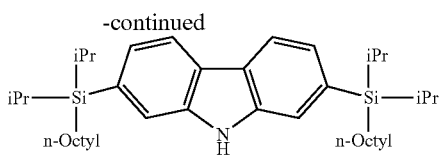

Preparation of 9-(tert-butyldimethylsilyl)-2,7-bis(diisopropyl(octyl)silyl)-9H-carbazole A solution of 2,7-dibromo-9-(tert-butyldimethylsilyl)-9H-carbazole (11.0 g, 25.0 mmol) in dry diethyl ether (150 mL was cooled to 0° C. in a schlenk flask under nitrogen atmosphere. A 1.6 M solution of n-BuLi in hexanes (37.5 mL, 60.0 mmol) was added slowly over 60 min, resulting in the formation of a white precipitate. Progress of the lithiation was monitored by GC/MS of methanol quenched aliquots. The solution was allowed to stir with cooling for 17 hr. The reaction vessel was sealed and moved to a nitrogen atmosphere glove box. Hexanes (200 mL) were added to the flask and the precipitates allowed to settle. The precipitate was collected by vacuum filtration and transferred to a round bottomed flask. Dry THF (200 mL) was added resulting in slurry, followed by slow addition of n-octyldiisopropylchlorosilane (11.5 g, 43.9 mmol). The reaction was stirred at room temperature for 17 hr followed by removal to a fume hood where it was quenched with saturated sodium bicarbonate solution (25 mL). The product was extracted with ethyl acetate (100 mL), dried over anhydrous magnesium sulfate, filtered and condensed to afford the crude intermediate. The crude material was taken up into dichloromethane (75 mL) and the solution cooled to 0° C. with an ice bath. A solution of tetrabutylammonium fluoride (6.9 g, 26.3 mmol) in THF (30 mL) was then added via addition funnel over a period of 30 min. After an additional 30 min, saturated sodium bicarbonate solution (50 mL) was added to the reaction mixture. The organic layer was isolated on a sep funnel, dried over anhydrous magnesium sulfate, filtered and condensed in-vacuo. The resulting crude product was purified via column chromatography over silica gel, eluting with 100% hexanes. Fractions containing the product were combined and condensed in-vacuo to afford 7.92 g (51.1%) of the product as clear viscous oil.

$^1$H NMR (500 MHz, CDCl$_3$) δ 8.08 (d, J=7.7 Hz, 2H), 7.98 (s, 1H), 7.58 (d, J=0.9 Hz, 2H), 7.37 (dd, J=7.7, 0.8 Hz, 2H), 1.54-1.46 (m, 4H), 1.46-1.39 (m, 4H), 1.39-1.26 (m, 20H), 1.10 (d, J=7.4 Hz, 12H), 1.06 (d, J=7.4 Hz, 12H), 1.04-0.98 (m, 4H), 0.96-0.89 (m, 6H). $^{13}$C NMR (126 MHz, CDCl$_3$) δ 139.21, 133.37, 125.64, 123.65, 119.41, 116.95, 34.44, 31.98, 29.35, 29.26, 24.38, 22.71, 18.32, 18.23, 14.13, 11.24, 9.72.

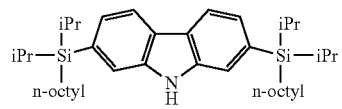

+

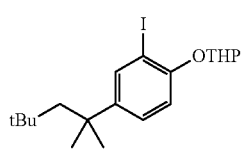

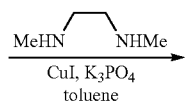

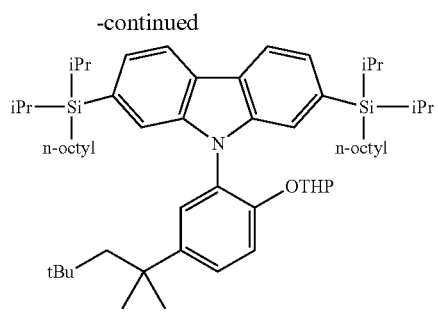

Preparation of 2,7-bis(diisopropyl(octyl)silyl)-9-(2-((tetrahydro-2H-pyran-2-yl)oxy)-5-(2,4,4-trimethylpentan-2-yl)phenyl)-9H-carbazole A two necked round bottomed flask outfitted with a magnetic stir bar, rubber septum and condenser with attached nitrogen inlet was charged (in a nitrogen atmosphere glovebox) with 2,7-bis(diisopropyl(octyl)silyl)-9H-carbazole (6.1 g, 9.8 mmol), 2-(2-iodo-4-(2,4,4-trimethylpentan-2-yl)phenoxy)tetrahydro-2H-pyran (5.74 g, 13.8 mmol), toluene (20 mL), copper iodide (0.4 g, 2.2 mmol) and potassium phosphate (6.4 g, 30.1 mmol). The vessel was moved to a fume hood and placed under a blanket of nitrogen. The heterogeneous solution was stirred for 17 hr at 105° C. The solution was filtered, condensed in vacuo and purified via column chromatography over silica gel, eluting with 100% hexanes. Fractions containing the product were combined and condensed in-vacuo. This residue was then stirred with hot acetonitrile followed by cooling in a freezer (−28° C.). The impurity laden acetonitrile was decanted off to yield 7.01 g (79.7%) of the product as clear viscous oil which slowly solidified to a waxy solid after days of sitting.

$^1$H NMR (400 MHz, CDCl$_3$) δ 8.11 (d, J=7.7 Hz, 2H), 7.50-7.44 (m, 2H), 7.37 (dd, J=7.7, 1.0 Hz, 2H), 7.35-7.31 (m, 2H), 7.23 (s, 1H), 5.20 (t, J=2.9 Hz, 1H), 3.46 (td, J=11.1, 2.7 Hz, 1H), 3.31 (dt, J=11.3, 3.6 Hz, 1H), 1.75 (s, 2H), 1.46-1.371 (m, 9H), 1.37-1.04 (m, 32H), 1.04-0.94 (m, 24H), 0.92-0.86 (m, 9H), 0.77 (s, 9H). $^{13}$C NMR (101 MHz, CDCl$_3$) δ 151.13, 144.42, 141.19, 141.12, 133.04, 132.87, 127.79, 126.93, 126.72, 125.52, 125.47, 123.39, 123.33, 119.05, 119.04, 117.10, 116.57, 116.46, 97.09, 61.42, 56.95, 38.18, 34.37, 32.38, 31.96, 31.82, 31.77, 31.52, 29.90, 29.35, 29.21, 24.93, 24.35, 22.70, 18.34, 18.25, 18.24, 18.21, 18.19, 17.73, 14.14, 11.22, 11.21, 11.15, 9.64, 9.62.

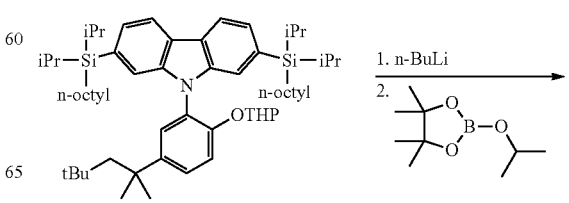

-continued

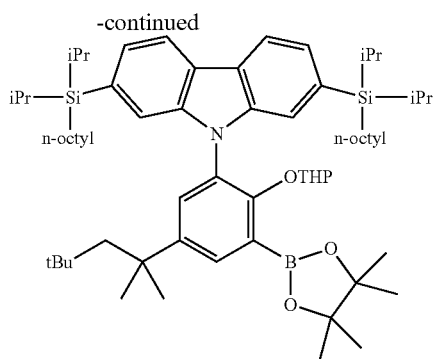

Preparation of 2,7-bis(diisopropyl(octyl)silyl)-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole A round bottomed flask with a septum lid, a magnetic stir bar and condenser with attached nitrogen inlet was charged with 2,7-bis(diisopropyl(octyl)silyl)-9-(2-((tetrahydro-2H-pyran-2-yl)oxy)-5-(2,4,4-trimethylpentan-2-yl)phenyl)-9H-carbazole (6.95 g, 7.65 mmol) and dry THF (25 mL) which had been filtered through basic alumina. The solution was cooled to −78° C. (dry-ice/acetone bath), followed by addition of a solution of 1.6 M n-BuLi in hexanes (9.2 mL, 23 mmol) over 25 min. The solution was then warmed to 0° C. and allowed to stir for 4 hrs with cooling, during which time the color transitioned from colorless, to light yellow, to pale orange/brown. To the reaction mixture was added 2-isopropoxy-4,4,5,5-tetramethyl-1,3,2-dioxaborolane (4.7 mL, 23 mmol), resulting in the formation of a white precipitate. The solution was allowed to slowly warm to room temperature over 17 h. The solution was quenched with a cold saturated sodium bicarbonate solution (10 mL) followed by extraction with additional THF. The organic layer was dried over anhydrous magnesium sulfate, filtered and condensed in-vacuo. The resulting crude material was stirred with hot acetonitrile followed by cooling in a freezer (−28° C.). The impurity laden acetonitrile was decanted off to yield 7.531 g (95.17%) of the product as a clear viscous oil.

$^1$H NMR (400 MHz, CDCl$_3$) δ 8.07 (d, J=7.8 Hz, 2H), 7.84 (d, J=2.5 Hz, 1H), 7.53 (d, J=2.6 Hz, 1H), 7.44 (s, 1H), 7.38-7.31 (m, 3H), 5.00 (t, J=2.8 Hz, 1H), 2.50 (dt, J=11.4, 3.8 Hz, 1H), 2.40 (td, J=11.2, 2.7 Hz, 1H), 1.79-1.67 (m, 2H), 1.67-1.59 (m, 1H), 1.44-1.16 (m, 54H), 1.05-0.94 (m, 21H), 0.94-0.83 (m, 11H), 0.73 (s, 9H). $^{13}$C NMR (101 MHz, CDCl$_3$) δ 156.25, 145.56, 140.31, 140.29, 133.94, 132.95, 132.75, 129.69, 129.47, 125.52, 125.47, 123.57, 123.01, 118.93, 118.79, 117.76, 116.66, 101.58, 83.45, 60.85, 56.97, 38.32, 34.35, 32.42, 31.95, 31.92, 31.78, 30.96, 29.73, 29.34, 29.22, 29.20, 25.05, 24.93, 24.86, 24.35, 24.31, 22.70, 18.35, 18.29, 18.28, 18.26, 18.23, 18.20, 18.17, 17.98, 14.13, 11.26, 11.13, 11.11, 11.08, 9.81, 9.67.

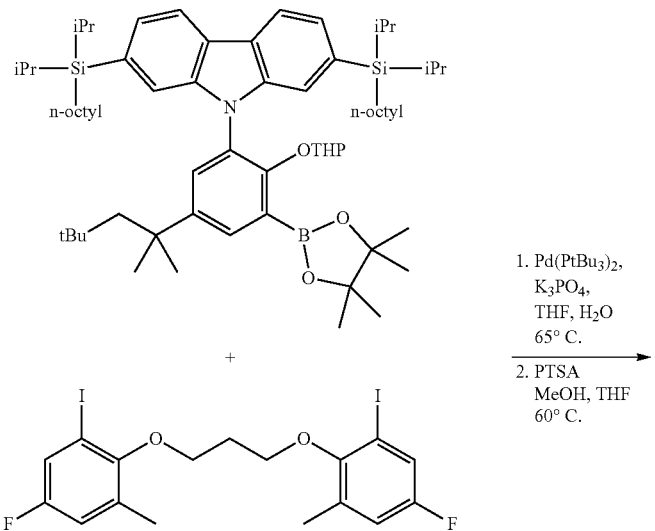

-continued

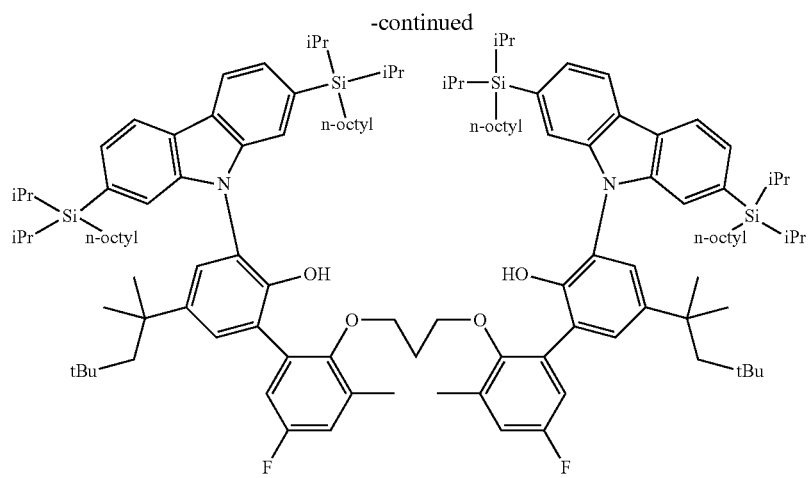

Preparation of ICE-3 Ligand [2',2'''-(propane-1,3-diylbis(oxy))bis(3-(2,7-bis(diisopropyl(octyl)silyl)-9H-carbazol-9-yl)-5'-fluoro-3'-methyl-5-(2,4,4-trimethylpentan-2-yl)-[1,1'-biphenyl]-2-ol))]

A two necked round bottomed flask with a magnetic stir bar, rubber septa and attached nitrogen inlet was charged with 2,7-bis(diisopropyl(octyl)silyl)-9-(2-((tetrahydro-2H-pyran-2-yl)oxy)-5-(2,4,4-trimethylpentan-2-yl)phenyl)-9H-carbazole (11.7 g, 11.3 mmol), 1,3-bis(4-fluoro-2-iodo-6-methylphenoxy)propane (2.8 g, 5.1 mmol), THF (24 mL), water (2.5 mL) and potassium phosphate (4.2 g, 19.97 mmol). The solution was then degassed for 30 min via a constant stream of nitrogen bubbled through the solution. A solution of bis(tri-tert-butylphosphine)palladium (0.2 g, 0.3 mmol) in THF (2.5 mL) was added to the solution, followed by heating to 65° C. where it was held constant until completion of the reaction. After 18 hr the reaction mixture was transferred to a separatory funnel and the product extracted with dichloromethane. The organic layer was isolated, dried over anhydrous magnesium sulfate, filtered and condensed in-vacuo to afford the crude intermediate. The intermediate was purified via reverse phase chromatography on C18 media. A gradient of 55 to 100% THF in water was employed. The purified THP protected intermediate was dissolved in MeOH/THF (1:1) (30 mL), followed by the addition of p-toluenesulfonic acid monohydrate (0.3570 g, 1.88 mmol). The reaction mixture was heated to 60° C. After 3 hr, the reaction solution was treated with saturated sodium bicarbonate (30 mL). The organic layer was isolated, dried over anhydrous magnesium sulfate, filtered and condensed in-vacuo to afford the crude product as yellow viscous oil. The product was purified via reverse phase chromatography on C18 media eluting with a gradient of 55 to 100% THF in water. Fractions containing the desired product were combined and condensed in-vacuo to afford 10.21 g (54%) of the product as clear viscous oil.

$^1$H NMR (400 MHz, CDCl$_3$) δ 8.10 (d, J=7.7 Hz, 4H), 7.43 (d, J=2.4 Hz, 2H), 7.40 (d, J=2.3 Hz, 2H), 7.35 (d, J=7.7 Hz, 4H), 7.25 (s, 4H), 6.91 (dd, J=8.8, 3.1 Hz, 2H), 6.79 (dd, J=8.6, 3.1 Hz, 2H), 3.59 (t, J=6.3 Hz, 4H), 2.16 (s, 6H), 1.89 (s, 6H), 1.71 (s, 4H), 1.63 (p, J=5.9 Hz, 2H), 1.52 (s, 3H), 1.43 (s, 3H), 1.41-1.06 (m, 64H), 0.96-0.79 (m, 60H), 0.74 (s, 18H). $^{19}$F NMR (376 MHz, CDCl$_3$) δ -118.56 (t, J=8.8 Hz).

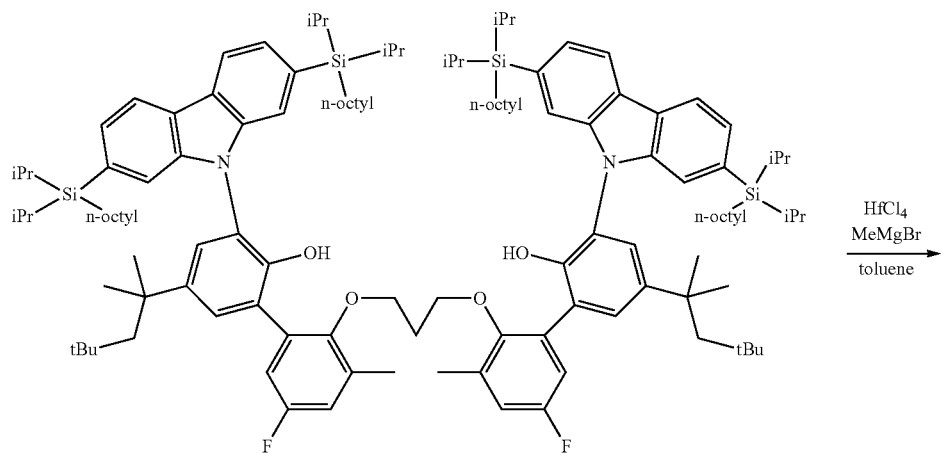

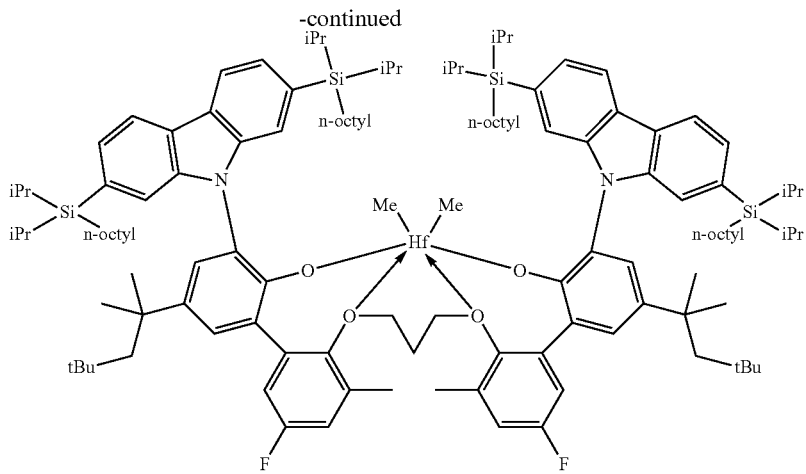

Preparation of Inv. Cat. 3

Reaction was set up in a glove box under nitrogen atmosphere. A jar was charged with HfCl$_4$ (0.5 g, 1.7 mmol) and toluene (70 mL). To the stirring slurry was added 3.0 M methylmagnesium bromide in diethyl ether (2.5 mL, 7.5 mmol). The mixture was stirred strongly for 5 minutes. The solid went in solution but the reaction solution was cloudy and brownish. To the mixture was added the ligand (3.3 g, 1.7 mmol) as a toluene solution (7 mL). The resulting brown mixture was stirred at room temperature for 2.5 hours. To the mixture was added hexanes (80 mL) and filtered. The brown solution was concentrated under vacuum to afford 3.4 g of the crude Hf-complex as a brown solid. The solid was purified by recrystallization using the following procedure: The solid was mostly dissolved in a mixture of hexanes (14 mL) and toluene (1 mL). The mixture was filtered and the solution was placed on the freezer at −25° C. overnight. The mother liquor was separated from the solid by immediately pouring into a filter funnel. The solid was washed with a small portion of cold hexanes (stored in the freezer at −25° C.). The solid was placed under high vacuum to dry to afford 1.8018 g (49.43%) of the pure complex. The mother liquor was concentrated under vacuum. The solid was re-dissolved in hexanes (8 mL) and the solution was placed in the freezer overnight. However, only traces of solid were observed.

$^1$H NMR (400 MHz, C$_6$D$_6$) δ 8.26 (d, J=7.7 Hz, 2H), 8.13 (d, J=7.7 Hz, 2H), 8.04 (s, 2H), 7.92 (s, 2H), 7.69 (d, J=2.5 Hz, 2H), 7.64 (d, J=7.8 Hz, 2H), 7.54 (d, J=7.8 Hz, 2H), 7.36 (d, J=2.5 Hz, 2H), 7.01 (dd, J=8.7, 3.3 Hz, 2H), 6.20 (dd, J=8.1, 3.2 Hz, 2H), 3.80 (dt, J=9.8, 4.7 Hz, 2H), 3.56 (dt, J=10.5, 5.3 Hz, 2H), 1.74-1.41 (m, 17H), 1.41-1.12 (m, 104H), 1.07 (d, J=7.3 Hz, 6H), 1.04-0.86 (m, 21H), 0.79 (s, 18H), −0.69 (s, 6H). $^{13}$C NMR (126 MHz, C$_6$D$_6$) δ 161.60, 159.63, 154.24, 149.20, 149.18, 141.92, 141.44, 140.72, 136.19, 136.12, 135.31, 135.23, 134.98, 131.96, 130.55, 126.72, 126.45, 126.38, 123.89, 120.39, 119.69, 119.39, 117.54, 117.30, 117.12, 76.17, 57.22, 51.22, 38.09, 34.92, 34.59, 33.21, 32.52, 32.36, 32.33, 31.98, 30.56, 30.45, 30.19, 29.98, 29.81, 29.79, 29.68, 29.58, 25.11, 24.67, 23.16, 23.06, 19.15, 18.93, 18.82, 18.69, 18.66, 18.56, 17.01, 14.44, 14.34, 11.92, 11.81, 11.74, 11.69, 10.50, 9.66. $^{19}$F NMR (376 MHz, C$_6$D$_6$) δ −114.98 (t, J=8.4 Hz).

Preparation of Inventive Catalyst 4 (Inv. Cat. 4)

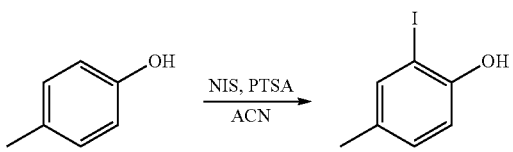

Procedure taken from: Bovonsombat, P.; Leykajarakul, J.; Khan, C.; Pla-on, K.; Krause, M. M.; Khanthapura, P.; Doowa, N.; Ali, R. *Tetrahedron* 2009, 50, 2664-2667.

Preparation of 2-iodo-4-methylphenol

A 250-mL three necked round bottomed flask was charged with p-cresol (9.98 g, 92.3 mmol), PTSA monohydrate (18.5 g 82.3 mmol) and CH$_3$CN (90 ml). The flask was cooled using an ice bath. The internal temperature was monitored using a thermo couple. NIS (21.8 g, 96.9 mmol) was added slowly so that the internal temperature of the reaction did not exceed 5° C. After the final addition of NIS, the reaction was removed from the ice bath and allowed to warm to room temperature. After 1 hour, the reaction was monitored by GC/MS and it was not complete. After 2 hours another GC/MS was taken and the reaction was not complete. The reaction was quenched with 20 wt % aq. sodium thiosulfate. The reaction mixture was then extracted with CH$_2$Cl$_2$, washed with sodium thiosulfate and then a sodium bicarbonate solution. The crude residue was purified by flash column chromatography (330 g SiO$_2$, 0% CH$_2$Cl$_2$ to 50% CH$_2$Cl$_2$ in hexanes) to afford 12.6 g (58%) of the desired compound as a solid:

$^1$H NMR (500 MHz, CDCl$_3$) δ 7.45 (d, J=2.0 Hz, 1H), 7.01 (dd, J=8.3, 1.8 Hz, 1H), 6.86 (d, J=8.3 Hz, 1H), 5.17 (s, 1H), 2.23 (s, 3H). $^{13}$C NMR (126 MHz, CDCl$_3$) δ 152.66, 138.37, 132.04, 130.92, 114.80, 85.52, 20.07.

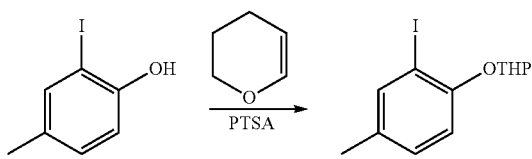

Preparation of 2-(2-iodo-4-methylphenoxy)tetrahydro-2H-pyran

A three-necked round bottom flask was equipped with two septa, stir bar, and a nitrogen gas inlet. The flask was charged with 2-iodo-4-methylphenol (12.6 g, 53.8 mmol), and 3,4-dihydro-2H-pyran (13.7 mL, 161.5 mmol) then cooled to 0° C. using an ice bath. To the mixture was added PTSA (0.1 g, 0.6 mmol) and the solution was then stirred for 30 min. After 30 min, the reaction was allowed to warm up to room temperature and stirred overnight. Et$_2$O and 1N NaOH were added the next day. The aqueous layer was extracted with Et$_2$O (2×). The combined organics were washed with brine and dried over anhydrous MgSO$_4$. The organic layer was then dried under reduced pressure. The crude product was purified by flash column chromatography (240 g Al$_2$O$_3$ pH=7, 5% EtOAc to 8% EtOAc then to 50% EtOAc in hexanes). A second purification was performed using flash column chromatography (240 g Al$_2$O$_3$ pH=7, 0% EtOAc to 2% EtOAc then to 50% EtOAc in hexanes). The pure fractions were combined to afford 8.95 g (67%) of the desired compound as an oil.

$^1$H NMR (500 MHz, CDCl$_3$) δ 7.60 (dq, J=1.3, 0.7 Hz, 1H), 7.07 (ddq, J=8.3, 2.2, 0.7 Hz, 1H), 6.96 (d, J=8.3 Hz, 1H), 5.48 (t, J=3.0 Hz, 1H), 3.89 (td, J=11.1, 2.9 Hz, 1H), 3.59 (dddd, J=11.4, 4.5, 3.1, 1.6 Hz, 1H), 2.26 (d, J=0.7 Hz, 3H), 2.21-2.09 (m, 1H), 1.98 (dddd, J=15.7, 6.6, 3.3, 1.9 Hz, 1H), 1.90-1.85 (m, 1H), 1.78-1.59 (m, 3H). $^{13}$C NMR (126 MHz, CDCl$_3$) δ 153.44, 139.52, 132.93, 129.88, 115.10, 96.65, 87.39, 61.68, 30.22, 25.28, 20.03, 18.33.

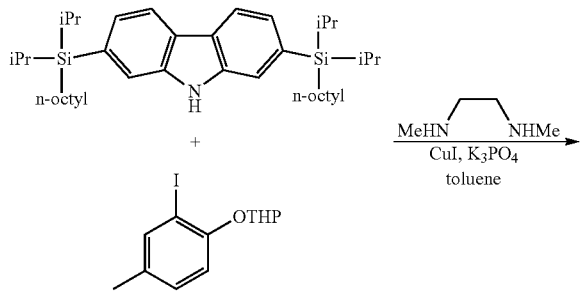

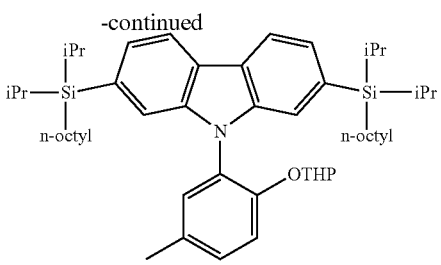

Preparation of 2,7-bis(diisopropyl(octyl)silyl)-9-(5-methyl-2-((tetrahydro-2H-pyran-2-yl)oxy)phenyl)-9H-carbazole In a glove box, a three-necked round bottom flask equipped with a magnetic stir bar and septa was charged with 2,7-bis(diisopropyl(octyl)silyl-9H-carbazole (1.5 g, 2.4 mmol), 2-(2-iodo-4-methylphenoxy)tetrahydro-2H-pyran (1.2 g, 3.9 mmol), potassium phosphate tribasic (1.7482 g, 8.2357 mmol), and dried toluene (9 mL). A mixture of anhydrous copper (1) iodide (0.04 g, 0.20 mmol), N,N'-dimethylethylenediamine (0.03 mL, 0.31 mmol), and dried toluene (1 mL) was added to the flask. The flask was taken out of the glove box to the hood and was equipped with a condenser and a nitrogen gas inlet. The reaction was placed under nitrogen atmosphere and was heated at 125° C. The reaction was sampled for HRMS analysis for completion. After 4 hours, the HRMS analysis showed formation of the desired product with starting carbazole still remaining. After 22 hours, the HRMS analysis still showed some starting carbazole remaining. Therefore additional anhydrous copper (1) iodide (0.02 g, 0.1 mmol) slurried in dried toluene (1 mL) and N,N'-dimethylethylenediamine (0.03 mL, 0.31 mmol) was added and the reaction continued stirring at 125° C. for an additional 22.5 hours. After 44.5 hours, the HRMS analysis showed consumption starting carbazole. Therefore the reaction was determined to be complete. The reaction was allowed to cool to room temperature. The reaction mixture was diluted with tetrahydrofuran (10 mL) and filtered by vacuum filtration through a small silica plug. The plug was washed with tetrahydrofuran (3×10 mL portions). The filtrate was concentrated by rotary evaporation to afford a crude orange oil. Acetonitrile was added to the oil and the mixture was stirred vigorously on the rotovap at 50° C. for 30 minutes. The mixture was allowed to cool to room temperature and was placed in the freezer. The solvent was decanted. The sticky solid was washed with cold acetonitrile (3×10 mL portions) and decanted after each wash. To remove traces of acetonitrile, the sticky solid was dissolved in dichloromethane and concentrated by rotary evaporation to afford a reddish-orange oil (repeated twice). The oil was analyzed by $^1$H NMR. To remove more impurities, acetonitrile was added to the oil and a magnetic stir bar was added. The mixture was stirred vigorously at 55° C. for 1 hour. The mixture was allowed to cool to room temperature and was placed in the freezer. The solvent was decanted. The sticky solid was washed with cold acetonitrile (3×10 mL portions) and decanted after each wash. To remove traces of acetonitrile, the solid was dissolved in dichloromethane and concentrated by rotary evaporation to afford a reddish-orange oil (repeated twice). The oil was analyzed by $^1$H NMR. The oil was dried under high vacuum to afford 1.7869 g (91.2%) of the product as a reddish-orange oil.

¹H NMR (400 MHz, CDCl₃) δ 8.08 (d, J=7.7 Hz, 2H), 7.37 (s, 1H), 7.35 (d, J=7.7 Hz, 2H), 7.31-7.29 (m, 3H), 7.25 (dd, J=8.4, 2.1 Hz, 1H), 5.15-5.11 (m, 1H), 3.39 (td, J=11.1, 2.7 Hz, 1H), 3.25 (dt, J=11.2, 3.9 Hz, 1H), 2.39 (s, 3H), 1.49-0.79 (m, 68H). ¹³C NMR (101 MHz, CDCl₃) δ 151.13, 141.11, 141.00, 133.19, 133.06, 132.39, 130.07, 129.69, 127.80, 125.79, 125.76, 123.70, 123.64, 119.18, 119.17, 118.61, 117.07, 116.97, 97.55, 61.52, 34.54, 34.53, 32.13, 30.02, 29.88, 29.50, 29.39, 25.08, 24.54, 22.86, 20.74, 18.51, 18.49, 18.46, 18.38, 17.88, 14.29, 11.49, 11.46, 9.80, 9.75.

Preparation of 2,7-bis(diisopropyl(octyl)silyl)-9-(5-methyl-2-((tetrahydro-2H-pyran-2-yl)oxy)-3-(4,4,5,5-tetramethyl-1,3,2-dioxaborolan-2-yl)phenyl)-9H-carbazole In a glove box, a three necked round bottom flask equipped with a magnetic stir bar and septa was charged with 2,7-bis(diisopropyl(octyl)silyl)-9-(5-methyl-2-((tetrahydro-2H-pyran-2-yl)oxy)phenyl)-9H-carbazole (1.7 g, 2.1 mmol) and dried tetrahydrofuran (13.5 mL). The flask was taken out of the glove box to the hood and was equipped with a nitrogen gas inlet. The reaction was placed under nitrogen atmosphere and was cooled to 0-10° C. (ice water bath) for 15 minutes. A solution of 2.5M n-butyllithium in hexanes (2.2 mL, 5.5 mmol) was slowly added via syringe. The reddish-orange solution turned to a brownish-orange solution. After stirring for 4 hours at 0-10° C., 2-isopropoxy-4,4,5,5-tetramethyl-1,3,2-dioxaborolane (1.1 mL, 5.4 mmol) was slowly added via syringe. The reaction was stirred for 1 hour at 0-10° C. before allowing the reaction to warm up to room temperature. The reaction continued to stir at room temperature overnight. A cold solution of saturated aqueous sodium bicarbonate (11.5 mL) was added to the murky orange solution. The mixture was transferred to a separatory funnel for a phase separation. The phases were separated. The aqueous phase was extracted with dichloromethane (3×8.5 mL portions). The organic phases were combined and washed with cold saturated aqueous sodium bicarbonate (31.5 mL) and then brine (31.5 mL). The organic phase was dried over magnesium sulfate, filtered by vacuum filtration, and concentrated by rotary evaporation to afford a crude orange sticky solid. To remove impurities, acetonitrile was added to the sticky solid and the mixture was placed in the freezer. The solvent was decanted. The sticky solid was washed with cold acetonitrile (3×10 mL portions) and decanted after each wash. To remove traces of acetonitrile, the sticky solid was dissolved in dichloromethane and concentrated by rotary evaporation to afford a reddish-orange oil (repeated twice). The oil was dried under high vacuum to afford 1.8051 g (91.1%) of the product as a thick orange oil contaminated with small amount of starting material.

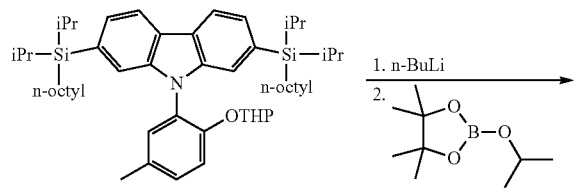

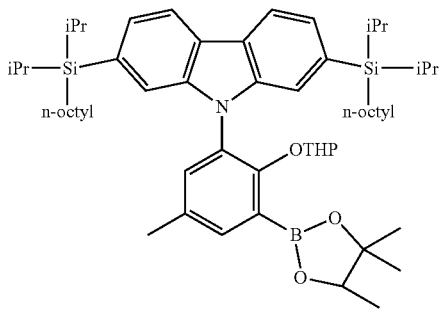

¹H NMR (400 MHz, CDCl₃) δ 8.06 (d, J=7.6 Hz, 2H), 7.69 (d, J=2.1 Hz, 1H), 7.52 (s, 1H), 7.44-7.39 (m, 2H), 7.35 (dd, J=7.9, 3.1 Hz, 2H), 5.05 (t, J=2.5 Hz, 1H), 2.54 (dt, J=11.8, 3.1 Hz, 1H), 2.41-2.35 (m with an s at 2.37, 4H), 1.75-1.63 (m, 1H), 1.43-1.21 (m, 42H), 1.17-0.77 (m, 38H). ¹³C NMR (101 MHz, CDCl₃) δ 156.30, 140.27, 140.25, 136.83, 133.41, 133.10, 132.97, 132.16, 130.39, 125.78, 123.88, 123.34, 119.12, 118.94, 118.15, 117.06, 101.91, 83.73, 61.01, 34.52, 34.50, 32.12, 29.87, 29.84, 29.49, 29.47, 29.41, 29.38, 25.19, 25.07, 24.56, 24.48, 22.85, 20.63, 18.55, 18.50, 18.47, 18.44, 18.40, 18.37, 18.36, 18.11, 14.28, 11.57, 11.45, 11.34, 9.98, 9.80.

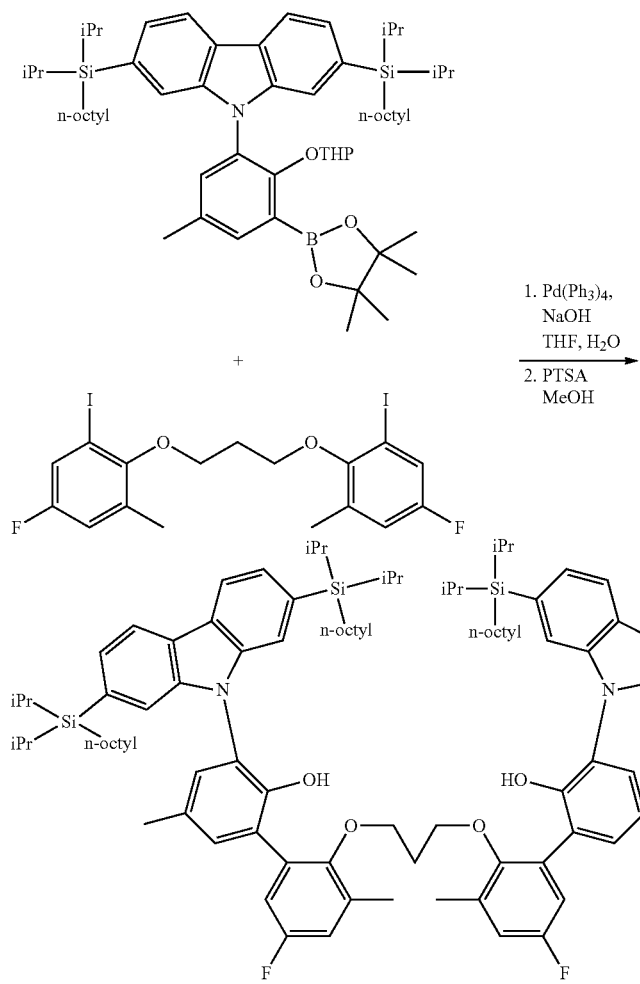

Preparation of 2',2'''-(propane-1,3-diylbis(oxy))bis (3-(2,7-bis(diisopropyl(octyl)silyl)-9H-carbazol-9-yl)-5'-fluoro-3',5-dimethyl-[1,1'-biphenyl]-2-ol)

A three necked round bottom flask was equipped with a magnetic stir bar, septa, a condenser, and a nitrogen gas inlet. The flask was charged with 2,7-bis(diisopropyl(octyl)silyl)-9-(5-methyl-2-((tetrahydro-2H-pyran-2-yl)oxy)-3-(4,4,5,5-tetramethyl-1,3,2-dioxaborolan-2-yl)phenyl)-9H-carbazole (8.0128 g, 8.5573 mmol), a 2.0M solution of sodium hydroxide (11.7 mL, 23.4 mmol), tetrahydrofuran (34 mL), and 1,3-bis(4-fluoro-2-iodo-6-methylphenoxy)propane (2.1164 g, 3.8896 mmol). The reaction was placed under nitrogen atmosphere, purged with nitrogen for 45 minutes, and then a solution of tetrakis(triphenylphosphine)palladium (0) (0.45 g, 0.39 mmol) in tetrahydrofuran (5 mL) was added. The reaction was refluxed at 65° C. and was sampled for HRMS analysis for completion. After 2 hours, the HRMS analysis showed formation of the desired bis-coupled protected product with mono-coupled protected product and top fragment remaining. After 19 hours, the HRMS analysis showed the deborolated top fragment and the mono-coupled protected product remaining. Therefore the reaction was determined to be complete and was allowed to cool to room temperature. The reaction was transferred to a separatory funnel and the phases were separated. The organic phase was dried over magnesium sulfate, filtered through a plug of silica, and concentrated by rotary evaporation to afford a crude yellowish-orange oil (10.8986 g). The oil was dissolved in tetrahydrofuran and celite was added. The slurry was concentrated to a powdery mixture. The mixture was split into three parts. Each powdery mixture was loaded onto the ISCO CombiFlash system and was run using a C18 415 g Gold Column and a slow gradient of 70-100% THF in water. The fractions were analyzed by HRMS. The pure fractions were combined and concentrated by rotary evaporation to afford a mixture of water and product. Dichloromethane was added to dissolve the product and the mixture was transferred to a separatory funnel for a phase separation. The phases were separated. The organic phase was dried over magnesium sulfate, filtered by vacuum filtration, and concentrated by rotary evaporation to afford an brownish-orange oil (6.8003 g). The oil was dissolved in a mixture of chloroform (19 mL) and methanol (19 mL). The reaction was heated at reflux 60° C. ( ) and p-toluenesulfonic acid monohydrate was added (0.0784 g, 0.4122 mmol) was added. The reaction was sampled for $^{19}$F NMR analysis for completion. After 3 hours, the $^{19}$F NMR analysis showed formation of the deprotected ligand with no protected ligand remaining. Therefore the reaction was determined to be complete and was allowed to cool to room temperature. To quench any remaining acid, aqueous sodium bicarbonate (19 mL) was added to the reaction. The reaction was transferred to a separatory funnel for a phase separation. The phases were separated. The organic phase was dried over magnesium sulfate, filtered by vacuum filtration and concentrated by rotary evaporation to afford a crude brownish-orange oil (6.7631 g). The oil was dissolved in chloroform and silica gel was added. The slurry was concentrated by rotary evaporation to afford a powdery mixture. The mixture was loaded onto the ISCO CombiFlash system and was run using a 330 g Gold RediSep high performance column and a gradient of 0-10% ethyl acetate in hexanes. The fractions were analyzed by TLC. The pure fractions were combined and concentrated by rotary evaporation to afford a thick orange oil. The thick oil was placed under high vacuum to afford 4.5900 g (67.8%) of the product as an orange sticky solid.

$^1$H NMR (400 MHz, CDCl$_3$) δ 8.15 (dd, J=7.7, 0.7 Hz, 4H), 7.41 (dd, J=7.7, 0.8 Hz, 4H), 7.36 (s, 4H), 7.33 (d, J=2.2 Hz, 2H), 7.25 (d, J=1.8 Hz, 2H), 7.01 (dd, J=8.8, 3.1 Hz, 2H), 6.86 (dd, J=8.9, 3.0 Hz, 2H), 6.23 (s, 2H), 3.63 (t, J=6.2 Hz, 4H), 2.38 (s, 6H), 2.04 (s, 6H), 1.67 (p, J=6.3 Hz, 2H), 1.47-1.37 (m, 8H), 1.35-1.17 (m, 48H), 1.05-0.85 (m, 68H). $^{13}$C NMR (101 MHz, CDCl$_3$) δ 160.12, 157.70, 150.38, 150.36, 147.51, 140.51, 133.50, 133.48, 133.40, 132.46, 132.37, 131.36, 130.39, 129.49, 127.08, 127.07, 126.32, 125.55, 124.04, 119.53, 117.44, 117.22, 116.69, 116.23, 116.00, 71.05, 34.48, 32.12, 30.76, 29.45, 29.35, 24.46, 22.85, 20.61, 18.42, 18.30, 16.63, 16.62, 14.28, 11.42, 11.37, 9.82. Multiplicities due to carbon-fluorine coupling were not identified.

Preparation of Inv. Cat. 4

A jar was charged with HfCl$_4$ (0.0691 g, 0.2157 mmol) and toluene (10 mL). To the stirring slurry was added 3.0 M methylmagnesium bromide in diethyl ether (0.3 mL, 0.96 mmol). The mixture was stirred strongly for 5 minutes. The solid went in solution but the reaction solution was cloudy and yellow. To the mixture was added a solution of the ligand (colorless oil, 0.37 g, 0.21 mmol) in toluene (5 mL). The resulting brown reaction mixture was stirred at room temperature for 3 hours. To the resulting brown mixture was added hexanes (15 mL) and filtered. The brown solution was concentrated under vacuum overnight to afford 0.4167 of the crude product as a gray solid. $^1$H-NMR of the solid showed the desired product contaminated with solvents as well as potential impurities.alkyl region due to the higher integration. To the solid was added hexanes (12 mL) and stirred until most of the solid went in solution. The cloudy mixture was filtered (syringe filter). The filtrate, a transparent brown solution, was concentrated under high vacuum to afford 0.3904 g (94.45%) of the product as an off white-pale gray solid.

$^1$H NMR (500 MHz, C$_6$D$_6$) δ 8.27 (d, J=7.8 Hz, 2H), 8.17 (d, J=7.7 Hz, 2H), 7.99 (s, 2H), 7.95 (s, 2H), 7.62 (d, J=7.8 Hz, 2H), 7.56 (d, J=7.8 Hz, 2H), 7.16 (m, 2H), 6.91 (d, J=2.4 Hz, 2H), 6.76 (dd, J=8.8, 3.2 Hz, 2H), 6.10 (dd, J=8.2, 3.2

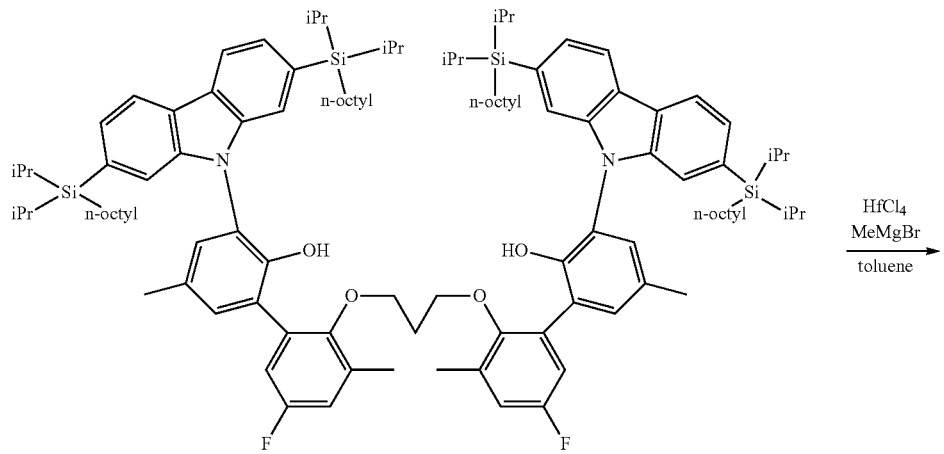

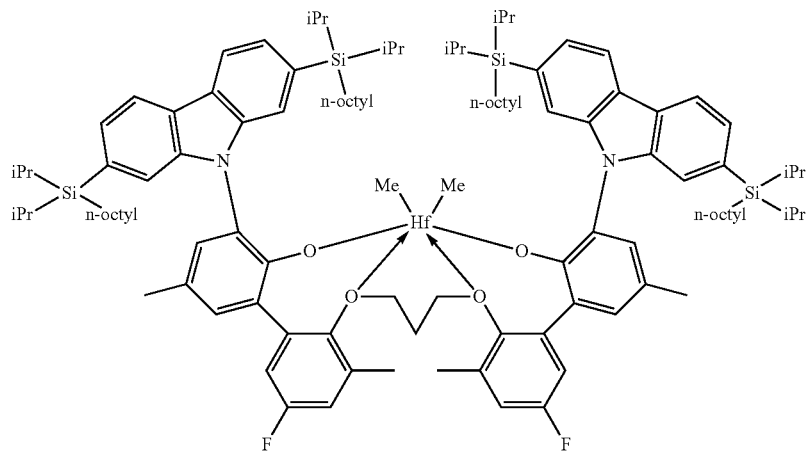

Hz, 2H), 3.62 (dt, J=9.7, 4.6 Hz, 2H), 3.32 (dt, J=10.5, 5.4 Hz, 2H), 2.12 (s, 6H), 1.72-1.59 (m, 4H), 1.56-0.97 (m, 111H), 0.94 (t, J=7.1 Hz, 6H), 0.93-0.82 (m, 6H), −0.65 (s, 6H). $^{13}$C NMR (126 MHz, C$_6$D$_6$) δ 161.50, 159.54, 154.32, 149.21, 149.19, 142.11, 141.71, 135.65, 135.58, 135.07, 135.02, 134.95, 131.80, 131.20, 131.04, 130.13, 128.32, 126.84, 126.53, 126.35, 124.18, 120.29, 119.68, 119.59, 118.23, 117.56, 117.37, 117.30, 117.12, 76.22, 51.25, 34.92, 34.65, 32.40, 32.39, 30.43, 29.88, 29.78, 29.74, 29.69, 25.12, 24.79, 23.21, 23.13, 20.32, 19.24, 19.05, 18.92, 18.79, 18.77, 18.74, 18.65, 18.61, 16.96, 14.51, 14.38, 12.04, 11.96, 11.90, 11.78, 10.55, 9.71. $^{19}$F NMR (470 MHz, C$_6$D$_6$) δ −115.27 (t, J=8.7 Hz).

Preparation of Inventive Catalyst 5 (Inv. Cat. 5)

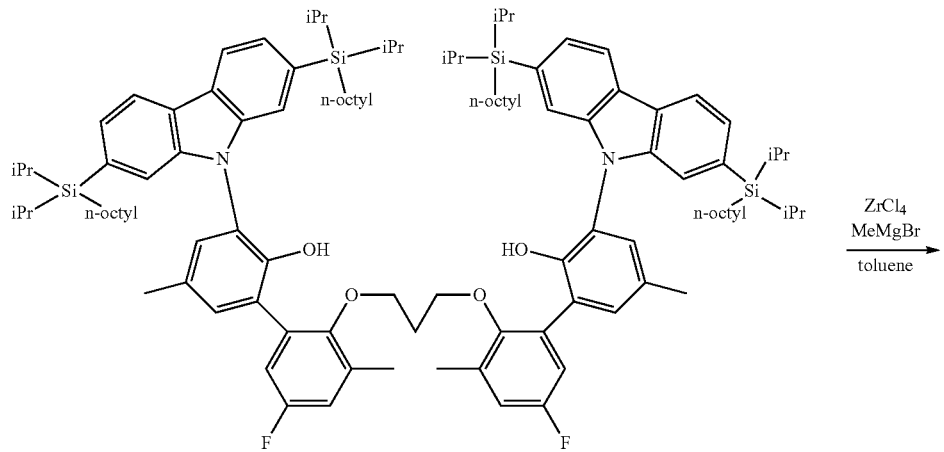

Preparation of Inv. Cat. 5

Reaction was set up in a glove box under nitrogen atmosphere. A jar was charged with ZrCl$_4$ (0.14 g, 0.59 mmol) and toluene (30 mL). The resulting mixture was cooled in the glovebox freezer to about −25° C. To the stirring cold slurry was added 3.0 M methylmagnesium bromide in diethyl ether (0.86 mL, 2.58 mmol). The mixture was stirred strongly for about 3 minutes. The solid went in solution and it turned light brown. To the mixture was added a cold solution (glove box freezer at −25° C.) of the ligand (1.0013 g, 0.5757 mmol) in toluene (4 mL). The resulting brown mixture was stirred for 3 hours. To the mixture was then added hexane (30 mL) and filtered. The light brown solution was sampled for NMR analysis (about 2 mL were removed and concentrated to dryness under high pressure) which show formation of the desired product. The bulk of the solution was concentrated under vacuum. The solid was re-dissolved in hexane (25 mL) and filtered through a syringe filter. The filtrate was concentrated under reduced pressure overnight to afford 0.9361 g (87.55%) of the product as an off-white color solid.

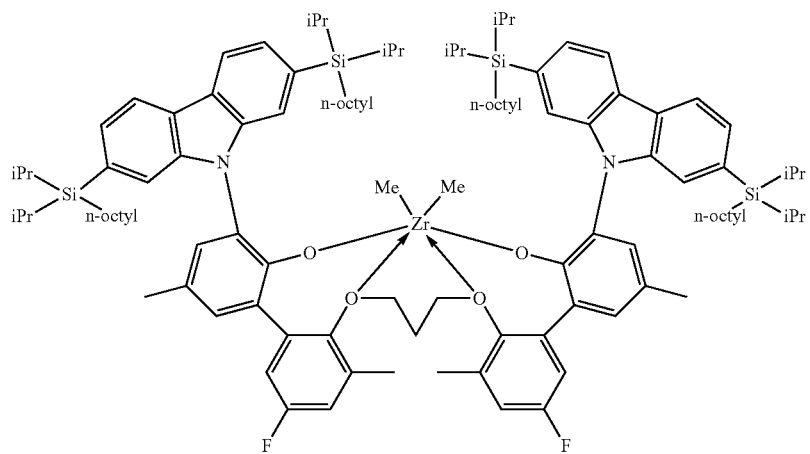

$^1$H NMR (400 MHz, C$_6$D$_6$) δ 8.27 (d, J=7.7 Hz, 2H), 8.16 (dd, J=7.8, 0.7 Hz, 2H), 8.05 (d, J=0.9 Hz, 2H), 7.96 (d, J=0.9 Hz, 2H), 7.63 (dd, J=7.7, 0.8 Hz, 2H), 7.56 (dd, J=7.7, 0.8 Hz, 2H), 7.16 (m, 2H), 6.92 (dd, J=2.4, 0.8 Hz, 2H), 6.78 (dd, J=8.8, 3.2 Hz, 2H), 6.15-6.07 (m, 2H), 3.54 (dt, J=9.8, 4.7 Hz, 2H), 3.30 (dt, J=10.4, 5.2 Hz, 2H), 2.13 (s, 6H), 1.72-0.83 (m, 136H), −0.43 (s, 6H).

Preparation of Inventive Catalyst 6 (Inv. Cat. 6)

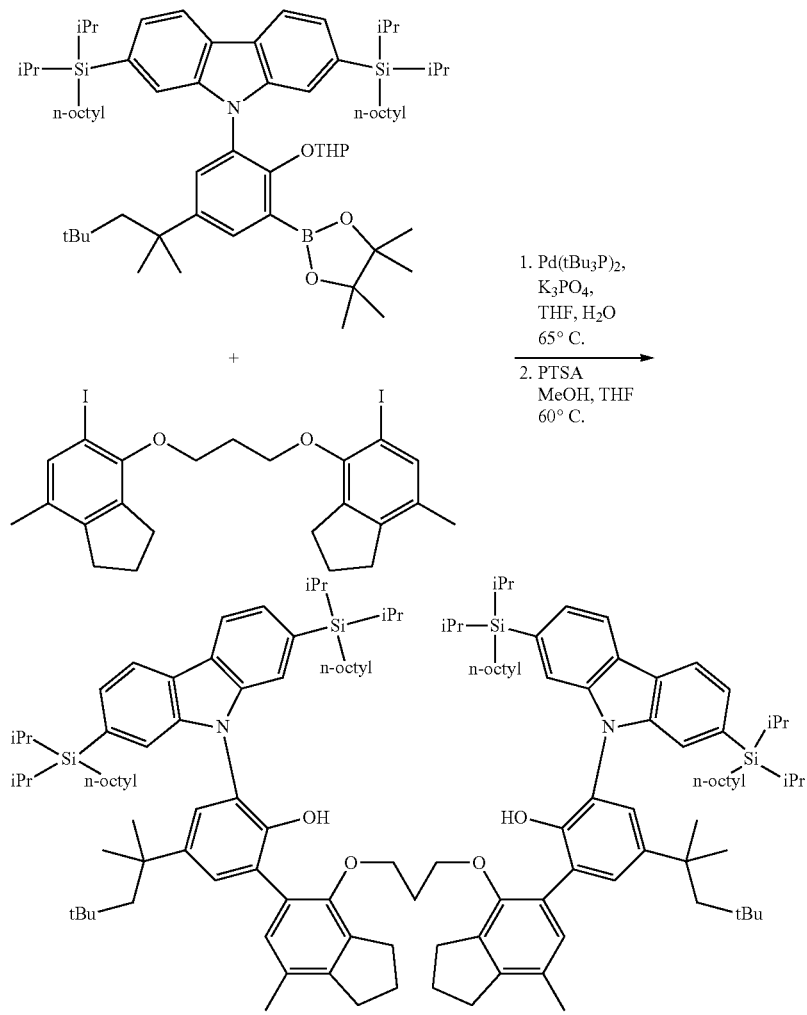

Preparation of Inv. Cat. 6 Ligand

A two necked round bottomed flask with a magnetic stir bar, rubber septa and attached nitrogen inlet was charged with 2,7-bis(diisopropyl(octyl)silyl)-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.06 g, 3.92 mmol), 1,3-bis((5-iodo-7-methyl-2,3-dihydro-1H-inden-4-yl)oxy)propane (1.1 g, 1.8 mmol), tetrahydrofuran (6.0 mL), water (1.0 mL) and potassium phosphate (1.6 g, 7.5 mmol). The vessel was placed under a blanket of $N_2$ followed by bubbling of $N_2$ gas through the stirring solution for 30 min to de-gas the solution. A solution of Pd(t-$Bu_3$P)$_2$ (0.0480 g, 0.09 mmol) in tetrahydrofuran (2.0 mL—prepared in glove box) was added to the solution, followed by heating to 65° C. The reaction mixture was then allowed to stir with heating while monitoring for completion by LC/MS. After 23 hours the heat source was removed and the solution transferred to a separatory funnel where the organic layer was isolated, dried over anhydrous magnesium sulfate, filtered and condensed to afford the crude protected intermediate as a viscous brown oil. The intermediate material was then purified via reverse phase chromatography on an ISCO Rf200i automated chromatography instrument, eluting in 90:10 tetrahydrofuran:water. The purified intermediate was isolated as a clear viscous oil which was then dissolved in a mixture of methanol/tetrahydrofuran (1:1, 10 mL) followed by addition of monohydrate p-toluene sulfonic acid (0.076 g, 0.40 mmol). The solution was then heated for 17 hr at 55° C. after which time the reaction was complete as noted by HPLC analysis. The solution was then condensed and purified via reverse phase chromatography, eluting in 100% tetrahydrofuran. The isolated product was a clear viscous oil/semi solid. Yield: 0.67 g (18.6%)

$^1$H NMR (400 MHz, CDCl$_3$) δ 8.12 (d, J=7.7 Hz, 4H), 7.42 (d, J=2.4 Hz, 2H), 7.39 (d, J=2.3 Hz, 2H), 7.36 (d, J=7.8 Hz, 4H), 7.31 (s, 4H), 6.99 (s, 2H), 6.29 (s, 2H), 3.70 (t, J=6.1 Hz, 4H), 2.73 (t, J=7.4 Hz, 4H), 2.55 (t, J=7.4 Hz, 4H), 2.26 (s, 6H), 1.78 (p, J=7.7 Hz, 4H), 1.73 (s, 4H), 1.63 (p, J=5.9 Hz, 2H), 1.45 (s, 3H), 1.42-1.11 (m, 69H), 1.02-0.82 (m, 64H), 0.78 (s, 18H). $^{13}$C NMR (101 MHz, CDCl$_3$) δ 150.42, 147.80, 145.59, 142.33, 140.88, 136.41, 133.22, 131.08, 130.02, 129.27, 128.74, 127.63, 126.38, 125.93, 125.67, 124.62, 123.80, 119.39, 116.68, 70.32, 57.10, 38.27, 34.45, 32.55, 32.12, 31.98, 31.89, 31.84, 30.49, 30.41, 29.45, 29.32, 24.82, 24.42, 22.85, 18.91, 18.46, 18.38, 18.31, 14.28, 11.32, 11.26, 9.82.

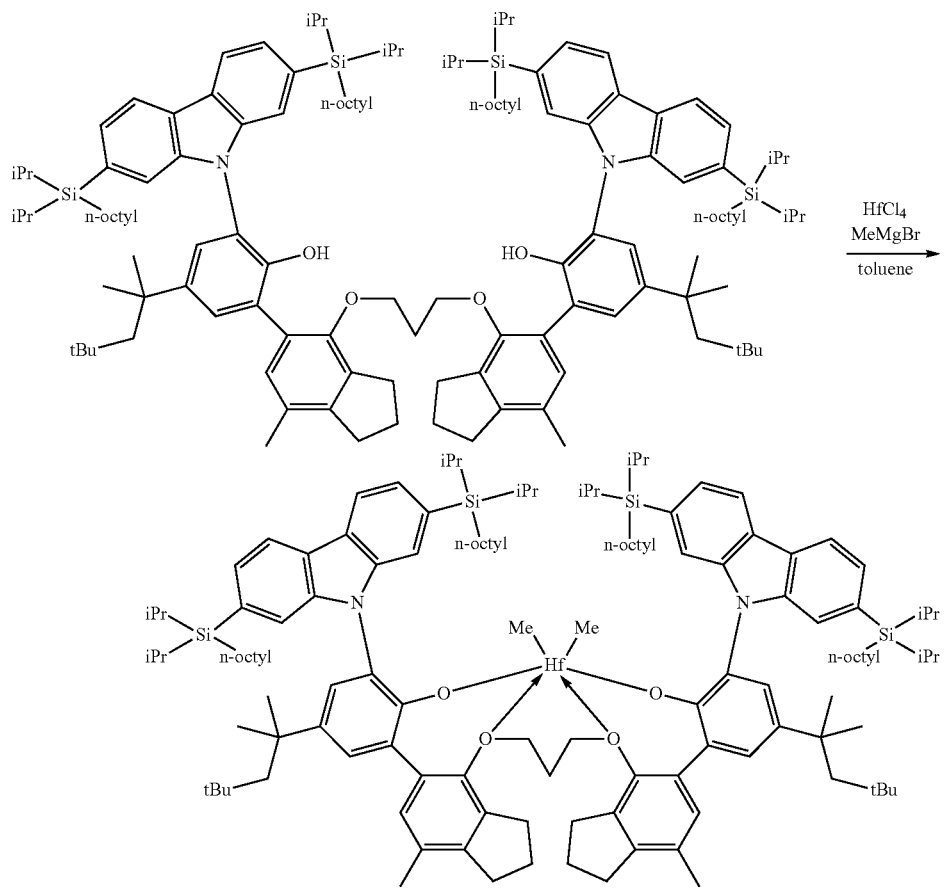

Preparation of Inv. Cat. 6

Reaction was set up in a glove box under nitrogen atmosphere. A jar was charged with $HfCl_4$ (0.06 g, 0.20 mmol) and toluene (10 mL). To the stirring slurry was added 3.0 M methylmagnesium bromide in diethyl ether (0.24 mL, 0.72 mmol). The mixture was stirred strongly for 7 minutes. The solid went in solution but the reaction solution was cloudy and brownish. To the mixture was added a solution of the ligand (0.33 g, 0.16 mmol) in toluene (3 mL). The resulting brownish mixture was stirred at room temperature for 4 hours. To the mixture was added hexanes (13 mL) and filtered. The colorless filtrate was concentrated under high vacuum to afford 0.3276 g of the Hf-complex as a white solid.

$^1$H NMR (500 MHz, $C_6D_6$) δ 8.23 (d, J=7.7 Hz, 2H), 8.18 (s, 2H), 8.17 (d, J=7.7 Hz, 2H), 8.10 (s, 2H), 7.67 (d, J=2.6 Hz, 2H), 7.60 (d, J=7.7 Hz, 2H), 7.56 (d, J=7.7 Hz, 2H), 7.52 (d, J=2.6 Hz, 2H), 7.10 (s, 2H), 4.11 (dt, J=9.9, 4.8 Hz, 2H), 3.75 (dt, J=10.7, 5.6 Hz, 2H), 2.44-2.30 (m, 4H), 2.23 (ddt, J=19.5, 16.3, 6.3 Hz, 4H), 2.05 (s, 6H), 1.77-0.86 (series of m and d, 144H), 0.83 (s, 18H), −0.59 (s, 6H). $^{13}$C NMR (126 MHz, $C_6D_6$) δ 154.21, 148.77, 145.48, 142.09, 141.91, 139.54, 137.55, 134.57, 132.36, 132.19, 131.82, 131.72, 131.62, 128.91, 128.71, 126.70, 126.31, 125.99, 125.62, 125.27, 123.88, 120.32, 119.75, 119.03, 118.11, 75.34, 56.91, 50.02, 37.73, 34.54, 34.13, 32.89, 32.18, 31.98, 31.64, 30.95, 30.79, 30.23, 29.82, 29.78, 29.44, 29.40, 29.35, 29.22, 24.74, 24.72, 24.27, 22.76, 22.69, 18.82, 18.67, 18.59, 18.51, 18.39, 18.37, 18.34, 18.29, 18.23, 14.05, 13.98, 11.69, 11.48, 11.37, 10.16, 9.31.

Preparation of Inventive Catalyst 7 (Inv. Cat. 7)

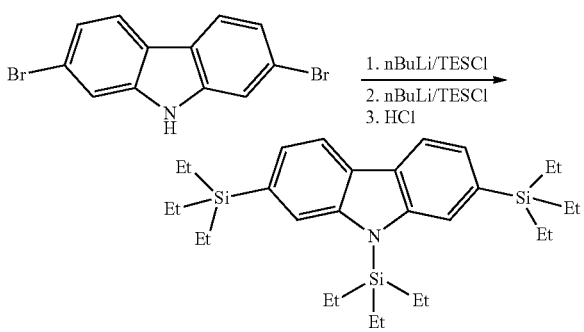

Preparation of 2,7,9-tris(triethylsilyl)-9H-carbazole

Glassware was oven dried. A three-necked round bottom flask was equipped with a magnetic stir bar and septa. In a glovebox, the flask was charged with 2,7-dibromo-9H-carbazole (3.20 g, 9.85 mmol) and dried THF (100 mL). The flask was taken out of the glovebox to a fume hood, equipped with a nitrogen gas inlet, and placed under nitrogen atmosphere. The stirred light yellow solution was cooled to −78° C. (dry ice/acetone bath) and a 2.5M solution of n-butyllithium in hexanes (4.4 mL, 11.0 mmol) was added slowly via syringe. The resulting dark yellow solution was stirred for 30 minutes at −78° C. then chlorotriethylsilane (1.9 mL, 11.3 mmol) was added slowly via syringe. The bath was removed and the solution was stirred for 2.5 hours. After this time, the reaction was sampled for GC/MS analysis which showed the formation of the silyl group in the hydrogen position as well as some starting 2,7-dibromo-9H-carbazole remaining. The resulting light yellow solution was cooled to −78° C. (dry ice/acetone bath) and a 1.6M solution of n-butyllithium in hexanes (31.0 mL, 49.6 mmol) was added slowly via syringe. While adding the n-butyllithium solution, yellow solids precipitated out of solution. The mixture was stirred for 2 hours at −78° C. then chlorotriethylsilane (9.1 mL, 54.2 mmol) was added slowly via syringe. The mixture was stirred at −78° C. and was allowed to slowly warm up to room temperature overnight (by not removing the bath). After stirring overnight, the reaction was sampled for GC/MS analysis which showed the introduction of the silyl groups in the bromo positions and consumption of the 2,7-dibromo-9H-carbazole. The resulting yellow solution was cooled to 0° C. (ice water bath) and a 3% solution of hydrochloric acid (35 mL) was added slowly while stirring vigorously to quench the reaction. The mixture was allowed to warm up to room temperature. The phases were separated and the organic phase was washed with a saturated solution of ammonium chloride (35 mL). The phases were separated. The aqueous phases were combined and extracted with ethyl acetate (3×35 mL portions). The organic phases were combined, dried over magnesium sulfate, filtered by vacuum filtration, and concentrated by rotary evaporation to afford a dark yellow oil (11.5469 g). The oil was loaded onto the ISCO CombiFlash System and run using a 330 g Grace Column and a gradient of 100% hexanes. The fractions were analyzed by TLC. The pure fractions were combined and concentrated by rotary evaporation to afford a clear oil. To remove traces of hexanes, the oil was dissolved in dichloromethane and concentrated by rotary evaporation to afford a clear oil (repeated twice). The oil was dried under high vacuum to afford 4.1039 g (81.7%) of the product as a clear oil.

$^1$H NMR (400 MHz, CDCl$_3$) δ 8.05 (dd, J=7.6, 0.7 Hz, 2H), 7.79 (s, 2H), 7.35 (dd, J=7.6, 0.7 Hz, 2H), 1.24 (qd, J=7.7, 1.0 Hz, 6H), 1.02 (m, 27H), 0.88 (m, 12H). $^{13}$C NMR (101 MHz, CDCl$_3$) δ 144.71, 134.24, 126.86, 125.07, 119.57, 118.99, 7.67, 7.24, 5.94, 3.90.

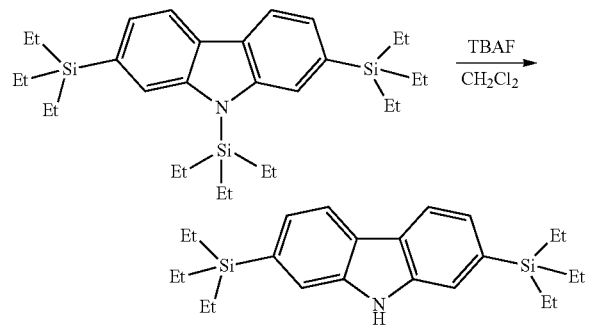

Preparation of 2,7-bis(triethylsilyl)-9H-carbazole

A three-necked round bottom flask was equipped with a magnetic stir bar, septa, and a nitrogen gas inlet. A solution of 1M tetrabutylammonium fluoride in tetrahydrofuran (0.97 mL, 0.97 mmol) was slowly added to a solution of 2,7,9-tris(triethylsilyl)-9H-carbazole (0.99 mL, 1.9 mmol) in dichloromethane (32 mL) at room temperature. The reaction was stirred for 1 hour at room temperature and was sampled for GC/MS analysis which showed complete conversion of the starting material to the desired product. The reaction was concentrated by rotary evaporation to afford a yellow solid (1.35 g). The solid was dissolved in chloroform and silica gel was added. The slurry was concentrated by rotary evaporation to afford a dry powdery mixture. The powdery mixture was loaded onto the ISCO CombiFlash System and run using a 120 g Grace Column and a gradient of 0-5% dichloromethane in hexanes. The fractions were analyzed by TLC. The pure fractions were combined and concentrated by rotary evaporation to afford a light brown oil. To remove traces of hexanes, the oil was dissolved in dichloromethane and concentrated by rotary evaporation to afford a light brown oil (repeated twice). The oil was dried under high vacuum to afford 0.6764 g (88.1%) of the product as a light brown solid.

$^1$H NMR (400 MHz, CDCl$_3$) δ 8.04 (d, J=7.8 Hz, 2H), 7.82 (s, 1H), 7.53 (s, 2H), 7.34 (d, J=7.7 Hz, 2H), 0.99 (t, J=7.8 Hz, 18H), 0.86 (q, J=8.7, 8.2 Hz, 12H). $^{13}$C NMR (101 MHz, CDCl$_3$) δ 139.47, 135.06, 125.00, 123.94, 119.81, 116.43, 7.65, 3.80.

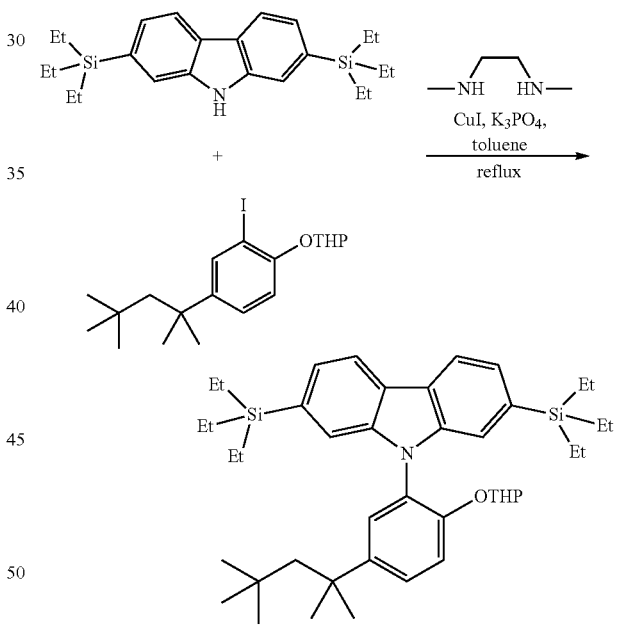

Preparation of 9-(2-((tetrahydro-2H-pyran-2-yl)oxy)-5-(2,4,4-trimethylpentan-2-yl)phenyl)-2,7-bis(triethylsilyl)-9H-carbazole A three-necked round bottom flask was equipped with a magnetic stir bar and septa. In a glovebox, the flask was charged with 2-(2-iodo-4-(2,4,4-trimethylpentan-2-yl)phenoxy)tetrahydro-2H-pyran (2.8216 g, 6.777 mmol), 2,7-bis(triethylsilyl)-9H-carbazole (1.63 g, 4.1 mmol), potassium phosphate tribasic (3.07 g, 14.02 mmol), anhydrous copper (1) iodide (0.035 g, 0.18 mmol), N,N'-dimethylethylenediamine (0.06 mL, 0.541 mmol) and dried toluene (11 mL). The flask was taken out of the glovebox to a fume hood and was equipped with a nitrogen gas inlet and a condenser. The reaction was placed under nitrogen atmosphere, heated at 125° C. (heating mantle temperature), and sampled for GC/MS analysis for completion. After 96 hours, the GC/MS analysis showed formation of the desired product with 2,7-bis(triethylsilyl)-9H-carbazole remaining. Therefore additional anhydrous copper (1) iodide (0.0274 g, 0.1438 mmol) slurried in dried toluene (1 mL) and N,N'-dimethylethylenediamine (0.0530 mL, 0.4928 mmol) was added and the reaction continued to stir at 125° C. for an additional 24 hours. After 120 hours, GC analysis showed 2,7-bis(triethylsilyl)-9H-carbazole still remaining. Therefore additional anhydrous copper (1) iodide (0.0339 g, 0.1779 mmol) slurried in dried toluene (1 mL) and N,N'-dimethylethylenediamine (0.0576 mL, 0.5351 mmol) was added and the reaction continued to stir at 125° C. for an additional 24 hours. After 144 hours, GC analysis showed little change in the amount of 2,7-bis(triethylsilyl)-9H-carbazole still remaining therefore the reaction was determined to be complete. The reaction was allowed to cool to room temperature, filtered through a small silica plug, washed with tetrahydrofuran (3×40 mL), and concentrated by rotary evaporation to afford a crude dark brown oil (3.9212 g). The oil was dissolved chloroform and silica gel was added. The resulting slurry was concentrated by rotary evaporation to afford a dry powdery mixture. The mixture was loaded onto the ISCO CombiFlash System and was run using a 330 g Grace column and a gradient of 0-20% dichloromethane in hexane. The fractions were analyzed by TLC. The pure fractions were combined and concentrated by rotary evaporation to afford a white crystalline solid. To remove traces of hexanes, the solid was dissolved in dichloromethane and concentrated by rotary evaporation to afford a white crystalline solid (repeated twice). The solid was dried under high vacuum to afford 1.5495 g (55.1%) of the product as a white crystalline solid.

$^1$H NMR (400 MHz, CDCl$_3$) δ 8.11 (d, J=7.7 Hz, 2H), 7.48-7.45 (m, 2H), 7.40-7.34 (m, 3H), 7.32 (s, 1H), 7.24 (s, 1H), 5.24 (t, J=2.9 Hz, 1H), 3.57 (td, J=11.0, 2.8 Hz, 1H), 3.39 (dt, J=11.2, 3.9 Hz, 1H), 1.74 (s, 2H), 1.40 (s, 6H), 1.44-1.32 (m, 2H), 1.23-1.03 (m, 4H), 0.93 (t, J=7.8 Hz, 18H), 0.83-0.73 (m, 21H). $^{13}$C NMR (101 MHz, CDCl$_3$) δ 151.27, 144.46, 141.34, 134.59, 134.50, 127.82, 127.03, 126.49, 124.94, 124.89, 123.73, 123.71, 119.48, 119.44, 116.77, 116.09, 115.99, 97.22, 61.72, 57.15, 38.35, 32.57, 31.95, 31.75, 30.17, 25.15, 17.97, 7.62, 3.74, 3.73.

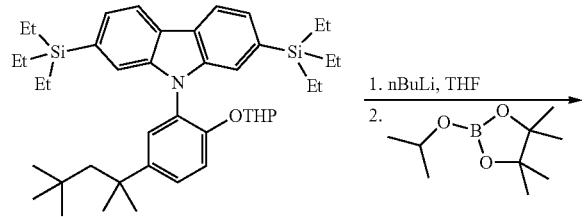

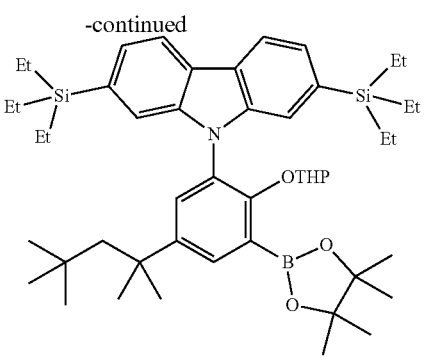

Preparation of 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(triethylsilyl)-9H-carbazole A three-necked round bottom flask was equipped with a magnetic stir bar, septa, and a nitrogen gas inlet. The flask was charged with 9-(2-((tetrahydro-2H-pyran-2-yl)oxy)-5-(2,4,4-trimethylpentan-2-yl)phenyl)-2,7-bis(triethylsilyl)-9H-carbazole (0.51 g, 0.75 mmol) and dried tetrahydrofuran (5 mL). This solution was cooled to 0-10° C. using an ice-water bath for about 15 minutes and 2.5 M n-butyllithium in hexanes (0.78 mL, 1.95 mmol) was added slowly. The solution changed from a clear solution to a yellow slurry. After stirring for 4 hours, 2-iso-propoxy-4,4,5,5-tetramethyl-1,3,2-dioxaborolane (0.39 mL, 1.9 mmol) was added slowly. The solution changed from a yellow slurry to a murky white frosty solution. The mixture was stirred for one hour at 0-10° C. before allowing the reaction to warm to room temperature and stir overnight. To the reaction mixture was added cold saturated aqueous sodium bicarbonate (5 mL). The aqueous phase was extracted with dichloromethane (4×5 mL). The organic phases were combined, washed with cold saturated aqueous sodium bicarbonate (11.5 mL), and then brine (11.5 mL). The organic phase was dried over anhydrous magnesium sulfate, filtered by vacuum filtration, and concentrated by rotary evaporation to afford a crude yellow low melting solid (0.5766 g). To the solid was added cold acetonitrile (5 mL) and the resulting mixture was stirred for 30 minutes at room temperature, and was then placed in the freezer overnight. The acetonitrile was decanted. The resulting sticky solid was washed with cold acetonitrile (2×5 mL portions) and was decanted. To remove traces of acetonitrile, the solid was dissolved in dichloromethane and concentrated by rotary evaporation to afford a white crystalline solid (repeated twice). The solid was dried under high vacuum to afford 0.4558 g (75.2%) of the product as a white crystalline solid.

$^1$H NMR (400 MHz, CDCl$_3$) δ 8.09 (d, J=7.7 Hz, 2H), 7.84 (d, J=2.2 Hz, 1H), 7.55 (d, J=2.1 Hz, 1H), 7.45 (s, 1H), 7.40-7.33 (m, 3H), 5.02 (t, J=2.8 Hz, 1H), 2.59-2.48 (m, 2H), 1.77 (d, J=14.7 Hz, 1H), 1.72 (d, J=14.6 Hz, H), 1.66-1.56 (m, 1H), 1.42 (s, 3H), 1.40 (s, 3H), 1.37 (s, 12H), 1.29-1.19 (m, 2H), 1.15-1.01 (m, 3H), 0.99-0.93 (m, 18H), 0.83-0.80 (m, 21H). $^{13}$C NMR (101 MHz, CDCl$_3$) δ 156.20, 145.90, 140.71, 140.65, 134.60, 134.41, 133.88, 129.97, 129.47, 124.93, 124.88, 123.90, 123.43, 119.36, 119.22, 117.31, 116.35, 101.45, 83.66, 61.05, 57.23, 38.55, 32.62, 32.01, 31.83, 31.11, 29.97, 25.21, 25.09, 25.02, 18.07, 7.62, 3.86, 3.78.

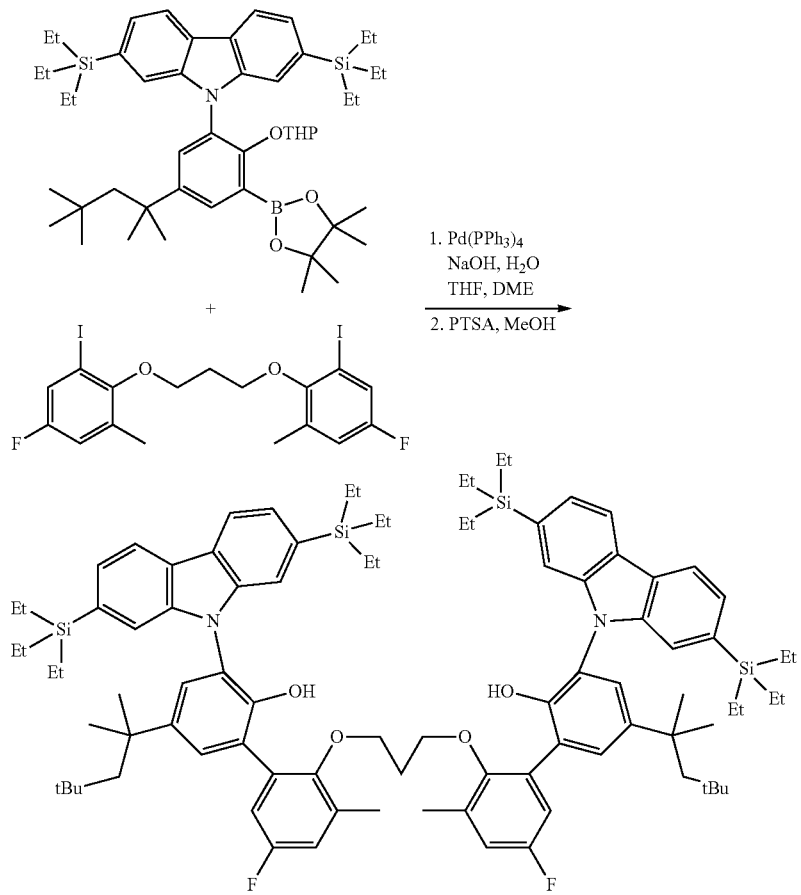

Preparation of 2',2'''-(propane-1,3-diylbis(oxy))bis(3-(2,7-bis(triethylsilyl)-9H-carbazol-9-yl)-5'-fluoro-3'-methyl-5-(2,4,4-trimethylpentan-2-yl)-[1,1'-biphenyl]-2-ol)

A three-necked round bottom flask was equipped with a magnetic stir bar, septa, a condenser, and a nitrogen gas inlet. The flask was charged with 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(triethylsilyl)-9H-carbazole (1.72 g, 2.13 mmol), 1,2-dimethoxyethane (27 mL), a solution of sodium hydroxide (0.2842 g, 7.105 mmol) in water (8 mL), tetrahydrofuran (9 mL), and 1,3-bis(4-fluoro-2-iodo-6-methylphenoxy)propane (0.55 g, 1.02 mmol). The mixture was purged with nitrogen for approximately 45 minutes, then tetrakis(triphenylphosphine)palladium(0) (0.0958 g, 0.0829 mmol) was added. The mixture was heated to reflux at 85° C. (heating mantle temperature) for 48 hours and was sampled for HPLC analysis for completion. After 24 hours, the HPLC analysis showed the presence of an unknown peak with consumption of the bottom fragment. After 48 hours, there was no change in the unknown peak. The reaction was allowed to cool to room temp. The mixture was transferred to a separatory funnel for a phase separation. The phases were separated. The organic phase was dried over magnesium sulfate, filtered by vacuum filtration, and concentrated by rotary evaporation to afford a crude sticky golden orange solid (2.7634 g). The solid was analyzed by $^1$H NMR. The solid was dissolved in a mixture of tetrahydrofuran (11.5 mL) and methanol (11.5 mL) and was then heated to 60° C. (heating mantle temperature). To the solution was added p-toluenesulfonic acid, monohydrate (0.0408 g, 0.2144 mmol). The reaction stirred at 60° C. overnight and was sampled for $^{19}$F NMR analysis for completion which showed the formation of the desired product with some protected material remaining. The reaction was concentrated by rotary evaporation to afford a sticky golden orange solid (2.3863 g). The solid was analyzed by $^1$H NMR. The solid was dissolved in chloroform and silica gel was added. The slurry was concentrated by rotary evaporation to afford a powdery mixture. The mixture was loaded onto the Isco CombiFlash System using and was run using a 330 g Grace column and a gradient from 40-50% chloroform in hexanes. The fractions were analyzed by TLC analysis. The pure fractions were combined and concentrated by rotary evaporation to afford an off white crystalline solid. To remove traces of hexanes, the solid was dissolved in dichloromethane and concentrated by rotary evaporation to afford an off white crystalline solid (repeated twice). The solid was dried under high vacuum to afford 0.8765 g (58.0%) of the product as an off white crystalline solid.

$^1$H NMR (400 MHz, CDCl$_3$) δ 8.13 (d, J=7.7 Hz, 4H), 7.43-7.41 (m, 4H), 7.38 (d, J=7.7 Hz, 4H), 7.25 (s, 4H), 6.96 (dd, J=8.8, 3.2 Hz, 2H), 6.81 (dd, J=8.5, 3.3 Hz, 2H), 6.23 (s, 2H), 3.63 (t, J=6.3 Hz, 4H), 1.91 (s, 6H), 1.73 (s, 4H), 1.72-1.66 (m, 2H), 1.37 (s, 12H), 0.87 (t, J=7.8 Hz, 36H), 0.78 (s, 18H), 0.75-0.69 (m, 24H). $^{13}$C NMR (101 MHz, CDCl$_3$) δ 160.18, 157.76, 150.26, 150.23, 147.73, 143.06, 140.97, 135.18, 133.69, 133.60, 132.98, 132.89, 129.12, 127.38, 126.44, 126.42, 125.47, 125.07, 124.08, 119.77, 117.44, 117.21, 116.30, 116.07, 115.66, 71.08, 57.18, 38.38, 32.60, 32.00, 31.79, 30.81, 30.13, 16.55, 16.53, 7.57, 3.74. Multiplicities due to carbon-fluorine coupling were not identified.

2H), 1.24 (s, 6H), 1.24 (s, 6H), 1.18 (s, 6H), 1.17-1.12 (m, 18H), 1.11-0.96 (m, 12H), 0.98-0.92 (m, 18H), 0.93 (s, 18H), 0.81-0.74 (m, 12H), -0.74 (s, 6H). $^{13}$C NMR (101 MHz, $C_6D_6$) δ 160.53 (d, J=246.5 Hz), 153.92, 149.23, 149.20, 141.73, 141.19, 140.77, 135.94 (d, J=8.4 Hz),

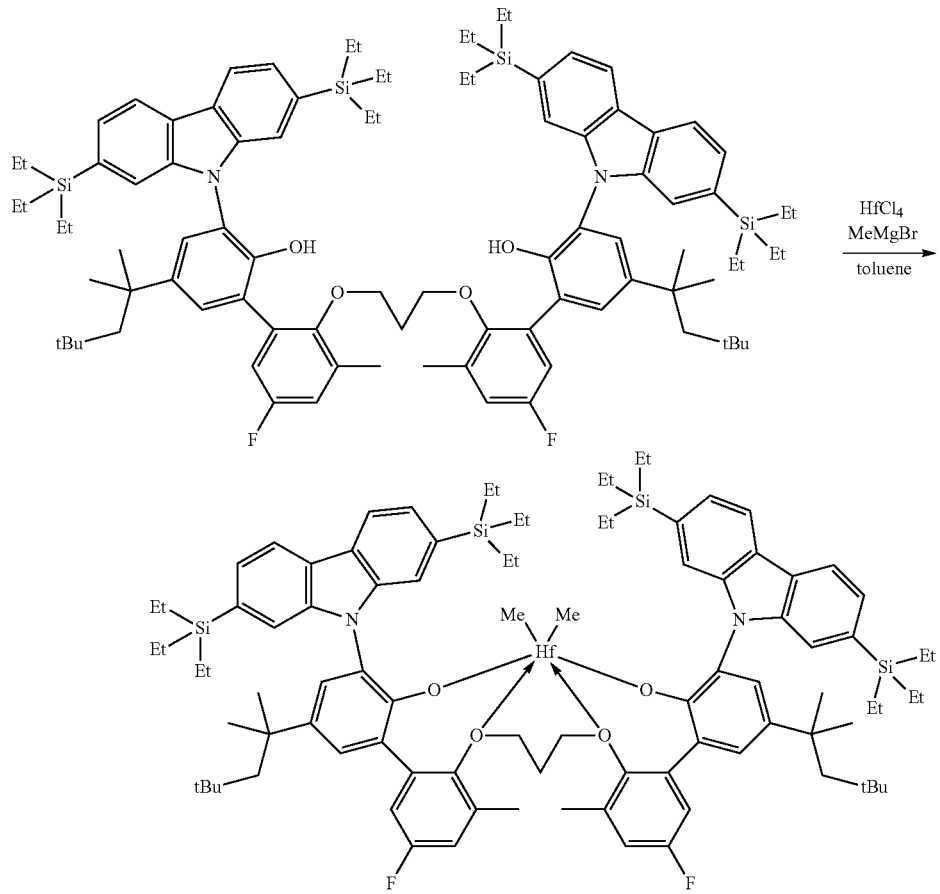

Preparation of Inv. Cat 7

To HfCl$_4$ (0.085 mg 0.27 mmol) suspended in toluene (8 mL) was added 3 M solution of methylmagnesium bromide in diethyl ether (0.37 mL, 1.11 mmol). After 2 min of stirring at ambient temperature, the ligand (0.4, 0.3 mmol) was added. After stirring for 1 hr. at room temperature, 15 mL of hexane was added and suspension was filtered giving colorless solution. Solvent was removed under reduced pressure giving 0.383 g of white solid. NMR spectrum shows formation of quite clean complex. The product was dissolved in 3 mL of warm toluene followed by addition of 20 mL of hexane. Solution was put into freezer (-30° C.) for a week which led for formation of highly crystalline (small crystals visible) solid. Solid was collected on the frit, washed with 2 mL of hexane and dried under reduced pressure to give 0.1999 g (44.3%) of product.

$^1$H NMR (400 MHz, $C_6D_6$) δ 8.28 (dd, J=7.7, 0.7 Hz, 2H), 8.16 (dd, J=7.7, 0.7 Hz, 2H), 8.04 (s, 2H), 7.93 (s, 2H), 7.74 (d, J=2.5 Hz, 2H), 7.61 (dd, J=7.7, 0.8 Hz, 2H), 7.51 (dd, J=7.7, 0.8 Hz, 2H), 7.31 (d, J=2.5 Hz, 2H), 6.90 (dd, J=8.8, 3.2 Hz, 2H), 6.07 (ddd, J=8.1, 3.2, 0.8 Hz, 2H), 3.65 (dt, J=9.9, 4.8 Hz, 2H), 3.38 (dt, J=10.5, 5.4 Hz, 2H), 1.67 (d, J=14.5 Hz, 2H), 1.53 (d, J=14.5 Hz, 2H), 1.40 (p, J=4.8 Hz, 135.09, 135.05 (d, J=8.5 Hz), 130.57, 128.57, 126.83, 126.48, 126.16, 125.61, 123.99, 120.56, 119.74, 119.08, 117.38, 117.16, 116.84, 76.14, 57.44, 50.80, 38.15, 33.35, 32.60, 32.00, 30.33, 29.66, 16.63, 7.92, 7.90, 7.85, 4.22, 4.08. $^{19}$F NMR (376 MHz, $C_6D_6$) δ -115.24 (t, J=8.2 Hz).

Preparation of Inventive Catalyst 8 (Inv. Cat. 8)

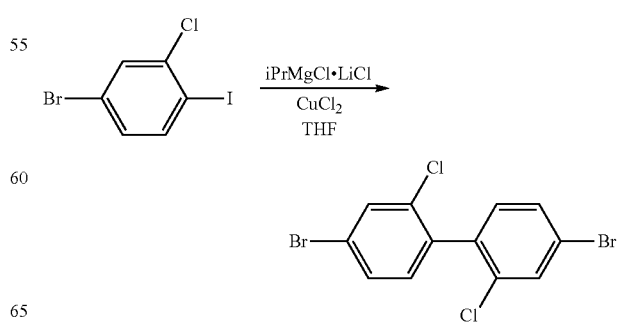

Preparation of 4,4'-dibromo-2,2'-dichloro-1,1'-biphenyl

An oven-dried 1 L flask equipped with stir bar was charged with 4-bromo-2-chloroiodobenzene (40.0 g, 126.0 mmol) and THF (320 mL). The reaction mixture was cooled to −78° C. and 1.3 M i-PrMgCl.LiCl in THF (122 mL, 157.6 mmol) was added under nitrogen atmosphere using a syringe pump in 90 minutes. The nitrogen inlet was replaced with air and solid copper (11) chloride (18.64 g, 138.7 mmol) was added at −78° C. and the stirring was continued at the same temperature for 1 hour before allowing the reaction to warm to room temperature and stir overnight. The solvent was removed in a rotary evaporator, the resulting mixture was extracted with dichloromethane (3×100 mL). The combined organic layers were dried over anhydrous magnesium sulfate and filtered. The solvent was removed in a rotary evaporator. The solid was dry-packed on silica gel and purified on an ISCO instrument with a Redi Sep 300 g column using 100% hexanes until the titled compound eluded. The pure fractions were concentrated by rotary evaporation to afford white solid, 16.90 g (70%).

$^1$H NMR (400 MHz, CDCl$_3$) δ 7.64 (dt, J=2.0, 0.4 Hz, 2H), 7.45 (ddd, J=8.2, 2.0, 0.6 Hz, 2H), 7.10 (dt, J=8.2, 0.3 Hz, 2H). $^{13}$C NMR (101 MHz, CDCl$_3$) δ 136.21, 134.40, 132.08, 129.92, 122.55.

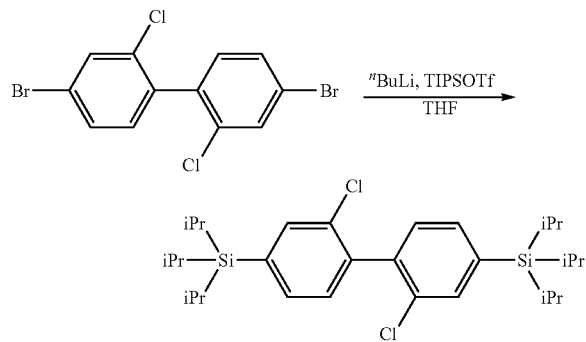

Preparation of 2,2'-dichloro-[1,1'-biphenyl]-4,4'-diyl)bis(triisopropylsilane)

An oven dried 250 mL round bottom flask equipped with a magnetic stirring bar was charged with 4,4'-dibromo-2,2'-dichloro-1,1'-biphenyl (10.60 g, 27.8 mmol) and THF (50 mL). The reaction mixture was cooled to −78° C. using an acetone-dry ice bath. A solution of 1.6 M n-butyllithium in THF (40 mL, 66.8 mmol) was added dropwise and stirred for 20 minutes. Triisopropylsilyl trifluoromethanesulfonate (18.0 mL, 66.8 mmol) was added dropwise to the reaction mixture −78° C. and the stirring was continued at the same temperature for 1 hour before allowing the reaction to warm to room temperature and stir overnight. The solvent was removed in a rotary evaporator, the resulting mixture was extracted with dichloromethane (3×100 mL). The combined organic layers were dried over anhydrous magnesium sulfate and filtered. The solvent was removed in a rotary evaporator. The solid was dry-packed on silica gel and purified on an ISCO instrument with a Redi Sep 300 g column using 100% hexanes until the titled compound eluded. The pure fractions were concentrated by rotary evaporation to afford white solid, 9.0 g (60%).

$^1$H NMR (500 MHz, CDCl$_3$) δ 7.56 (d, J=1.0 Hz, 2H), 7.41 (dd, J=7.4, 1.1 Hz, 2H), 7.27 (d, J=7.5 Hz, 2H), 1.43 (hept, J=7.5 Hz, 6H), 1.12 (d, J=7.5 Hz, 36H). $^{13}$C NMR (126 MHz, CDCl$_3$) δ 138.27, 137.24, 135.59, 133.04, 132.99, 130.31, 18.54, 10.80.

HRMS (ESI, [M-Cl]$^+$), m/z calcd for C$_{30}$H$_{48}$ClSi$_2$ (500.31), found 500.30.

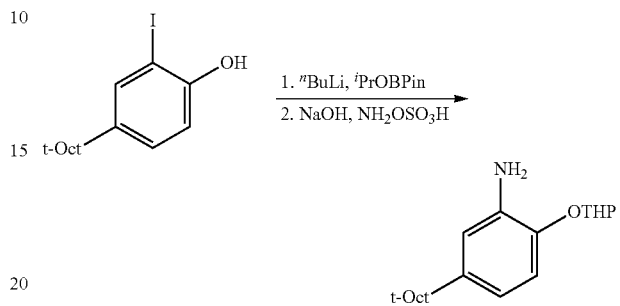

Preparation of 2-((tetrahydro-2H-pyran-2-yl)oxy)-5-(2,4,4-trimethylpentan-2-yl)aniline An oven-dried 250 mL round bottom flask equipped with a stir bar was charged with 2-(2-iodo-4-(2,4,4-trimethylpentan-2-yl)phenoxy)tetrahydro-2H-pyran (10.50 g, 25.2 mmol) and dried tetrahydrofuran (30 mL). The solution was cooled to −78° C. using an acetone-dry ice bath and 1.6 M n-butyllithium in hexanes (18.9 mL, 30.3 mmol) was added slowly. After stirring for 30 minutes, 2-iso-propoxy-4,4,5,5-tetramethyl-1,3,2-dioxaborolane (0.5 mL, 2.5 mmol) was added slowly. The reaction mixture was stirred for one hour at 0-10° C. before allowing the reaction to warm to room temperature and stir overnight. The solvent was removed in a rotary evaporator. The resulting mixture was extracted with dichloromethane (3×100 mL). The combined organic extracts were dried over anhydrous magnesium sulfate and filtered. The solvent was removed in a rotary evaporator. The resulting red oil was redissolved in THF (126 mL). The solution was cooled to 0° C. and hydroxylamine-o-sulfonic acid (8.55 g, 75.7 g) was added in two equal portions with the interval of 3 hours. The reaction mixture was stirred for one hour at 0-10° C. before allowing the reaction to warm to room temperature and stir overnight. The solvent was removed in a rotary evaporator. The resulting mixture was extracted with dichloromethane (3×100 mL). The combined organic layers were dried over anhydrous magnesium sulfate and filtered. The solvent was removed in a rotary evaporator. The crude oil was dry-packed on silica gel and purified on an ISCO instrument with a Redi Sep 300 g column using 0-15% ethyl acetate-hexanes gradient until the titled compound eluded. The pure fractions were concentrated by rotary evaporation to afford red-colored oil, 4.8 g (62%).

$^1$H NMR (500 MHz, CDCl$_3$) δ 6.94 (d, J=8.5 Hz, 1H), 6.75 (d, J=2.3 Hz, 1H), 6.69 (dd, J=8.5, 2.3 Hz, 1H), 5.32 (t, J=3.5 Hz, 1H), 3.97 (ddd, J=11.8, 9.0, 3.3 Hz, 1H), 3.76 (s, 2H), 3.64-3.59 (m, J=, 1H), 2.09-1.94 (m, 1H), 1.95-1.83 (m, 2H), 1.73-1.56 (m, 5H), 1.31 (s, 6H), 0.75 (s, 9H). $^{13}$C NMR (126 MHz, CDCl$_3$) δ 144.26, 142.51, 135.87, 116.47, 114.62, 113.96, 97.56, 62.35, 56.95, 37.99, 32.35, 31.76, 31.56, 30.75, 25.24, 19.25.

HRMS [ESI, (M+H)$^+$], m/z calcd for C$_{19}$H$_{32}$NO$_2$ (306.243), found 306.242.

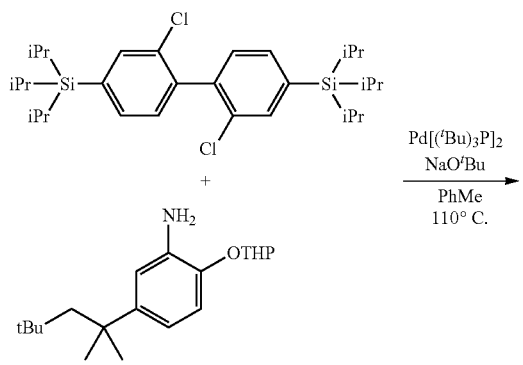

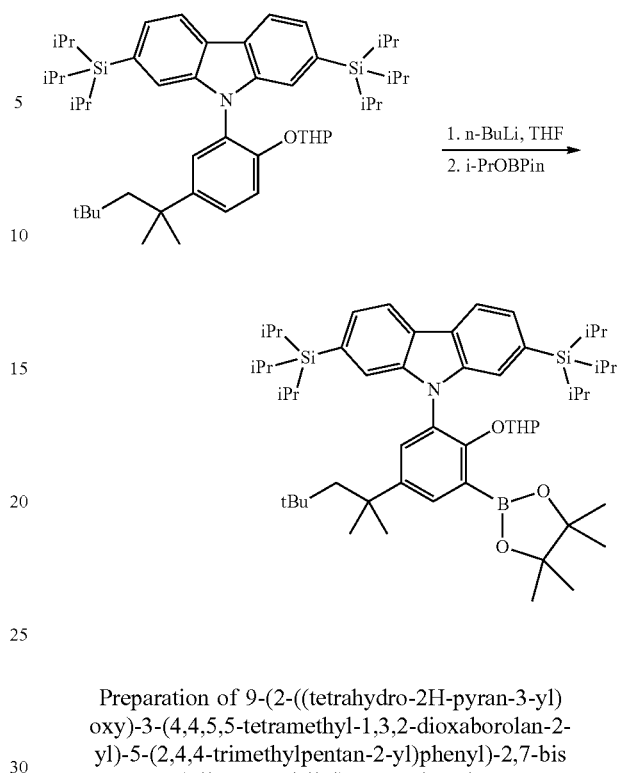

Preparation of 9-(2-((tetrahydro-2H-pyran-2-yl)oxy)-5-(2,4,4-trimethylpentan-2-yl)phenyl)-2,7-bis(triisopropylsilyl)-9H-carbazole An oven-dried 100 mL flask was charged with 2,2'-dichloro-[1,1'-biphenyl]-4,4'-diyl)bis(triisopropylsilane (7.3 g, 13.6 mmol), 2-((tetrahydro-2H-pyran-2-yl)oxy)-5-(2,4,4-trimethylpentan-2-yl)aniline (4.27 g, 14.2 mmol), sodium tert-butoxide (3.92 g, 40.9 mmol) and anhydrous toluene (60 mL) inside glove box. Bis(tri-tert-butylphosphine)palladium (0) (0.7 g, 1.4 mmol) was added and the reaction mixture was refluxed for 20 hours. The brown-colored solution was filtered through a pad of silica using dichloromethane and the solvent was removed over rotary evaporator to yield white solid. The crude oil was dry-packed on silica gel and purified on an ISCO instrument with a Redi Sep 300 g column using 0-20% ethyl acetate-hexane gradient until the titled compound eluded. The pure fractions were concentrated by rotary evaporation to afford white solid, 7.8 g (74%).

$^1$H NMR (500 MHz, CDCl$_3$) δ 8.12 (d, J=7.8 Hz, 2H), 7.50-7.44 (m, 2H), 7.37 (dd, J=7.7, 1.0 Hz, 2H), 7.31 (dd, J=5.1, 4.2 Hz, 2H), 7.23 (d, J=0.9 Hz, 1H), 5.18 (t, J=3.0 Hz, 1H), 3.41-3.32 (m, 1H), 3.24 (dt, J=11.0, 3.9 Hz, 1H), 1.75 (s, 2H), 1.43-1.35 (m, 12H), 1.20-0.96 (m, 42H), 0.74 (s, 9H). $^{13}$C NMR (126 MHz, CDCl$_3$) δ 151.11, 144.56, 141.24, 141.14, 132.01, 131.85, 127.80, 127.04, 126.90, 125.88, 125.83, 123.27, 123.19, 119.00, 117.37, 116.94, 116.73, 97.06, 61.32, 56.94, 38.17, 32.34, 31.89, 31.74, 31.42, 29.79, 24.87, 18.65, 18.63, 18.60, 18.59, 17.66, 10.96.

HRMS (ESI, M$^+$), m/z calcd for C$_{49}$H$_{77}$NO$_2$Si$_2$ (768.557), found 768.557.

Preparation of 9-(2-((tetrahydro-2H-pyran-3-yl)oxy)-3-(4,4,5,5-tetramethyl-1,3,2-dioxaborolan-2-yl)-5-(2,4,4-trimethylpentan-2-yl)phenyl)-2,7-bis(triisopropylsilyl)-9H-carbazole An oven-dried 250 mL round bottom flask equipped with a stir bar was charged with 9-(2-((tetrahydro-2H-pyran-2-yl)oxy)-5-(2,4,4-trimethylpentan-2-yl)phenyl)-2,7-bis(tri-isopropylsilyl)-9H-carbazole (7.8 g, 10.2 mmol) and dried tetrahydrofuran (50 mL). This solution was cooled to 0-10° C. using an ice-water bath and 2.5 M n-butyllithium in hexanes (16.4 mL, 26.2 mmol) was added slowly. After stirring for 4 hours, 2-iso-propoxy-4,4,5,5-tetramethyl-1,3,2-dioxaborolane (5.3 mL, 25.7 mmol) was added slowly. The reaction mixture was stirred for one hour at 0-10° C. before allowing the reaction to warm to room temperature and stir overnight. To the reaction mixture was added water (50 mL). The aqueous phase was extracted with dichloromethane (3×100 mL) and dried over anhydrous magnesium sulfate, and filtered by vacuum filtration. The filtrate was concentrated by rotary evaporation and placed under high vacuum to afford a bright orange foam, which was triturated from acetonitrile. The resulting orange solid was directly used in the Suzuki coupling reaction without further purification (9.1 g, 100%)

$^1$H NMR (500 MHz, CDCl$_3$) δ 8.09 (dd, J=7.8, 1.9 Hz, 2H), 7.86 (d, J=2.6 Hz, 1H), 7.57 (d, J=2.6 Hz, 1H), 7.48 (s, 1H), 7.37 (d, J=7.0 Hz, 3H), 5.03 (t, J=2.7 Hz, 1H), 2.54-2.44 (m, 1H), 2.39-2.27 (m, 1H), 1.79-1.69 (m, 2H), 1.44-1.37 (m, 12H), 1.35 (d, J=1.4 Hz, 12H), 1.14-1.02 (m, 42H), 0.74 (s, 9H). $^{13}$C NMR (126 MHz, CDCl$_3$) δ 156.30, 145.56, 140.24, 134.07, 131.85, 131.74, 129.53, 129.51, 125.88, 125.80, 123.48, 122.84, 118.91, 118.73, 118.23, 116.98, 101.73, 83.46, 60.78, 57.00, 38.31, 32.38, 32.00, 31.74, 30.87, 29.67, 25.07, 24.91, 24.86, 18.69, 18.64, 18.56, 17.90, 11.03, 10.93.

HRMS [ESI, (M+H)$^+$], m/z calcd for C$_{55}$H$_{89}$BNO$_4$Si$_2$ (894.642), found 893.641.

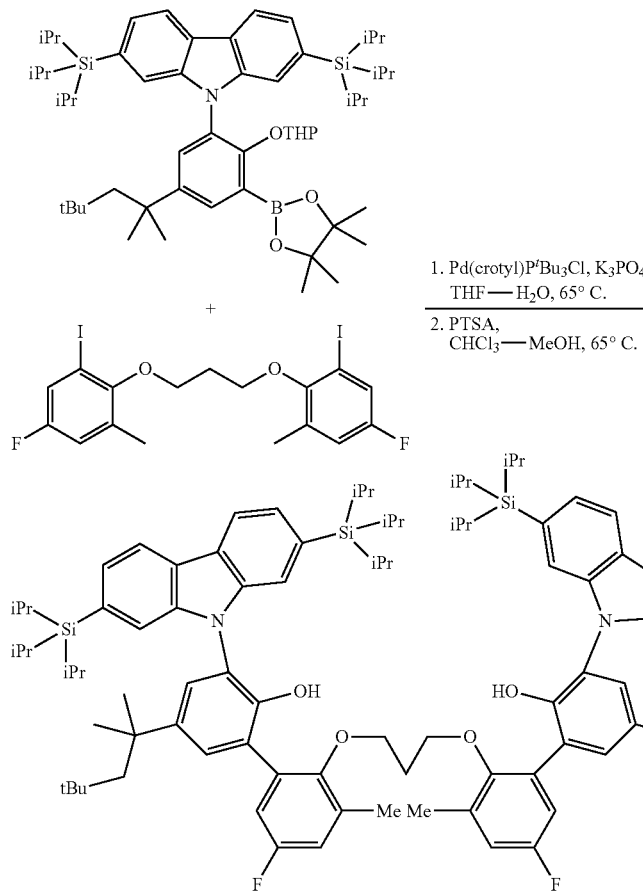

Preparation of 3-(2,7-bis(triisopropylsilyl)-9H-carbazol-9-yl)-2'-(3-((3'-(2,7-bis(triisopropylsilyl)-9H-carbazol-9-yl)-6-fluoro-2'-hydroxy-4-methyl-5'-(2,4,4-trimethylpentan-2-yl)-[1,1'-biphenyl]-3-yl)oxy)propoxy)-5'-fluoro-3'-methyl-5-(2,4,4-trimethylpentan-2-yl)-[1,1'-biphenyl]-2-ol A 100 mL two-neck round bottom flask equipped with a stir bar was charged with 9-(2-((tetrahydro-2H-pyran-3-yl)oxy)-3-(4,4,5,5-tetramethyl-1,3,2-dioxaborolan-2-yl)-5-(2,4,4-trimethylpentan-2-yl)phenyl)-2,7-bis(triisopropylsilyl)-9H-carbazole (3.45 g 3.86 mmol), 3-bis(4-fluoro-2-iodo-6-methylphenoxy)propane (1.0 g, 1.84 mmol), potassium phosphate tribasic (1.56 g, 7.35 mmol) and chloro(crotyl)(tri-tert-butylphosphine)palladium(II) (0.051 g, 0.13 mmol). The reaction flask was connected to a reflux condenser and three cycles of evacuation and backfilling with nitrogen was carried out. To the mixture was added degassed tetrahydrofuran (10 mL) and degassed water (1 mL) sequentially. The reaction mixture was stirred at 65° C. for 24 hours and then allowed to cool to room temperature. The mixture was concentrated by rotary evaporation to afford a reddish oil as a crude protected THP ligand. The crude product was dry-packed on celite and purified on a reverse-phase ISCO instrument with a Redi Sep 415 g HP C18 column using 70-90% tetrahydrofuran in water gradient until the titled compound eluded. The pure fractions were combined and the aqueous phase was extracted with dichloromethane (3×100 mL). The combined phases were dried over anhydrous magnesium sulfate, and filtered by vacuum filtration. The filtrate was concentrated by rotary evaporation and placed under high vacuum to afford a light red solid. The THP protected ligand was dissolved in a mixture of chloroform (5 mL) and methanol (5 mL). After adding p-toluenesulfonic acid monohydrate (0.035 g, 0.18 mmol), the reaction mixture was heated to 65° C. and stirred for 2.5 hours and then allowed to cool to room temperature. The reaction mixture was concentrated and the solid was dry-packed on silica gel and purified on an ISCO instrument with a Redi Sep 80 g column using 20-50% chloroform in hexanes gradient until the titled compound eluded as a light pink solid. Yield: 1.8 g, 55%.

$^1$H NMR (500 MHz, CDCl$_3$) δ 8.13 (d, J=7.7 Hz, 4H), 7.49-7.35 (m, 8H), 7.29 (s, 4H), 6.92 (dd, J=8.9, 3.2 Hz, 2H), 6.82 (dd, J=8.7, 3.1 Hz, 2H), 6.18 (s, 2H), 3.60 (t, J=6.3 Hz, 4H), 1.96 (s, 6H), 1.63 (p, J=6.4 Hz, 2H), 1.39-1.26 (m, 24H), 0.98 (dd, J=7.5, 2.3 Hz, 72H), 0.75 (s, 18H). $^{13}$C NMR (126 MHz, CDCl$_3$) δ 159.65, 157.72, 150.12, 147.30, 142.74, 140.41, 133.37, 132.61, 132.35, 128.80, 126.84, 126.42, 126.20, 124.72, 123.63, 119.33, 117.17, 116.99, 116.69, 116.08, 115.94, 70.71, 56.95, 38.15, 32.36, 31.76, 31.65, 30.62, 18.56, 18.51, 16.52, 10.88. (All peaks listed in $^{13}$C-NMR. $^{19}$F $^{13}$C coupling constants not determined.) $^{19}$F NMR (470 MHz, CDCl$_3$) δ −118.81.

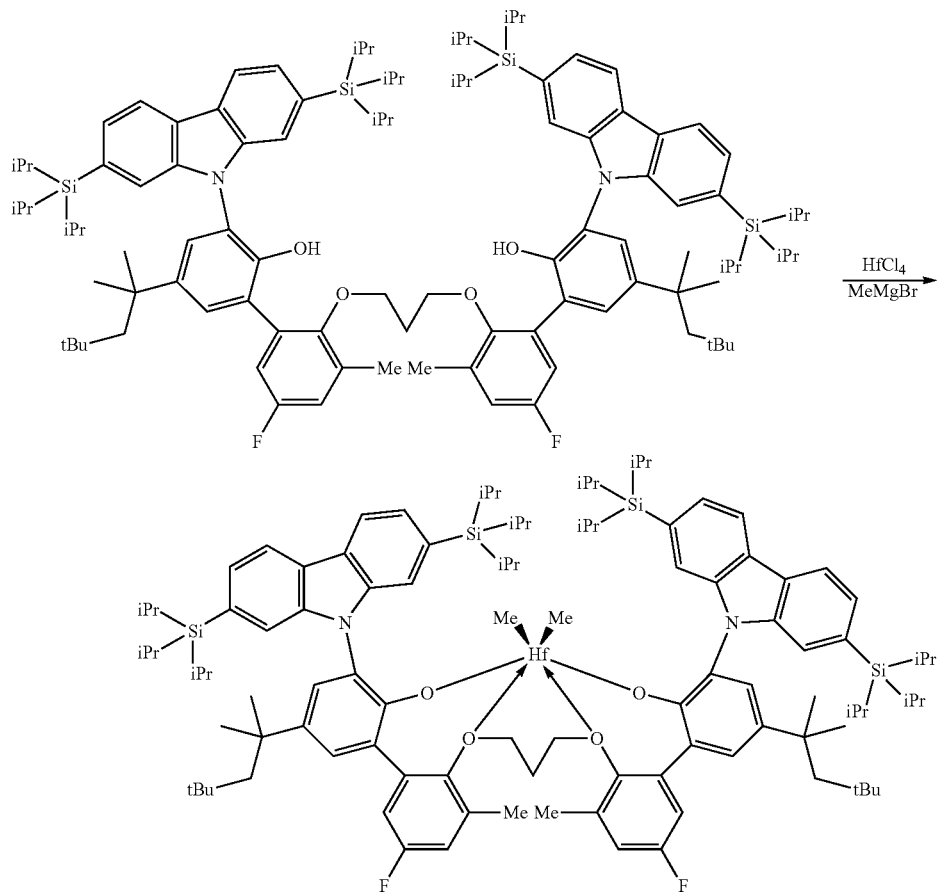

Preparation of Inv. Cat. 8

An oven-dried jar was charged with hafnium tetrachloride (0.047 g, 0.15 mmol) and toluene (5 mL). To the stirring slurry was added 3.0 M methylmagnesium bromide in diethyl ether (0.22 mL, 0.65 mmol). The heterogeneous mixture, which upon vigorous stirring for 5 minutes turned cloudy and light brown. To the mixture was added a solution of the ligand (0.25 g, 0.15 mmol) in toluene (5 mL). The resulting brown mixture was stirred at room temperature for 2.5 hours. The reaction mixture was diluted with hexanes (10 mL) and filtered to obtain a clear solution. The solution was concentrated to afford the Hf-complex. The crude solid was triturated using toluene-hexanes mixture (10 mL). The slurry was filtered and placed to concentrate under high vacuum to afford the product as an off white solid (0.22 g, 78%).

$^1$H NMR (500 MHz, Toluene-d$_8$) δ 8.25 (d, J=7.7 Hz, 2H), 8.11 (d, J=7.7 Hz, 2H), 7.98 (s, 2H), 7.93 (s, 2H), 7.62 (d, J=2.5 Hz, 2H), 7.57 (d, J=7.8 Hz, 2H), 7.50 (d, J=7.7 Hz, 2H), 7.31-7.30 (m, 2H), 6.93 (dd, J=8.6, 3.2 Hz, 2H), 6.10 (dd, J=8.2, 3.1 Hz, 2H), 3.81 (dt, J=9.8, 4.6 Hz, 2H), 3.61 (dt, J=10.3, 5.3 Hz, 2H), 1.62-1.56-(m, 10H), 1.43-0.99 (m, 98H), 0.75 (s, 18H), −0.76 (s, 6H).

$^{13}$C NMR (126 MHz, Toluene-d$_8$) δ 161.21, 159.25, 153.90, 148.74, 141.64, 141.16, 140.38, 137.38, 137.25, 136.81, 135.85, 135.78, 134.97, 134.90, 134.22, 130.45, 130.36, 127.09, 126.74, 126.69, 126.34, 126.03, 125.23, 123.41, 120.04, 119.32, 119.20, 117.55, 117.54, 116.84, 116.77, 116.64, 116.61, 75.89, 56.76, 50.97, 37.67, 37.21, 32.81, 32.10, 31.70, 31.54, 30.36, 29.96, 29.57, 20.98, 19.11, 19.02, 18.72, 18.58, 16.78, 13.98, 11.55, 11.32, 11.20. (All peaks listed in $^{13}$C-NMR. $^{19}$F-$^{13}$C coupling constants not determined.)

$^{19}$F NMR (376 MHz, Toluene-d$_8$) δ −114.88.

Preparation of Inventive Catalyst 9 (Inv. Cat. 9)

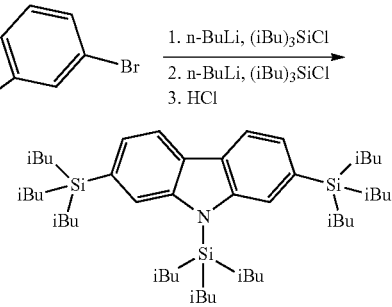

Preparation of 2,7,9-Tris(triisobutylsilyl)-9H-carbazole

A three-necked round bottom flask was equipped with a magnetic stir bar and septa. In a glovebox, the flask was charged with 2,7-dibromo-9H-carbazole (0.25 g, 0.77 mmol) and dried THF (7.5 mL). The flask was taken out of the glovebox to a fume hood, equipped with a nitrogen gas inlet, and placed under nitrogen atmosphere. The stirred light brown solution was cooled to −78° C. (dry ice/acetone bath) and a 1.6M solution of n-butyllithium in hexane (0.53 mL, 0.85 mmol) was added slowly via syringe. The resulting brown solution was stirred for 30 minutes at −78° C. then triisobutylsilyl chloride (0.23 mL, 0.86 mmol) was added slowly via syringe. The bath was removed and the solution was stirred for 2.5 hours. After this time, the reaction was sampled for HRMS analysis which showed protection of the nitrogen with the silyl group. The resulting yellow solution was cooled to −78° C. (dry ice/acetone bath) and a 1.6M solution of n-butyllithium in hexane (2.6 mL, 3.8 mmol) was added slowly via syringe. The solution was stirred for 2 hours at −78° C. then triisobutylsilyl chloride (1.1 mL, 4.1 mmol) was added slowly via syringe to the resulting brown solution. The reaction was allowed to slowly warm up to room temperature overnight (by not removing the bath). After stirring overnight, the reaction was sampled for HRMS analysis which showed the formation of the desired product. The resulting murky yellow solution was cooled to 0° C. (ice water bath) and a 3% solution of hydrochloric acid (2.7 mL) was added slowly while stirring vigorously to quench the reaction. The mixture was allowed to warm up to room temperature. The phases were separated and the organic phase was washed with a saturated solution of ammonium chloride (2.7 mL). The phases were separated. The aqueous phases were combined and extracted with ethyl acetate (3×5 mL portions). The organic phases were combined, dried over magnesium sulfate, filtered by vacuum filtration, and concentrated by rotary evaporation to afford a dark yellow oil (1.1187 g). The oil was dissolved in chloroform and silica gel was added and the slurry was concentrated by rotary evaporation to afford a powdery mixture. The mixture was loaded onto the ISCO CombiFlash System and run using a 220 g RediSep High Performance Column and a gradient of 100% hexanes. The fractions were analyzed by HRMS and TLC. The pure fractions were combined and concentrated by rotary evaporation to afford a light yellow crystalline solid. To remove traces of hexanes, the solid was dissolved in dichloromethane and concentrated by rotary evaporation to afford a light yellow crystalline solid (repeated twice). The solid was dried under high vacuum to afford 0.1857 g (31.7%) of the product as a light yellow crystalline solid.

$^1$H NMR (400 MHz, CDCl$_3$) δ 8.08 (d, J=7.7 Hz, 2H), 7.91 (s, 2H), 7.42 (d, J=7.7 Hz, 2H), 1.97-1.80 (m, 9H), 1.41 (d, J=6.9 Hz, 6H), 1.01 (d, J=6.9 Hz, 12H), 0.97 (d, J=6.6 Hz, 36H), 0.93 (d, J=6.6 Hz, 18H). $^{13}$C NMR (101 MHz, CDCl$_3$) δ 144.63, 136.07, 126.77, 125.06, 119.43, 119.40, 26.79, 26.29, 25.95, 25.16, 24.94, 24.75.

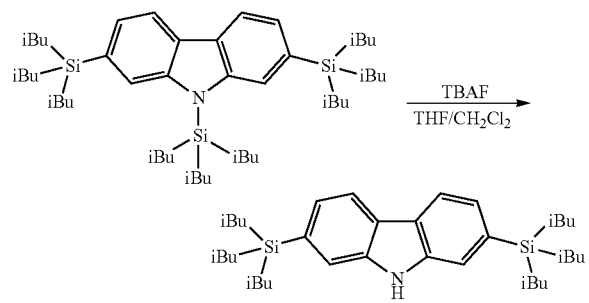

Procedure Modified from the Following Reference: WO2009003919 (A1)

Preparation of 2,7-Bis(triisobutylsilyl)-9H-carbazole

A three-necked round bottom flask was equipped with a magnetic stir bar, septa, and a nitrogen gas inlet. A solution of 1M tetrabutylammonium fluoride in tetrahydrofuran (0.23 mL, 0.23 mmol) was slowly added to a solution of 2,7,9-tris(triisobutylsilyl)-9H-carbazole (0.18 mL, 0.23 mmol) in dichloromethane (0.6 mL) at room temperature. The resulting yellow solution was stirred for 1 hour at room temperature. After 1 hour, the reaction was concentrated by rotary evaporation to afford a crude yellow oil (0.1769 g). The oil was dissolved in chloroform and silica gel was added. The slurry was concentrated by rotary evaporation to afford a dry powdery mixture. The powdery mixture was loaded onto the ISCO CombiFlash System and run using a 40 g RediSep High Performance Column and a gradient of 100% hexanes. The fractions were analyzed by TLC. The pure fractions were combined and concentrated by rotary evaporation to afford a white solid. To remove traces of hexanes, the solid was dissolved in dichloromethane and concentrated by rotary evaporation to afford a white solid (repeated twice). The solid was dried under high vacuum to afford 0.1057 g (81.6%) of the product as a white solid.

$^1$H NMR (400 MHz, CDCl$_3$) δ 8.11 (dt, J=7.7, 0.7 Hz, 2H), 7.98 (s, 1H), 7.66 (d, J=0.9 Hz, 2H), 7.45 (dd, J=7.7, 0.9 Hz, 2H), 1.97-1.81 (m, J=6.7 Hz, 6H), 1.01 (d, J=6.9 Hz, 12H), 0.97 (d, J=6.6 Hz, 36H). $^{13}$C NMR (101 MHz, CDCl$_3$) δ139.42, 136.98, 125.22, 123.72, 119.64, 116.36, 26.77, 25.09, 24.58.

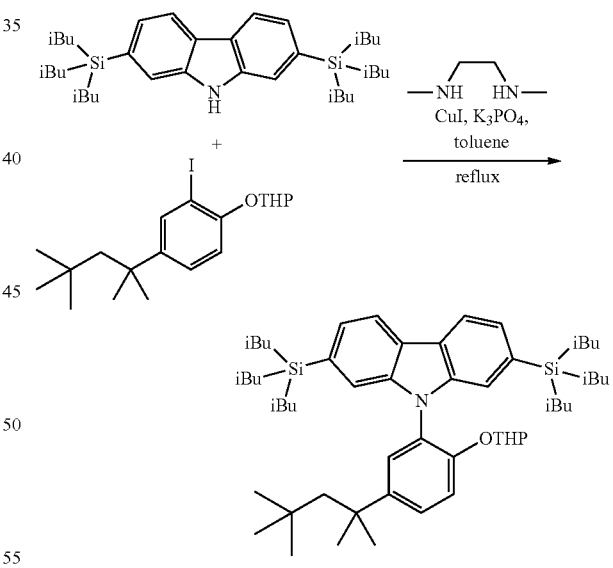

Preparation of 9-(2-((tetrahydro-2H-pyran-2-yl)oxy)-5-(2,4,4-trimethylpentan-2-yl)phenyl)-2,7-bis(triisobutylsilyl)-9H-carbazole A three-necked round bottom flask was equipped with a magnetic stir bar and septa. In a glovebox, the flask was charged with 2-(2-iodo-4-(2,4,4-trimethylpentan-2-yl)phenoxy)tetrahydro-2H-pyran (4.8685 g, 11.6936 mmol), 2,7-bis(triisobutylsilyl)-9H-carbazole (4.1 g, 7.25 mmol), potassium phosphate tribasic (5.2589 g, 24.7746 mmol), and dried toluene (19 mL). A mixture of anhydrous copper (1) iodide (0.0556 g, 0.2919 mmol), N,N'-dimethylethylenediamine (0.1016 mL, 0.9440 mmol) and dried toluene (1 mL) was added to the flask. The flask was taken out of the glovebox to a fume hood and was equipped with a nitrogen gas inlet and a condenser. The reaction was placed under nitrogen atmosphere and was heated at 125° C. (heating mantle temperature). The reaction was sampled for TLC analysis for completion. After 17 hours, the TLC analysis showed formation of a new spot which was the desired product with some 2,7-bis(triisobutylsilyl)-9H-carbazole remaining. Therefore additional anhydrous copper (1) iodide (0.0589 g, 0.3092 mmol) slurried in dried toluene (1 mL) and N,N'-dimethylethylenediamine (0.1016 mL, 0.9440 mmol) was added and the reaction continued to stir at 125° C. for an additional 22 hours. After 39 hours, the TLC analysis showed 2,7-bis(triethylsilyl)-9H-carbazole still remaining. Therefore additional anhydrous copper (1) iodide (0.0531 g, 0.2788 mmol) slurried in dried toluene (1 mL) and N,N'-dimethylethylenediamine (0.1016 mL, 0.9440 mmol) was added and the reaction continued to stir at 125° C. for an additional 26 hours. After 65 hours, the TLC analysis showed 2,7-bis(triethylsilyl)-9H-carbazole still remaining. Therefore additional anhydrous copper (1) iodide (0.0531 g, 0.2788 mmol) slurried in dried toluene (1 mL) and N,N'-dimethylethylenediamine (0.1016 mL, 0.9440 mmol) was added and the reaction continued to stir at 125° C. for an additional 72 hours. After 137 hours, the TLC analysis showed a faint amount of 2,7-bis(triethylsilyl)-9H-carbazole remaining therefore the reaction was determined to be complete. The reaction was allowed to cool to room temperature. The reaction was diluted with tetrahydrofuran (20 mL) and was filtered by vacuum filtration through a small silica plug. The plug was washed with tetrahydrofuran (3×10 mL portions). The filtrate was concentrated by rotary evaporation to afford a crude reddish-brown oil (8.4084 g). The oil was analyzed by $^1$H NMR. The oil was placed under vacuum for ~1 hour to remove excess toluene. Acetonitrile was added to the oil and the mixture was stirred vigorously at 55° C. for 1 hour. The mixture was allowed to cool to room temperature and was placed in the freezer. The solvent was decanted. The sticky brown solid was washed with cold acetonitrile (3×15 mL portions) and decanted after each wash. To remove traces of acetonitrile, the oil was dissolved in dichloromethane and concentrated by rotary evaporation to afford a brown oil (repeated twice). The solid was dried under high vacuum to afford 6.2249 g (full conversion—100.7%) of the product as a thick brown oil. $^1$H NMR (400 MHz, CDCl$_3$) δ 8.09 (d, J=7.7 Hz, 2H), 7.52-7.43 (m, 2H), 7.43-7.35 (m, 2H), 7.35 (d, J=8.6 Hz, 1H), 7.32 (s, 1H), 7.24 (s, 1H), 5.21 (m, 1H), 3.50 (td, J=11.1, 2.7 Hz, 1H), 3.34 (dt, J=11.3, 3.8 Hz, 1H), 1.75 (m, 8H), 1.41 (s, 3H), 1.40 (s, 3H), 1.37-1.28 (m, 1H), 1.20-0.97 (m, 4H), 0.84 (d, J=6.7 Hz, 48H), 0.78 (s, 9H). $^{13}$C NMR (101 MHz, CDCl$_3$) δ 151.47, 144.53, 141.49, 141.46, 136.55, 136.37, 128.17, 127.16, 126.89, 125.11, 125.04, 123.44, 123.41, 119.29, 119.27, 117.14, 116.02, 115.89, 97.18, 61.57, 57.11, 38.38, 32.61, 32.06, 32.00, 31.80, 30.07, 26.72, 26.70, 25.11, 25.01, 24.53, 24.49, 17.94.

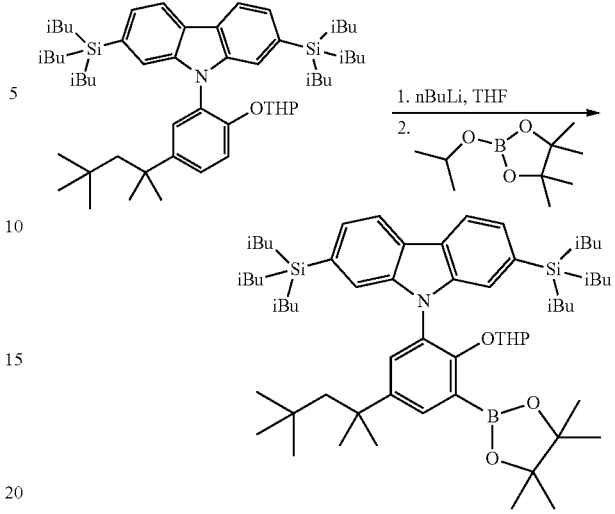

Preparation of 9-(2-((tetrahydro-2H-pyran-2-yl) oxy)-3-(4,4,5,5-tetramethyl-1,3,2-dioxaborolan-2-yl)-5-(2,4,4-trimethylpentan-2-yl)phenyl)-2,7-bis (triisobutylsilyl)-9H-carbazole In a glove box, a three necked round bottom flask equipped with a magnetic stir bar and septa was charged with 9-(2-((tetrahydro-2H-pyran-2-yl)oxy)-5-(2,4,4-trimethylpentan-2-yl)phenyl)-2,7-bis(triisobutylsilyl)-9H-carbazole (6.13 g, 7.19 mmol) and dried tetrahydrofuran (45 mL). The flask was taken out of the glove box to the hood and was equipped with a nitrogen gas inlet. The reaction was placed under nitrogen atmosphere and was cooled to 0-10° C. (ice water bath) for 15 minutes. A solution of 2.5M n-BuLi in hexanes (7.5 mL, 18.8 mmol) was slowly added via syringe. The brown solution turned to a murky brownish-orange solution. After stirring for 4 hours at 0-10° C., 2-isopropoxy-4,4,5,5-tetramethyl-1,3,2-dioxaborolane (3.8 mL, 18.6 mmol) was slowly added via syringe to the murky reddish-orange solution. The reaction was stirred for 1 hour at 0-10° C. before allowing the reaction to warm up to room temperature. The reaction continued to stirred at room temperature overnight. A cold solution of saturated aqueous sodium bicarbonate (40 mL) was added to the murky reddish-orange solution. The mixture was transferred to a separatory funnel for a phase separation. The phases were separated. The aqueous phase was extracted with dichloromethane (3×30 mL portions). The organic phases were combined and washed with cold saturated aqueous sodium bicarbonate (105 mL) and then brine (105 mL). The organic phase was dried over magnesium sulfate, filtered by vacuum filtration, and concentrated by rotary evaporation to afford a crude brown sticky solid. The solid was analyzed by $^1$H NMR. To remove impurities, acetonitrile was added to the sticky solid and the mixture was stirred vigorously at 55° C. for 1 hour. The mixture was allowed to cool to room temperature and was placed in the freezer. The solids were filtered by vacuum filtration and washed with cold acetonitrile (3×10 mL portions) and decanted after each wash. To remove traces of acetonitrile, the light brown solids were dissolved in dichloromethane and concentrated by rotary evaporation to afford a light brown crystalline solid (repeated twice). The solid was analyzed by $^1$H NMR. The solid was dried under high vacuum to afford 6.3590 g (90.4%) of the product as a light brown crystalline solid.

¹H NMR (400 MHz, CDCl₃) δ 8.06 (d, J=7.7 Hz, 2H), 7.87 (d, J=2.5 Hz, 1H), 7.51 (d, J=2.5 Hz, 1H), 7.45 (s, 1H), 7.42-7.35 (m, 3H), 5.01 (t, J=2.9 Hz, 1H), 2.55-2.53 (m, 2H), 1.85-1.70 (m, 8H), 1.69-1.60 (m, 1H), 1.44 (s, 3H), 1.40 (s, 3H), 1.36 (d, J=3.5 Hz, 12H), 1.29-1.18 (m, 2H), 1.16-0.96 (m, 3H), 0.92-0.79 (m, 48H), 0.75 (s, 9H). ¹³C NMR (101 MHz, CDCl₃) δ 156.65, 145.67, 140.83, 140.80, 136.67, 136.30, 134.11, 130.35, 129.77, 125.04, 123.62, 123.17, 119.16, 119.06, 117.08, 116.21, 101.83, 83.68, 61.17, 57.06, 38.52, 32.62, 32.13, 32.06, 31.34, 30.03, 26.79, 26.74, 26.71, 26.68, 25.22, 25.05, 25.01, 24.96, 24.69, 24.46, 18.29.

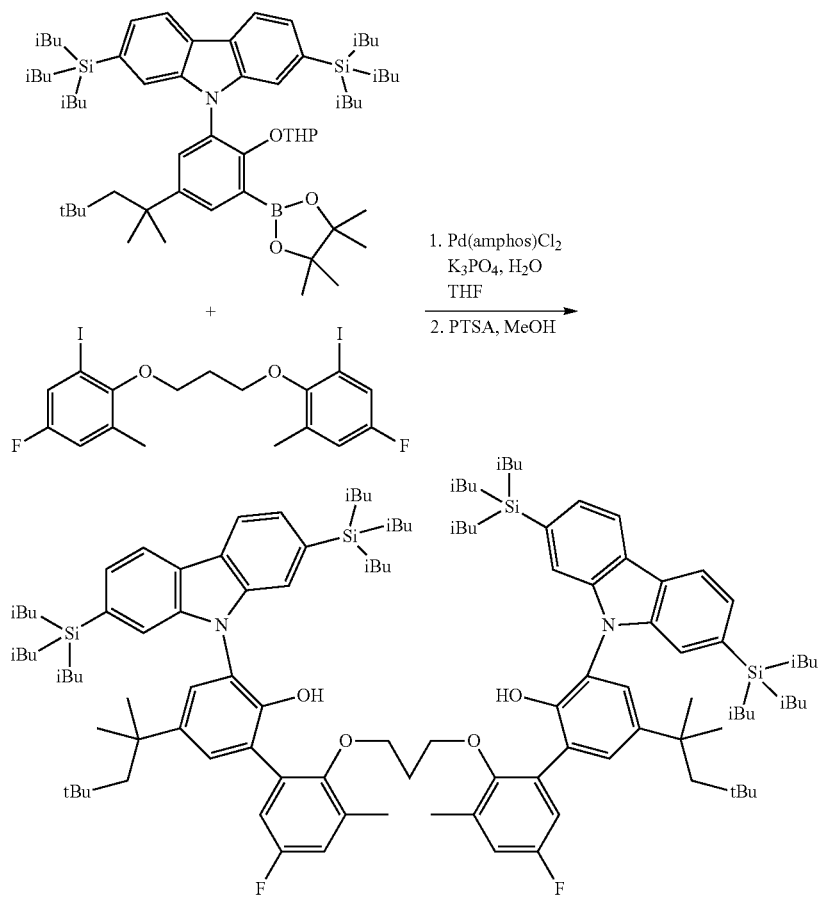

Preparation of 2',2'''-(propane-1,3-diylbis(oxy))bis (3-(2,7-bis(triisobutylsilyl)-9H-carbazol-9-yl)-5'-fluoro-3'-methyl-5-(2,4,4-trimethylpentan-2-yl)-[1,1'-biphenyl]-2-ol)

A three-necked round bottom flask was equipped with a magnetic stir bar, septa, a condenser, and a nitrogen gas inlet. The flask was charged with 9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-2,7-bis(triisobutylsilyl)-9H-carbazole (5.2312 g, 5.4364 mmol), a solution of potassium phosphate tribasic (3.24 g, 15.29 mmol) in water (20 mL), tetrahydrofuran (90 mL), and 1,3-bis(4-fluoro-2-iodo-6-methylphenoxy)propane (1.3853 g, 2.5459 mmol). The reaction was placed under nitrogen atmosphere, purged with nitrogen for 45 minutes, and then bis(di-tert-butyl(4-dimethylaminophenyl)phosphine)dichloropalladium(II) (0.1268 g, 0.1791 mmol) was added. The reaction was refluxed at 60° C. and was sampled for HPLC analysis for completion. After 2 hours, the HPLC showed formation of the desired protected ligand with top fragment (boronic acid and boronic ester) remaining, what could possibly be the mono-coupled product remaining, and what appeared to be bottom fragment remaining. After 21 hours, the HPLC showed top fragment (possibly deborolated) and what could possibly be the mono-coupled product remaining. Therefore the reaction was determined to be complete and was allowed to cool to room temperature. The reaction was transferred to a separatory funnel for a phase separation. The phases were separated. The organic phase was dried over magnesium sulfate, filtered through a plug of silica, and concentrated by rotary evaporation to afford a brownish-red sticky solid (6.4404 g). The sticky solid was dissolved in tetrahydrofuran and Celite was added. The slurry was concentrated by rotary evaporation to afford a dry powdery mixture. The powdery mixture was split in halve. Both halves were loaded onto the ISCO CombiFlash system and were run using a C18 415 g Gold Column and a slow gradient of 70-100% THF in water. The pure fractions were combined and concentrated by rotary evaporation to afford a mixture of water and product. Dichloromethane was added to dissolve the product and the mixture was transferred to a separatory funnel for a phase separation. The phases were separated. The organic phase was dried over magnesium sulfate, filtered by vacuum filtration, and concentrated by rotary evaporation to afford a light yellow crystalline solid (2.6818 g). The solid was dissolved in a mixture of chloroform (25 mL) and methanol (25 mL). The reaction was heated at reflux 60 OC and p-toluenesulfonic acid monohydrate was added (0.0486 g, 0.2555 mmol) was added. The reaction was sampled for $^{19}$F NMR analysis for completion. After 3 hours, the $^{19}$F NMR analysis showed formation of the deprotected ligand with consumption of the protected ligand. Therefore the reaction was determined to be complete and was allowed to cool to room temperature. To quench any remaining acid, sodium bicarbonate (25 mL) was added to the reaction. The reaction was transferred to a separatory funnel for a phase separation. The phases were separated. The organic phase was dried over magnesium sulfate, filtered by vacuum filtration, and concentrated by rotary evaporation to afford a crude orange sticky solid. The solid was analyzed by $^1$H NMR. The solid was dissolved in chloroform and silica gel was added. The slurry was concentrated by rotary evaporation to afford a dry powdery mixture. The powdery mixture was loaded onto the ISCO CombiFlash system and was run using a 330 g Gold RediSep High Performance Column and a gradient of 0-20% dichloromethane in hexanes. The pure fractions were combined and concentrated by rotary evaporation to afford a white crystalline solid. To remove traces of hexanes, the solid was dissolved in dichloromethane and concentrated by rotary evaporation to afford a white crystalline solid (repeated twice). The solid was dried under high vacuum to afford 2.6519 g (57.1%) of the product as a white crystalline solid.

$^1$H NMR (400 MHz, CDCl$_3$) δ 8.11 (dd, J=7.7, 0.7 Hz, 4H), 7.44 (s, 4H), 7.42 (dd, J=7.7, 0.8 Hz, 4H), 7.32 (s, 4H), 6.95 (dd, J=8.8, 3.1 Hz, 2H), 6.79 (dd, J=8.9, 3.0 Hz, 2H), 6.39 (s, 2H), 3.69 (t, J=6.2 Hz, 4H), 1.89 (s, 6H), 1.72 (th, J=13.2, 6.6 Hz, 19H), 1.39 (s, 12H), 0.78 (q, J=6.2 Hz, 118H). $^{13}$C NMR (101 MHz, CDCl$_3$) δ 160.20, 157.78, 150.22, 150.19, 147.64, 142.93, 140.81, 137.00, 133.74, 133.66, 132.97, 132.89, 128.92, 127.24, 126.48, 126.47, 125.62, 125.23, 123.90, 119.59, 117.40, 117.17, 116.41, 116.18, 115.85. (All peaks listed in $^{13}$C-NMR. $^{19}$F $^{13}$C coupling constants not determined.)

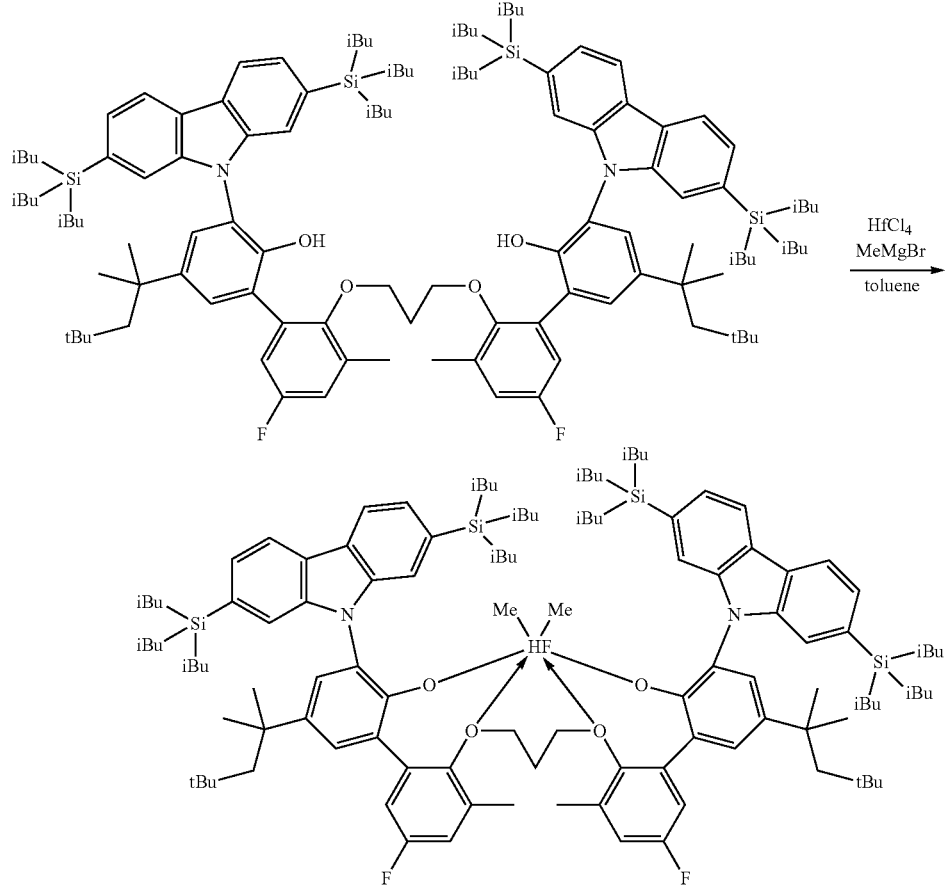

Preparation of Inv. Cat. 9

A jar was charged with HfCl$_4$ (0.0647 g, 0.2020 mmol) and toluene (15 mL). To the stirring slurry was added 3.0 M methylmagnesium bromide in diethyl ether (0.30 mL, 0.99 mmol). The mixture was stirred strongly for 5 minutes. The solid went in solution but the reaction solution was cloudy and yellow. To the mixture was added the ligand (0.35 g, 0.19 mmol) as a solid. The flask containing the ligand was rinsed with toluene (5 mL) and added to the reaction mixture. The resulting yellow mixture was stirred at room temperature for 3 hours. To the resulting brown mixture was added hexanes (20 mL) and filtered. The brown solution was concentrated under vacuum. To the residue was added another 20-mL of hexanes and allowed to concentrate under vacuum overnight to afford 0.3900 g of a white solid. The sample was analyzed by $^1$H and $^{19}$FNMR to showed that the desired product was obtained but contaminated with potential magnesium salts (NMR sample was cloudy another potential indication of magnesium salts) and other small impurities. To the solid was added hexanes (20 mL) and the cloudy solution was filtered. The transparent solution was concentrated under vacuum to afford 0.3491 g (89.14%) of the desired product as a white solid.

$^1$H NMR (500 MHz, $C_6D_6$) δ 8.29 (d, J=7.7 Hz, 2H), 8.17 (d, J=7.7 Hz, 2H), 8.07 (s, 4H), 7.70 (d, J=2.6 Hz, 2H), 7.66 (d, J=7.8 Hz, 2H), 7.63 (d, J=7.7 Hz, 2H), 7.32 (d, J=2.6 Hz, 2H), 7.02 (dd, J=8.7, 3.2 Hz, 2H), 6.00 (dd, J=8.3, 3.2 Hz, 2H), 3.88 (dt, J=9.7, 4.6 Hz, 2H), 3.62 (dt, J=10.5, 5.4 Hz, 2H), 2.01 (hept, J=6.7 Hz, 6H), 1.90 (hept, J=6.6 Hz, 6H), 1.63-1.47 (m, 6H), 1.38 (s, 6H), 1.22 (s, 6H), 1.18 (s, 6H), 1.16-1.06 (m, 12H), 1.05 (d, J=6.6 Hz, 18H), 1.02 (d, J=6.5 Hz, 18H), 0.96 (dd, J=6.6, 4.4 Hz, 48H), 0.78 (s, 18H). $^{13}$C NMR (126 MHz, $C_6D_6$) δ 161.28, 159.32, 153.91, 148.87, 148.85, 141.87, 141.50, 140.48, 137.47, 135.84, 135.77, 135.10, 135.09, 135.03, 130.49, 128.59, 127.97, 127.81, 127.76, 126.98, δ 126.17, 123.71, 126.54, 125.70, 120.08, 119.30, 118.53, 117.11, 117.05, 116.96, 75.89, 56.79, 51.31, 37.78, 32.90, 32.25, 30.34, 31.81, 29.76, 26.85, 26.78, 26.62, 26.58, 26.54, 25.10, 24.85, 24.67, 24.38, 16.83. (All peaks listed in $^{13}$C-NMR. $^{19}$F $^{13}$C coupling constants not determined.)

$^{19}$F NMR (470 MHz, $C_6D_6$) δ −114.95 (t, J=8.4 Hz).

Polymerization

Comparative Catalyst A (Comp. Cat. A) and Inventive Catalyst 1-3 (Inv. Cat. 1-3) were used to polymerize ethylene and 1-octene in a 2-liter Parr batch polymerization reactor. All feeds were passed through columns of alumina and Q-5 catalyst (available from Engelhard Chemicals Inc.) prior to introduction into the polymerization reactor. Procatalyst and activator solutions were handled in a glove box under nitrogen atmosphere prior to addition to the polymerization reactor.

Table 1 illustrates the batch polymerizations results under the following conditions: reactor temperature: 190° C.; ISOPAR-E: 520 g; 1-octene: 300 g; ethylene pressure: 400 psi; Run time: 10 minutes. bis(hydrogenated tallow alkyl) methyl, tetrakis(pentafluorophenyl)borate(1-) amine: 1.2 equiv; MMAO-3A: 10 moles. ISOPAR-E is an isoparaffinic solvent which is commercially available from ExxonMobil Chemical Company (Bayport Tex.). Table 1 provides the polymerization results for such batch polymerization.

Additional batch polymerizations were conducted with Comparative Catalyst A and Inventive Catalysts 1-5 and 7-9 with varying ethylene pressures. The remaining batch polymerization conditions were as follows: 2 L Parr batch reactor, temperature: 190° C.; ISOPAR-E: 520 g; 1-octene: 300 g; Run time: 10 minutes. tetrakis(pentafluorophenyl)borate(1-) amine: 1.2 equiv; MMAO-3A: 10 moles. Tables 2 and 3 provide the additional batch polymerization conditions and results.

TABLE 2

| Batch Process Example | Press (psi) | Catalyst | μmoles | Yield (g) | Efficiency (gpoly/gMetal) |
|---|---|---|---|---|---|
| Comp. Batch Process B | 415 | Comp. Cat. A | 0.025 | 11 | 2,465,124 |
| Comp. Batch Process C | 275 | Comp. Cat. A | 0.045 | 24.8 | 3,087,630 |
| Comp. Batch Process D | 185 | Comp. Cat. A | 0.1 | 15.7 | 879,601 |
| Inv. Batch Process 10 | 415 | Inv. Cat. 1 | 0.02 | 11.7 | 3,277,495 |
| Inv. Batch Process 11 | 275 | Inv. Cat. 1 | 0.025 | 9.5 | 2,128,971 |
| Inv. Batch Process 12 | 185 | Inv. Cat. 1 | 0.1 | 18.6 | 1,042,075 |
| Inv. Batch Process 13 | 415 | Inv. Cat. 2 | 0.015 | 10.1 | 3,772,387 |
| Inv. Batch Process 14 | 275 | Inv. Cat. 2 | 0.03 | 15.1 | 2,819,953 |
| Inv. Batch Process 15 | 185 | Inv. Cat. 2 | 0.1 | 12.3 | 689,114 |
| Inv. Batch Process 16 | 415 | Inv. Cat. 3 | 0.04 | 11.2 | 1,568,715 |
| Inv. Batch Process 17 | 275 | Inv. Cat. 3 | 0.1 | 20.5 | 1,148,524 |
| Inv. Batch Process 18 | 185 | Inv. Cat. 3 | 0.3 | 16.4 | 306,273 |
| Inv. Batch Process 19 | 415 | Inv. Cat. 4 | 0.03 | 16.4 | 3,062,730 |
| Inv. Batch Process 20 | 275 | Inv. Cat. 4 | 0.05 | 8.8 | 986,050 |
| Inv. Batch Process 21 | 185 | Inv. Cat. 4 | 0.275 | 11 | 224,102 |

TABLE 1

| Batch Polymerization Example | Catalyst | μmoles | Polymer Yield (g) | Efficiency (gpoly/gMetal) | Tm (° C.) | Mw g/mole | Mw/Mn |
|---|---|---|---|---|---|---|---|
| Comp. Batch Process-A | Comp. Cat. A | 0.03 | 17.8 | 3,324,182 | 118.7 | 202,571 | 2.85 |
| Inv. Batch Process 1 | Inv. Cat. 1 | 0.025 | 10.6 | 2,375,483 | 121.6 | 232,290 | 2.60 |
| Inv. Batch Process 2 | Inv. Cat. 2 | 0.02 | 17.8 | 4,986,274 | 123.8 | 171,413 | 2.44 |
| Inv. Batch Process 3 | Inv. Cat. 3 | 0.065 | 28.4 | 2,447,885 | 121.7 | 171,229 | 2.08 |
| Inv. Batch Process 4 | Inv. Cat. 4 | 0.05 | 19.2 | 2,151,381 | 121.6 | 195,427 | 2.17 |
| Inv. Batch Process 5 | Inv. Cat. 5 | 0.04 | 14.8 | 4,055,950 | 121.0 | 108408 | 2.32 |
| Inv. Batch Process 6 | Inv. Cat. 6 | 0.02 | 7.7 | 2,156,984 | 123.0 | 163,202 | 2.52 |
| Inv. Batch Process 7 | Inv. Cat. 7 | 0.02 | 15.2 | 4,257,942 | 120.2 | 198,283 | 2.33 |
| Inv. Batch Process 8 | Inv. Cat. 8 | 0.02 | 7.2 | 2,016,920 | 122.1 | 186,515 | 2.43 |
| Inv. Batch Process 9 | Inv. Cat. 9 | 0.04 | 18.7 | 2,619,194 | 120.1 | 133,669 | 2.51 |

TABLE 2-continued

| Batch Process Example | Press (psi) | Catalyst | μmoles | Yield (g) | Efficiency (gpoly/gMetal) |
|---|---|---|---|---|---|
| Inv. Batch Process 22 | 415 | Inv. Cat. 5 | 0.03 | 12.3 | 4,494,431 |
| Inv. Batch Process 23 | 275 | Inv. Cat. 5 | 0.05 | 5.3 | 1,161,975 |
| Inv. Batch Process 24 | 185 | Inv. Cat. 5 | 0.3 | 5.7 | 208,279 |
| Inv. Batch Process 25 | 415 | Inv. Cat. 7 | 0.035 | 28 | 4,482,044 |
| Inv. Batch Process 26 | 275 | Inv. Cat. 7 | 0.045 | 20.1 | 2,502,474 |
| Inv. Batch Process 27 | 185 | Inv. Cat. 7 | 0.1 | 14.6 | 817,973 |
| Inv. Batch Process 28 | 415 | Inv. Cat. 8 | 0.015 | 3.4 | 1,269,912 |
| Inv. Batch Process 29 | 275 | Inv. Cat. 8 | 0.03 | 5.6 | 1,045,810 |
| Inv. Batch Process 30 | 185 | Inv. Cat. 8 | 0.095 | 5.9 | 347,948 |
| Inv. Batch Process 31 | 415 | Inv. Cat. 9 | 0.03 | 7.6 | 1,419,314 |
| Inv. Batch Process 32 | 275 | Inv. Cat. 9 | 0.06 | 11.3 | 1,055,148 |
| Inv. Batch Process 33 | 185 | Inv. Cat. 9 | 0.25 | 17.3 | 387,697 |

TABLE 3

| Batch Process Example | Catalyst | μmoles | Tm (° C.) | Mw g/mole | Mw/Mn |
|---|---|---|---|---|---|
| Comp. Batch Process B | Comp. Cat. A | 0.025 | 120.4 | 217,475 | 2.81 |
| Comp. Batch Process C | Comp. Cat. A | 0.045 | 113.8 | 93,815 | 2.24 |
| Comp. Batch Process D | Comp. Cat. A | 0.1 | 103.8 | 29,307 | 2.20 |
| Inv. Batch Process 10 | Inv. Cat. 1 | 0.02 | 121.1 | 250,158 | 2.02 |
| Inv. Batch Process 11 | Inv. Cat. 1 | 0.025 | 115.0 | 116,206 | 2.25 |
| Inv. Batch Process 12 | Inv. Cat. 1 | 0.1 | 105.3 | 29,894 | 2.18 |
| Inv. Batch Process 13 | Inv. Cat. 2 | 0.015 | 122.8 | 193,070 | 2.46 |
| Inv. Batch Process 14 | Inv. Cat. 2 | 0.03 | 116.8 | 70,140 | 2.18 |
| Inv. Batch Process 15 | Inv. Cat. 2 | 0.1 | 108.2 | 20,040 | 2.17 |
| Inv. Batch Process 16 | Inv. Cat. 3 | 0.04 | 121.8 | 193,537 | 2.20 |
| Inv. Batch Process 17 | Inv. Cat. 3 | 0.1 | 116.8 | 75,587 | 2.24 |
| Inv. Batch Process 18 | Inv. Cat. 3 | 0.3 | 107.9 | 25,916 | 3.68 |
| Inv. Batch Process 19 | Inv. Cat. 4 | 0.03 | 121.9 | 205,662 | 2.09 |
| Inv. Batch Process 20 | Inv. Cat. 4 | 0.05 | 116.1 | 78,584 | 2.22 |
| Inv. Batch Process 21 | Inv. Cat. 4 | 0.275 | 106.4 | 18,902 | 2.75 |
| Inv. Batch Process 22 | Inv. Cat. 5 | 0.03 | 121.3 | 114768 | 2.27 |
| Inv. Batch Process 23 | Inv. Cat. 5 | 0.05 | 117.6 | 56096 | 2.20 |
| Inv. Batch Process 24 | Inv. Cat. 5 | 0.3 | 109.9 | 18926- | 2.38 |
| Inv. Batch Process 25 | Inv. Cat. 7 | 0.035 | 121.2 | 217,512 | 1.97 |
| Inv. Batch Process 26 | Inv. Cat. 7 | 0.045 | 115.9 | 89,539 | 2.05 |
| Inv. Batch Process 27 | Inv. Cat. 7 | 0.1 | 107.2 | 26,496 | 2.20 |
| Inv. Batch Process 28 | Inv. Cat. 8 | 0.015 | 122.2 | 206,840 | 2.27 |
| Inv. Batch Process 29 | Inv. Cat. 8 | 0.03 | 117.2 | 95,829 | 2.70 |
| Inv. Batch Process 30 | Inv. Cat. 8 | 0.095 | 109.9 | 35,845 | 4.31 |
| Inv. Batch Process 31 | Inv. Cat. 9 | 0.03 | 122.3 | 172,612 | 2.54 |
| Inv. Batch Process 32 | Inv. Cat. 9 | 0.06 | 116.7 | 62,709 | 2.32 |
| Inv. Batch Process 33 | Inv. Cat. 9 | 0.25 | 105.2 | 13,813 | 2.31 |

Additional polymerization reactions were conducted in a continuous process under the following conditions:

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. Modified methylaluminoxane (MMAO), commercially available from AkzoNobel, is used as an impurity scavenger. The individual catalyst components (procatalyst cocatalyst) are manually batch diluted to specified component concentrations with purified solvent (Isopar E) and pressured to above reaction pressure at 525 psig. The cocatalyst is [HNMe(C$_{18}$H$_{37}$)$_2$][B(C$_6$F$_5$)$_4$], commercially available from Boulder Scientific, and is used at a 1.2 molar ratio relative to the procatalyst. All reaction feed flows are measured with mass flow meters and independently controlled with computer automated valve control systems.

The continuous solution polymerizations are carried out in a 1 gallon continuously stirred-tank reactor (CSTR). The combined solvent, monomer, comonomer and hydrogen feed to the reactor is temperature controlled between 5° C. and 30° C. and is typically 15° C. All of these materials are fed to the polymerization reactor with the solvent feed. The catalyst is fed to the reactor to reach a specified conversion of ethylene. The cocatalyst is fed separately based on a calculated specified molar ratio (1.2 molar equivalents) to the catalyst component. The MMAO shares the same line as the cocatalyst and flow is based on either an Al concentration in the reactor or a specified molar ratio to the catalyst component. The effluent from the polymerization reactor (containing solvent, monomer, comonomer, hydrogen, catalyst components, and molten polymer) exits the reactor and is contacted with water to terminate polymerization. In addition, various additives such as antioxidants, can be added at this point. The stream then goes through a static mixer to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower-boiling reaction components. The stream then passes through the reactor pressure control valve, across which the pressure is greatly reduced.

From there, it enters a two stage separation system consisting of a devolatizer and a vacuum extruder, where solvent and unreacted hydrogen, monomer, comonomer, and water are removed from the polymer. At the exit of the extruder, the strand of molten polymer formed goes through a cold-water bath, where it solidifies. The strand is then fed through a strand chopper, where the polymer is cut it into pellets after being air-dried.

Tables 4-5 provide the process conditions and results for Comparative Continuous Processes E and F and Inventive Continuous Processes 34 and 35.

TABLE 4

| | Process Example | |
|---|---|---|
| | Comp. Continuous Process E | Inv. Continuous Process 34 |
| Catalyst | Comp. Catalyst A | Inv. Catalyst 1 |
| Reactor Temperature (° C.) | 190 | 190 |
| C2 Conversion (%) | 87.3 | 89.7 |
| Efficiency[a] | 15.0 | 16.1 |
| MI (dg/min) | 1.20 | 1.00 |
| $I_{10}/I_2$ | 5.30 | 5.94 |
| $H_2$ mol % | 1.25 | 0.77 |
| Mw | 108,821 | 113,375 |
| MWD | 1.94 | 2.05 |
| Density (g/cc) | 0.9496 | 0.9501 |
| C8/Olefin[b] | 9.6 | 9.9 |

[a]Efficiency in units of $10^6$ g polymer per gram of metal
[b]C8/olefin is defined as: (mass 1-octene/(total mass 1-octene and ethylene)) × 100, where the mass values are taken from the respective feed rates.

TABLE 5

| | Process Example | |
|---|---|---|
| | Comp. Continuous Process F | Inv. Continuous Process 35 |
| Catalyst | Comp. Cat. A | Inv. Cat. 1 |
| Temperature (° C.) | 190 | 188 |
| C2 Conversion (%) | 87.7 | 89.2 |
| Efficiency[a] | 11.3 | 8.6 |
| MI (dg/min) | 11.8 | 11.6 |
| $I_{10}/I_2$ | 5.45 | 5.47 |
| $H_2$ mol % | 0.36 | 0.40 |
| Mw | 55,328 | 55,698 |
| MWD | 1.95 | 1.98 |
| Density (g/cc) | 0.9229 | 0.9259 |
| Tm (° C.) | 115 | 117 |
| CEF peak (° C.) | 87 | 88 |
| C8 incorp. (mol %) | 2.0 | 1.7 |

[a]Efficiency in wins of $10^6$ g polymer per gram of metal

Additional polymerization reactions were conducted in a continuous process under the following conditions:

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. Modified methylaluminoxane (MMAO-3A), commercially available from AkzoNobel, is used as an impurity scavenger. The individual catalyst components (procatalyst cocatalyst) are manually batch diluted to specified component concentrations with purified solvent (Isopar E) and pressured to above reaction pressure at 525 psig. The cocatalyst is bis(hydrogenated tallow alkyl)methyl, tetrakis (pentafluorophenyl)borate(1-) amine, commercially available from Boulder Scientific, and is used at a 1.2 molar ratio relative to the procatalyst. All reaction feed flows are measured with mass flow meters and independently controlled with computer automated valve control systems.

The continuous solution polymerizations are carried out in a 5 L continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 500° C. and typically 25° C. The fresh comonomer feed to the polymerization reactor is fed in with the solvent feed. The fresh solvent feed is controlled typically with each injector receiving half of the total fresh feed mass flow. The cocatalyst is fed based on a calculated specified molar ratio (1.2 molar equivalents) to the procatalyst component. Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives such as anti-oxidants, can be added at this point. The stream then goes through another set of static mixing elements to evenly disperse the catalyst kill and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The separated and devolatized polymer melt is pumped through a die specially designed for underwater pelletization, cut into uniform solid pellets, dried, and transferred into a box for storage.

Tables 6-7 provide the process conditions and results for Comparative Continuous Processes E and F and Inventive Continuous Processes 36 and 37.

TABLE 6

| | Process Example | |
|---|---|---|
| | Comp. Continuous Process G | Inv. Continuous Process 36 |
| Catalyst | Comparative Catalyst A | Inv. Catalyst 3 |
| Reactor Temperature (° C.) | 190 | 190 |
| C2 Conversion (%) | 90.3 | 88.4 |
| Efficiency[a] | 11.3 | 9.8 |
| MI (dg/min) | 1.08 | 0.90 |
| $I_{10}/I_2$ | 5.4 | 5.4 |

TABLE 6-continued

| | Process Example | |
|---|---|---|
| | Comp. Continuous Process G | Inv. Continuous Process 36 |
| H$_2$ mol % | 1.51 | 0.50 |
| Density (g/cc) | 0.9498 | 0.9514 |
| C8/Olefin[b] | 1.2 | 1.8 |

[a]Efficiency in units of 10$^6$ g polymer per gram of metal
[b]C8/olefin is defined as: (mass 1-octene/(total mass 1-octene and ethylene)) × 100, where the mass values are taken from the respective feed rates.

TABLE 7

| | Process Example | |
|---|---|---|
| | Comp. Continuous Process H | Inv. Continuous Process 37 |
| Catalyst | Comparative Catalyst A | Inv. Catalyst 3 |
| Reactor Temperature (° C.) | 190 | 190 |
| C2 Conversion (%) | 90.1 | 89.0 |
| Efficiency[a] | 8.0 | 4.6 |
| MI (dg/min) | 11.5 | 8.9 |
| I$_{10}$/I$_2$ | 5.3 | 6.1 |
| H$_2$ mol % | 0.27 | 0.04 |
| Density (g/cc) | 0.9219 | 0.9244 |
| C8/Olefin[b] | 69.6 | 69.6 |

[a]Efficiency in units of 10$^6$ g polymer per gram of metal
[b]C8/olefin is defined as: (mass 1-octene/(total mass 1-octene and ethylene)) × 100, where the mass values are taken from the respective feed rates.

Test Methods

Test methods include the following:

Density

Samples that are measured for density are prepared according to ASTM D-1928. Measurements are made within one hour of sample pressing using ASTM D-792, Method B.

Melt Index

Melt index (I$_2$) is measured in accordance with ASTM-D 1238, Condition 190° C./2.16 kg, and is reported in grams eluted per 10 minutes. Melt flow rate (I$_{10}$) is measured in accordance with ASTM-D 1238, Condition 190° C./10 kg, and is reported in grams eluted per 10 minutes.

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (T$_m$), peak crystallization temperature (T$_c$), heat of fusion (¾) (in Joules per gram), and the calculated % crystallinity for samples using appropriate equation, for example for the ethylene/alpha-olefin interpolymer using Equation 1, as shown in FIG. 1.

The Heat of Fusion (¾) and the Peak Melting Temperature are Reported from the Second Heat curve. Peak crystallization temperature is determined from the cooling curve.

Dynamic Mechanical Spectroscopy (DMS) Frequency Sweep

Melt rheology, constant temperature frequency sweeps, were performed using a TA Instruments Advanced Rheometric Expansion System (ARES) rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity (η*) were calculated.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an onboard differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC, absolute weight average molecular weight ("$M_w$ Abs") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (Mw and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing 2" viral coefficient effects (concentration effects on molecular weight), g' by 3D-GPC The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight (Mw), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime (g;') is calculated for each branched sample chromatographic slice (i) and measuring molecular weight (M;) according to Equation 2, as shown in FIG. 2, where the calculation utilizes the $IVii_{ne}ar$ reference$j$ at equivalent molecular weight, Mj, in the linear reference sample. In other words, the sample IV slice (i) and reference IV slice (j) have the same molecular weight (M; =Mj). For simplicity, the $IVii_{ne}ar$ reference,j slices are calculated from a fifth-order polynomial fit of the reference Mark-Houwink Plot. The IV ratio, or gi', is only obtained at molecular weights greater than 3,500 because of signal-to-noise limitations in the light scattering data. The number of branches along the sample polymer ($B_n$) at each data slice (i) can be determined by using Equation 3, as shown in FIG. 3, assuming a viscosity shielding epsilon factor of 0.75.

Finally, the average LCBf quantity per 1000 carbons in the polymer across all of the slices (i) can be determined using Equation 4, as shown in FIG. 4.

gpcBR Branching Index by 3D-GPC

In the 3D-GPC configuration the polyethylene and polystyrene standards can be used to measure the Mark-Houwink constants, K and a, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 5 and 6, FIGS. 5 and 6, respectively.

The gpcBR branching index is a robust method for the characterization of long chain branching. See Yau, Wallace W., "Examples of Using 3D-GPC-TREF for Polyolefin Characterization", Macromol. Symp., 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

The area calculation in Equation 7, shown in FIG. 7, offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 8, as shown in FIG. 8, where DP; stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample. Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 9 and 10, as shown in FIGS. 9 and 10, respectively.

Equation 11, as shown in FIG. 11, is used to determine the gpcBR branching index, where [η] is the measured intrinsic viscosity, $[r|]_{cc}$ is the intrinsic viscosity from the conventional calibration, $M_w$ is the measured weight average molecular weight, and $M_{w\,cc}$ is the weight average molecular weight of the conventional calibration. The Mw by light scattering (LS) using Equation 7, as shown in FIG. 7, is commonly referred to as the absolute Mw; while the Mw,cc from Equation 9, as shown in FIG. 9, using the conventional GPC molecular weight calibration curve is often referred to as polymer chain Mw. All statistical values with the "cc" subscript are determined using their respective elution volumes, the corresponding conventional calibration as previously described, and the concentration (CO derived from the mass detector response. The non-subscripted values are measured values based on the mass detector, LALLS, and viscometer areas. The value of KPE is adjusted iteratively until the linear reference sample has a gpcBR measured value of zero. For example, the final values for a and Log K for the determination of gpcBR in this particular case are 0.725 and −3.355, respectively, for polyethylene, and 0.722 and −3.993 for polystyrene, respectively.

Once the K and a values have been determined, the procedure is repeated using the branched samples. The branched samples are analyzed using the final Mark-Houwink constants as the best "cc" calibration values and applying Equations 7-11, as shown in FIG. 7-11, respectively.

The interpretation of gpcBR is straight forward. For linear polymers, gpcBR calculated from Equation 11, as shown in FIG. 11, will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w\,cc}$, and the calculated $IV_{CC}$ will be higher than the measured polymer Intrinsic Viscosity (IV). In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

CEF Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 ul. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125μm+6%
(MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, >97.0, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt. The CEF column resolution is defined in equation 12, as shown in FIG. 12, where the column resolution is 6.0.

CDC Method

Comonomer distribution constant (CDC) is calculated from comonomer distribution profile by CEF. CDC is defined as Comonomer Distribution Index divided by Comonomer Distribution Shape Factor multiplying by 100 as shown in Equation 13, FIG. 13.

Comonomer distribution index stands for the total weight fraction of polymer chains with the comonomer content ranging from 0.5 of median comonomer content ($C_{median}$) and 1.5 of Cmedian from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 13, FIG. 13, and wherein Comonomer distribution index stands for the total weight fraction of polymer chains with the comonomer content ranging from 0.5 of median comonomer content ($C_{me}di_{an}$) and 1.5 of Cmedian from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) (WT (T)) from 35.0° C. to 119.0° C. with a temperature step increase of 0.200° C. from CEF according to Equation 14, as shown in FIG. 14;

(B) Calculate the median temperature $\{T_{me}di_{an}\}$ at cumulative weight fraction of 0.500, according to Equation 15, as shown in FIG. 15;

(C) Calculate the corresponding median comonomer content in mole % {Cmedian) at the median temperature $\{T_{me}di_{an}\}$ by using comonomer content calibration curve according to Equation 16, as shown in FIG. 16;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole to 7.0 mole are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula 16, FIG. 16, wherein: $R^2$ is the correlation constant;

(F) Calculate Comonomer Distribution Index from the total weight fraction with a comonomer content ranging from $0.5*_{ian}$ to 1.5*Cmedian, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak; and (H) Calculate the standard deviation of temperature (Stdev) according Equation 17, as shown in FIG. 17.

Creep Zero Shear Viscosity Method

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50μη above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the order of $10^{-3}$ $s^{-1}$ for the samples in this study. Steady state is determined by taking a linear regression for all the data in the last 10% time window of the plot of log(J(t)) vs. log(t), where J(t) is creep compliance and t is creep time. If the slope of the linear regression is greater than 0.97, steady state is considered to be reached, then the creep test is stopped. In all cases in this study the slope meets the criterion within 30 minutes. The steady state shear rate is determined from the slope of the linear regression of all of the data points in the last 10% time window of the plot of e vs. t, where e is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio

Zero-shear viscosity ratio (ZSVR) is defined as the ratio of the zero-shear viscosity (ZSV) of the inventive polymer to the ZSV of a linear polyethylene material at the equivalent weight average molecular weight ($M_{w\_gpc}$) as shown in the Equation 18, as shown in FIG. 18.

The rlo value (in Pa·s) is obtained from creep test at 190° C. via the method described above. It is known that ZSV of linear polyethylene T|OL has a power law dependence on its $M_w$ when the $M_w$ is above the critical molecular weight $M_c$. An example of such a relationship is described in Karjala et al. (Annual Technical Conference—Society of Plastics Engineers (2008), 66th, 887-891) as shown in the Equation 19, as shown in FIG. 19, to calculate the ZSVR values. Referring to Equation 19, as showing in FIG. 19, $M_{w\_}$gpc value (g/mol) is determined by using the GPC method as defined immediately hereinbelow.

$M_w$·gpc Determination

To obtain $M_{w\_gpc}$ values, the chromatographic system consist of either a Polymer Laboratories Model PL-210 or a Polymer Laboratories Model PL-220. The column and carousel compartments are operated at 140° C. Three Polymer Laboratories 10-ιη Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples were prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories.

The polystyrene standard peak molecular weights are converted to polyethylene molecular weights using Equation 20, as shown in FIG. 20.

Referring to Equation 20, as shown in FIG. 20, M is the molecular weight, A has a value of 0.4316 and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight $M_w$ is excellent at <2.6%.

Polymer Characterization

Melting ($T_m$) and glass transition ($T_g$) temperatures of polymers were measured by differential scanning calorimetry (Q2000 DSC, TA Instruments, Inc.). Samples were first heated from room temperature to 200° C. using the 'Jump To' feature. After being held at this temperature for 4 min, the samples were cooled to −90° C. at 10° C./min, held for 4 min, and were then heated again to 200° C. Molecular weight distribution (Mw, Mn) information was determined by analysis on a custom Dow-built Robotic-Assisted Dilution High-Temperature Gel Permeation Chromatographer (RAD-GPC). Polymer samples were dissolved for 90 minutes at 160° C. at a concentration of 5-7 mg/mL in 1,2,4-trichlorobenzene (TCB) stabilized by 300 ppm of BHT in capped vials while stirring. They were then diluted to 1 mg/mL immediately before a 400 μL·aliquot of the sample was injected. The GPC utilized two (2) Polymer Labs PL gel 10μη MIXED-B columns (300 mm×10 mm) at a flow rate of 2.0 mL/minute at 150° C. Sample detection was performed using a PolyChar IR4 detector in concentration mode. A conventional calibration of narrow Polystyrene (PS) standards was utilized, with apparent units adjusted to homo-polyethylene (PE) using known Mark-Houwink coefficients for PS and PE in TCB at this temperature. To determine 1-octene incorporation, polymer samples were dissolved at a concentration of 30 mg/mL in 1,2,4-Trichlorobenzene at 160° C. for 1 hr while shaking. A 100μl aliquot of each polymer/TCB solution was deposited into individual cells on a custom silicon wafer at 160° C. under nitrogen inerting. The wafer was held at 160° C. for 45 minutes, and then pulled from heat and allowed to cool to room temperature. The wafer was then analyzed using a Nicolet Nexus 670 FT-IR ESP infrared spectrometer. Mol 1-octene within each sample was determined by taking a ratio of the $CH_3$ area (1382.7-1373.5 wavenumbers) to the C¾ area (1525-1400 wavenumbers) and normalizing to a standard curve generated through NMR analysis of ethylene-co-1-octene polymer standards.

The present invention may be embodied in other forms without departing from the spirit and the essential attributes thereof, and, accordingly, reference should be made to the appended claims, rather than to the foregoing specification, as indicating the scope of the invention.

We claim:

1. A polymerization process for producing ethylene based polymers comprising polymerizing ethylene and one or more α-olefins in the presence of a catalyst systems in a reactor system having one or more reactors, wherein the catalyst system comprises;

one or more procatalysts comprising a metal-ligand complex of formula (I)

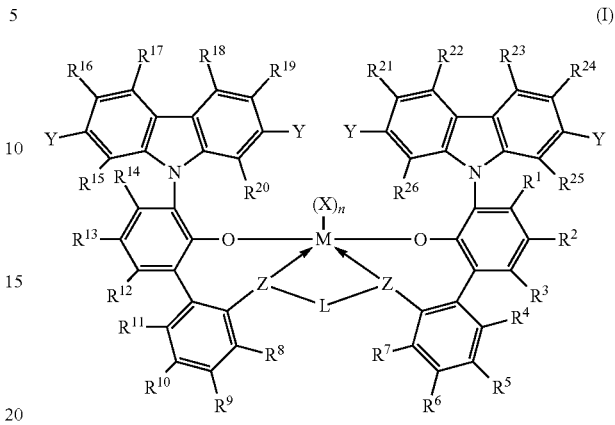

wherein:
M is titanium, zirconium, or hafnium, each independently being in a formal oxidation state of +2, +3, or +4; and n is an integer of from 0 to 3, and wherein when n is 0, X is absent; and each X independently is a monoanionic; and X and n are chosen in such a way that the metal-ligand complex of formula (I) is, overall, neutral;

each Z independently is O; and

L is $(C_2-C_{40})$hydrocarbylene, wherein the $(C_2-C_{40})$hydrocarbylene has a portion that comprises a 2-carbon atom to 10-carbon atom linker backbone linking the Z atoms in formula (I);

$R^{1-26}$ are each independently selected from the group consisting of a $(C_1-C_{40})$hydrocarbyl, $Si(R^C)_3$, halogen atom, hydrogen atom, when $R^7$ is H, $R^8$ is a $(C_1-C_{40})$hydrocarbyl; or $Si(R^C)_3$, or when $R^8$ is H, then $R^7$ is a (C1-C40)hydrocarbyl; or $Si(R^C)_3$;

optionally two or more R groups of the $R^{1-26}$ groups (for example, from $R^{1-7}$, $R^{8-14}$, $R^{8-11}$, $R^{1-3}$, $R^{4-7}$, $R^{15-20}$, $R^{21-26}$) can combine together into ring structures with such ring structures having from 3 to 50 atoms in the ring excluding any hydrogen atoms; and Y has the formula $-T(R^d)_b$ and contains more than five non-hydrogen atoms, wherein each T is independently selected from the group consisting of C and Si and wherein T is substituted with $R^d$ substituents, b is 3 each $R^d$ is $(C_1-C_{20})$alkyl independently;

provided that when T is Si, each $R^d$ is $(C_2-C_{40})$hydrocarbyl.

2. The process according to claim 1, wherein each Y has the same structure.

3. The process according to claim 1, wherein T is a carbon atom.

4. The process according to claim 1, wherein T is a silicon atom.

5. The process according to claim 1, wherein each of $R^7$ and $R^8$ are a $(C_1-C_{40})$hydrocarbyl; $(C_1-C_{40})$heterohydrocarbyl; $Si(R^C)_3$, $Ge(R^C)_3$, $P(R^P)_2$, $N(R^N)_2$, $OR^C$, $SR^C$, $NO_2$, CN, $CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$ or halogen atom.

6. The process according to claim 1, wherein the one or more procatalysts comprises a metal-ligand complex of formula (II):

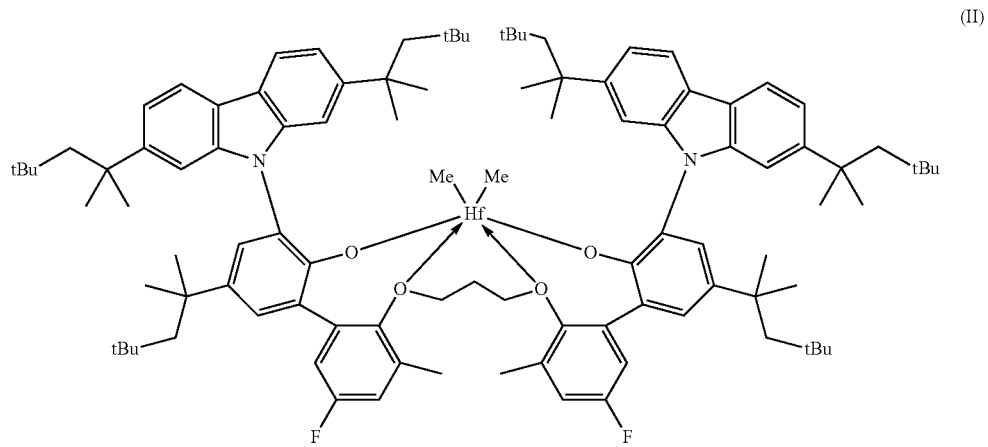

(II)

where Me is a methyl group and tBu is a tert-butyl group.

7. The process according to claim 1, wherein the one or more procatalysts comprises a metal-ligand complex of formula (III):

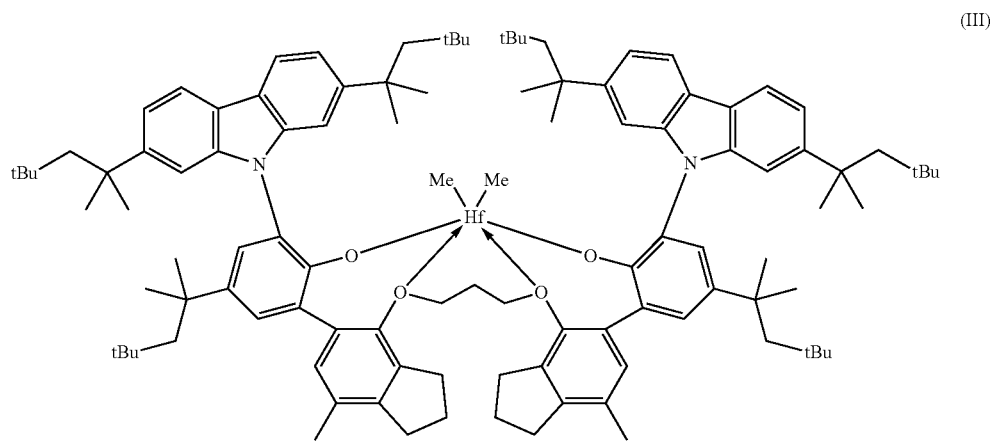

(III)

where Me is a methyl group and tBu is a tert-butyl group.

8. The process according to claim 1, wherein the one or more procatalysts comprises a metal-ligand complex of formula (IV):

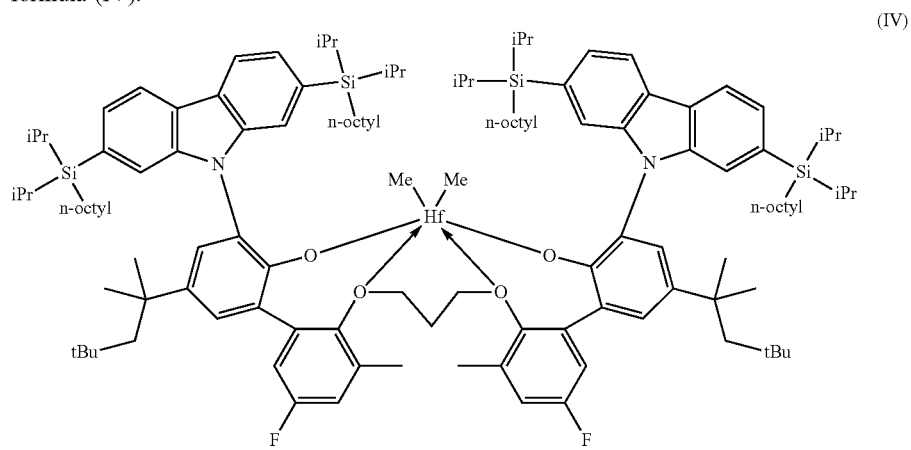

(IV)

where Me is a methyl group and tBu is a tert-butyl group.

9. The process according to claim 1, wherein the one or more procatalysts comprises a metal-ligand complex of formula (V):

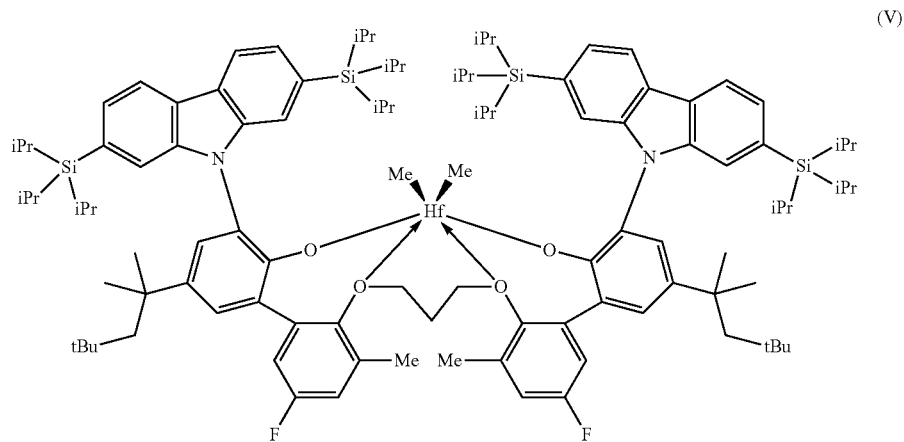

(V)

where Me is a methyl group, iPr is an iso-propyl group and tBu is a tert-butyl group.

10. The process according to claim 1, wherein the one or more procatalysts comprises a metal-ligand complex of formula (VI):

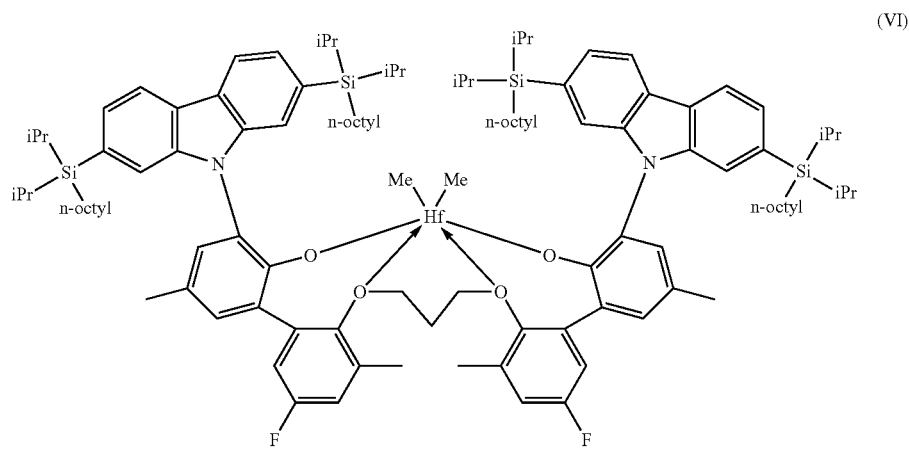

(VI)

where Me is a methyl group, iPr is an iso-propyl group.

11. The process according to claim 1, wherein the one or more procatalysts comprises a metal-ligand complex of formula (VII) below (VII)

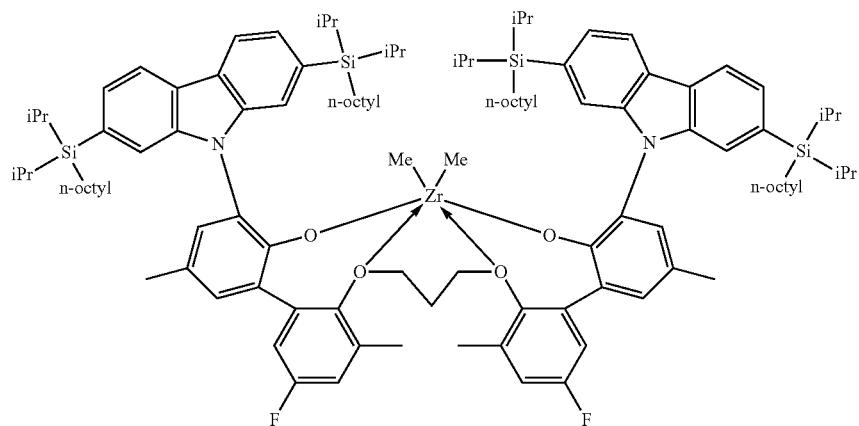

where Me is a methyl group, iPr is an iso-propyl group.

12. The process according to claim 1, wherein the one or more procatalysts comprises a metal-ligand complex of formula (VIII):

(VIII)

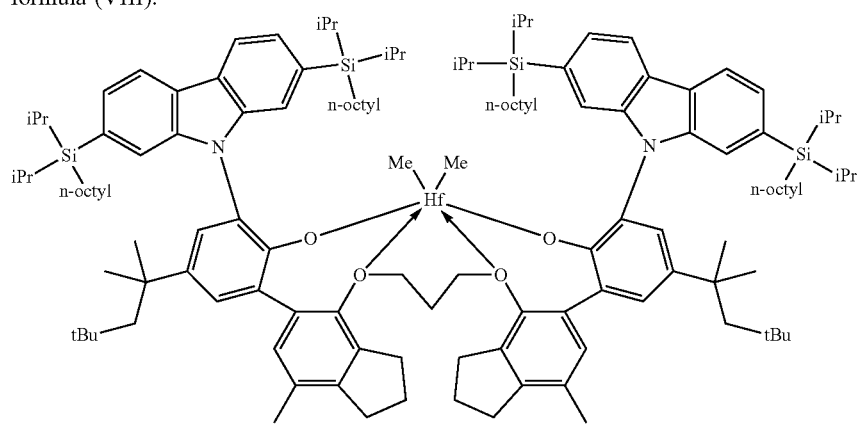

where Me is a methyl group, iPr is an iso-propyl group and tBu is a tert-butyl group.

13. The process according to claim 1, wherein the one or more procatalysts comprises a metal-ligand complex of formula (IX):

(IX)

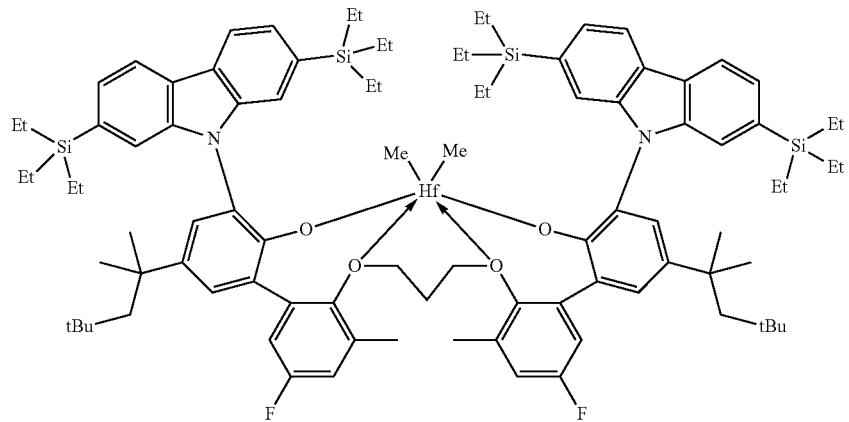

where Me is a methyl group, Et is an ethyl group and tBu is a tert-butyl group.
14. The process according to claim 1, wherein the one or more procatalysts comprises a metal-ligand complex of formula (X):
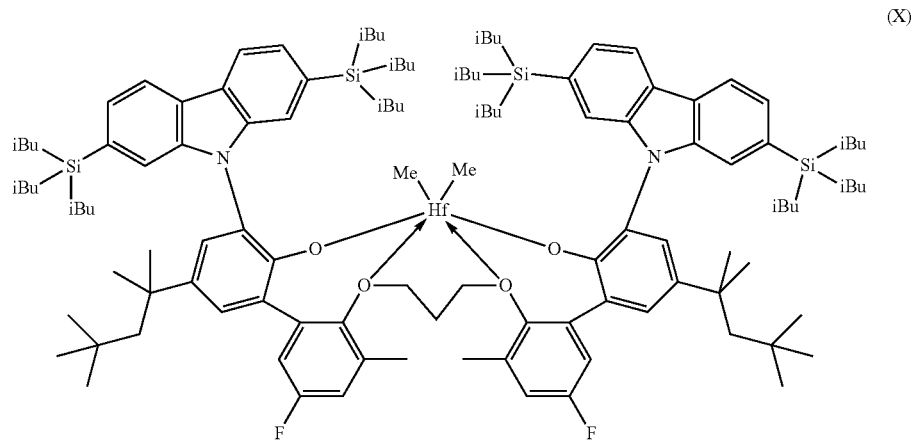
(X)
where Me is a methyl group, Et is an ethyl group and tBu is a tert-butyl group.
* * * * *